(12) United States Patent
Coffee et al.

(10) Patent No.: US 6,892,131 B2
(45) Date of Patent: May 10, 2005

(54) VEHICLE TRACKING, COMMUNICATION AND FLEET MANAGEMENT SYSTEM

(75) Inventors: John R. Coffee, Gilbert, AZ (US);
Richard W. Rudow, Mesa, AZ (US);
Robert F. Allen, Gilbert, AZ (US);
Mark Billings, Glendale, AZ (US);
David A. Dye, Phoenix, AZ (US);
Mark L. Kirchner, Phoenix, AZ (US);
Robert W. Lewis, Phoenix, AZ (US);
Kevin M. Marvin, Gilbert, AZ (US);
Robert D. Sleeper, Laveen, AZ (US);
William A. Tekniepe, Mesa, AZ (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 10/646,715

(22) Filed: Aug. 25, 2003

(65) Prior Publication Data

US 2004/0039504 A1 Feb. 26, 2004

Related U.S. Application Data

(63) Continuation of application No. 09/466,169, filed on Dec. 19, 1999, now Pat. No. 6,611,755.

(51) Int. Cl.[7] .............................................. G06F 17/00
(52) U.S. Cl. .................. 701/200; 340/438; 340/988; 340/993; 455/518; 280/6.151
(58) Field of Search .............................. 701/200, 213, 701/27, 35; 340/438, 988, 993, 439, 539, 466; 455/518, 12.1, 33.1, 57.1; 280/6.151, 6.159; 370/95, 100; 379/58

(56) References Cited

U.S. PATENT DOCUMENTS

| | | | |
|---|---|---|---|
| 4,350,358 A | * 9/1982 | Ferris | 280/81.1 |
| 4,414,661 A | 11/1983 | Karlstrom | 370/332 |
| 4,585,356 A | * 4/1986 | Hudelmaier | 366/60 |
| 4,682,165 A | 7/1987 | Davis | 340/825.5 |
| 5,068,654 A | 11/1991 | Husher | 340/903 |
| 5,332,366 A | * 7/1994 | Anderson | 417/63 |
| 5,348,387 A | * 9/1994 | Gordon et al. | 366/63 |
| 5,493,694 A | 2/1996 | Vlcek et al. | 455/521 |
| 5,613,196 A | 3/1997 | Barnes et al. | 455/15 |
| 5,719,771 A | 2/1998 | Buck et al. | 455/456.5 |
| 5,808,907 A | 9/1998 | Shetty et al. | 702/188 |
| 5,815,071 A | 9/1998 | Doyle | 340/439 |
| 5,826,195 A | 10/1998 | Westerlage et al. | 455/456 |
| 5,983,161 A | 11/1999 | Lemelson et al. | 701/301 |
| 5,991,615 A | 11/1999 | Coppinger et al. | 455/406 |
| 6,144,916 A | * 11/2000 | Wood, Jr. et al. | 701/200 |
| 6,152,457 A | * 11/2000 | Silbernagel | 280/6.151 |
| 6,212,393 B1 | 4/2001 | Suarez et al. | 455/456.4 |
| 6,286,987 B1 | * 9/2001 | Goode et al. | 366/60 |
| 6,292,724 B1 | 9/2001 | Apsell et al. | 701/29 |
| 6,301,263 B1 | * 10/2001 | Maggenti | 370/462 |
| 6,330,499 B1 | 12/2001 | Chou et al. | 701/33 |
| 2002/0014364 A1 | * 2/2002 | Bartlett | 180/209 |

FOREIGN PATENT DOCUMENTS

| | | | | |
|---|---|---|---|---|
| JP | 01249521 A | * 10/1989 | | B60K/17/28 |
| JP | 09264166 A | * 10/1997 | | F02D/31/00 |

OTHER PUBLICATIONS

EPO Search Report dated Mar. 3, 2004.
PCT Search Report dated Dec. 26, 2001.

* cited by examiner

*Primary Examiner*—Thomas G. Black
*Assistant Examiner*—Tuan C To
(74) *Attorney, Agent, or Firm*—William E. Pelton, Esq.

(57) ABSTRACT

A vehicle fleet management information system for identification of location and direction of movement of each vehicle in the fleet in real-time and automatic communication directly with management offices to report its location and heading, and status of predetermined events in which the vehicle may be engaged. One example is a cement delivery truck which monitors location, speed and status information such as start pour, pouring, end pour, wash and leave job, and automatically transmits this information with a management office without requiring affirmative action by the vehicle operator.

49 Claims, 41 Drawing Sheets

Initialization Mode

Coarse Offset Mode

Coarse Rate Mode

Fine Rate Mode

TDMA Transmit Bit Interleaving

| Words | 11 | 10 | 9 | 8 | 7 | 6 | Bits 5 | 4 | 3 | 2 | 1 | 0 |
|---|---|---|---|---|---|---|---|---|---|---|---|---|
| 0  | 1/0 000   | 2/0 001   | 3/0 002  | 4/0 003  | 5/0 004  | 6/0 005  | 7/0 006  | 8/0 007  | 9/0 008  | 10/0 009 | 11/0 010 | 0/1 011   |
| 1  | 2/1 012   | 3/1 013   | 4/1 014  | 5/1 015  | 6/1 016  | 7/1 017  | 8/1 018  | 9/1 019  | 10/1 020 | 11/1 021 | 0/2 022  | 1/2 023   |
| 2  | 3/2 024   | 4/2 025   | 5/2 026  | 6/2 027  | 7/2 028  | 8/2 029  | 9/2 030  | 10/2 031 | 11/2 032 | 0/3 033  | 1/3 034  | 2/3 035   |
| 3  | 4/3 036   | 5/3 037   | 6/3 038  | 7/3 039  | 8/3 040  | 9/3 041  | 10/3 042 | 11/3 043 | 0/4 044  | 1/4 045  | 2/4 046  | 3/4 047   |
| 4  | 5/4 048   | 6/4 049   | 7/4 050  | 8/4 051  | 9/4 052  | 10/4 053 | 11/4 054 | 0/5 055  | 1/5 056  | 2/5 057  | 3/5 058  | 4/5 059   |
| 5  | 6/5 060   | 7/5 061   | 8/5 062  | 9/5 063  | 10/5 064 | 11/5 065 | 0/6 066  | 1/6 067  | 2/6 068  | 3/6 069  | 4/6 070  | 5/6 071   |
| 6  | 7/6 072   | 8/6 073   | 9/6 074  | 10/6 075 | 11/6 076 | 0/7 077  | 1/7 078  | 2/7 079  | 3/7 080  | 4/7 081  | 5/7 082  | 6/7 083   |
| 7  | 8/7 084   | 9/7 085   | 10/7 086 | 11/7 087 | 0/8 088  | 1/8 089  | 2/8 090  | 3/8 091  | 4/8 092  | 5/8 093  | 6/8 094  | 7/8 095   |
| 8  | 9/8 096   | 10/8 097  | 11/8 098 | 0/9 099  | 1/9 100  | 2/9 101  | 3/9 102  | 4/9 103  | 5/9 104  | 6/9 105  | 7/9 106  | 8/9 107   |
| 9  | 10/9 108  | 11/9 109  | 0/10 110 | 1/10 111 | 2/10 112 | 3/10 113 | 4/10 114 | 5/10 115 | 6/10 116 | 7/10 117 | 8/10 118 | 9/10 119  |
| 10 | 11/10 120 | 0/11 121  | 1/11 122 | 2/11 123 | 3/11 124 | 4/11 125 | 5/11 126 | 6/11 127 | 7/11 128 | 8/11 129 | 9/11 130 | 10/11 131 |
| 11 | 0/0 132   | 1/1 133   | 2/2 134  | 3/3 135  | 4/4 136  | 5/5 137  | 6/6 138  | 7/7 139  | 8/8 140  | 9/9 141  | 10/10 142| 11/11 143 |

W/B indicates bit, B, of the original code word,W.
Words are transmitted MSB first; the small number indicates transmit bit order

FIG. 17

VEHICLE TRACKING, COMMUNICATION AND FLEET MANAGEMENT SYSTEM

CROSS-REFERENCE TO RELATED APPLICATION

This application is a continuation of application Ser. No. 09/466,169, filed Dec. 19, 1999, assigned to the same assignee as the present application, now U.S. Pat. No. 6,611,755, issued Aug. 26, 2003.

BACKGROUND OF THE INVENTION

The invention disclosed herein broadly relates to asset management systems, and more particularly to a system for tracking the real-time location and status of vehicles of a fleet, and for communicating between the vehicles and a dispatcher or expediter in the fleet offices.

Operators of fleet vehicle businesses need to know where each vehicle in the fleet is located and what it is doing in order to make decisions on how to use the vehicles most efficiently. In recent years, vehicle locating systems have been developed using Global Positioning System (GPS) satellite information, and, for greater accuracy, differential GPS (DGPS) systems. These systems are highly accurate where line of sight (LOS) conditions exist, that is, where the vehicle (or more accurately, the vehicle's GPS receiver) has a clear LOS to the appropriate number of GPS satellites. But such conditions are typically unavailable or are at least less frequently available for a vehicle operating on city streets, particularly in areas where multi-story buildings are present, owing to the shielding that such buildings effect. In those circumstances an alternative navigation system such as dead reckoning (DR) navigation may be used to provide vehicle position and velocity data in urban canyons (i.e., streets bordered by tall buildings) where GPS measurements are only intermittently available. Or a map matching technique or navigation grid may be used as another or additional alternative.

Currently, wireless voice communication between dispatchers and drivers is the primary means of addressing the need of the fleet owner or operator to know what each vehicle is doing, i.e., its operations taking place at any given time, and where the vehicle is located when a particular operation is occurring. In industries where vehicles perform a repetitive sequence of events with each load, such as for ready mix concrete operations, "status boxes" have recently come into use. The status boxes require the driver to press a button at each stage of operation such as "load," leave plant," "arrive job," "begin pour," and so forth.

The primary problem with either wireless voice communication or status box systems is that data are manually provided to the dispatcher from the driver of the vehicle. This leads to untimely (late) and, perhaps worse, inaccurate data more than ninety percent of the time, according to analyses performed by the fleet owners/operators. The availability of timely, accurate data is essential if the fleet operator is to operate its business efficiently and economically.

Time Division Multiple Access (TDMA) wireless networks, which are in use for many applications including digital cellular telephones and wireless local area networks, may be used for the communication between dispatchers and drivers. A TDMA network allows multiple users of a single channel or frequency by assigning specific time slots to each user to use exclusively for transmission. For optimal performance of TDMA networks, precise time synchronization between members of the network is required. Efficient use of bandwidth in the network requires that the gap times between transmissions of each user, which is wasted time, be minimized. An important component to the gap time is uncertainty of time in all the participants in the network. Synchronization of wireless networks is often very coarse, requiring large gaps between transmissions, if specialized hardware is not used. Moreover, synchronization of network elements to a precise reference like GPS based timing information involves having a GPS receiver located on each network element, both mobile and fixed, increasing installation costs and complexity for both fixed network infrastructure and mobile network devices, especially if navigation data provided by GPS is not required.

Precise time synchronization between all of the wireless devices in the network can be performed in a number of ways. Typically, a precise, stable time reference, such as one based on the Global Positioning System (GPS) or other time distribution services, is located within each wireless device or within just the fixed infrastructure of the network, with synchronization information being transmitted to the mobile units. In these cases, device or infrastructure costs are increased because timing equipment has to be distributed among several locations or devices and installed where space and access for maintenance are limited.

Transmitting as much information as possible in a given amount of bandwidth is an important design goal in any communications network. This is especially true in wireless networks in which available bandwidth is very limited and customer requirements for data throughput are immense. Operation on most wireless bands is subject to occupied bandwidth constraints, requiring the data signal to be contained in a vary narrow region of the electromagnetic spectrum. In TDMA networks, a challenge is to minimize the gap times between transmissions and the overhead associated with each data packet in order to send as much information bearing data over the network as continuously as possible. The present invention addresses these two requirements with digital filtering to control occupied bandwidth and data recovery by the receiving system that requires no synchronization patterns to be transmitted.

SUMMARY OF THE INVENTION

The primary goal of the fleet management system of the present invention (sometimes hereinafter called the PROTRAK system or the Galileo system (each of PROTRAK and Galileo, either alone or with various suffixes attached, is a trademark of Fleet Management Services, Inc. of Chandler, Ariz., to which the present patent application is assigned), the fleet management system, or simply the system) is to provide fleet management information to customers (i.e., the owners, operators, subscribers, or users of the fleet who seek to avail themselves of the advantages of a vehicle tracking, communication and fleet management system) to enable them to manage their assets more profitably. The system provides its customers with several means to accomplish this. First, the PROTRAK system gives the fleet operator the capability to locate vehicles of the fleet in real-time. Second, the system allows the operator to communicate with those vehicles over a very efficient and reliable wireless network—a time division multiple access (TDMA) wireless network. Third, the system enables the operator to receive timely, accurate data regarding what each vehicle of the fleet is doing, i.e., what operation(s) it is performing at any given time. Fourth, the system provides the operator with an ability to correlate the position and messaging information generated by the system with the operator's other management information systems to provide an integrated information source for improved fleet business management.

With respect to the latter, a fleet operator's existing management systems typically consist of accounting, human resources, inventory, and other systems which may not be well integrated. In addition, the operator may not have a reliable way to measure vehicle and driver performance which is critical to the operator's operations. The PRO-TRAK system provides the required vehicle and driver information together with a database management system that is capable of collecting such information and integrating it with data retrieved from the operator's other information systems in a database management application. This application can be used by the operator to generate reports that are tailored to its business and are based on all of the available data.

The PROTRAK system is particularly designed to operate in a market niche between cellular, specialized mobile radio (SMR), and paging services. The system may be used to track virtually any number of vehicles in a fleet across all metropolitan areas covered by the network.

Timely, accurate data can be made available to the fleet operator automatically by combining wireless data network technology, a wireless data computer (also referred to herein as a tracking computer, or simply a tracker), sensors, and dispatch and/or database reporting software and computers at the fleet operator's facilities to receive, display, and process the data provided by the vehicles. The vehicle computer has interfaces to various sensors that indicate operations being performed by the vehicle. Data provided by the sensors are processed by software algorithms in the computer to determine when events of interest occur. The event, relevant parameters, and the time of the event are then immediately transmitted through the wireless network to the fleet operator.

The network used to enable event driven status reporting is designed to provide frequent small packets of data from vehicles to fleet owners very efficiently. The network architecture is a unique, fill duplex design for metropolitan area operations. Data are transmitted to vehicles over a subcarrier on an FM radio station. Vehicles transmit their data using a TDMA protocol on a single UHF channel. Vehicle data are received by Network Hubs, which are receivers placed on commercial towers around the metropolitan area of interest. The received data are sent back to a Network Distribution Center (NDC, occasionally referred to herein as Network Control Center) via telephone lines and are relayed to the fleet owners via the Internet, telephone connection, or other preferably wireless means. Data sent to the vehicles by the owners is first sent to the NDC which sends it to transmitting equipment at the radio station via telephone lines.

The TDMA protocol in the network is controlled by servers in the NDC. The precise timing required by the TDMA network for efficient operation is controlled by a synchronization pattern contained in the subcarrier data broadcast that is received by the vehicles and the network hubs within the PROTRAK system. This enables all vehicles and hubs to have a common time reference that is accurate to about three microseconds. This, in turn, enables a multiplicity of (e.g., 50) vehicle reports in the TDMA network each second. The servers assign reporting intervals and time slots to vehicles so that they can send data and status changes automatically. Typical periodic updates of navigation data or other non-critical information are provided at two to three minute intervals; it is impractical for the vehicle computer (tracker) to wait for a periodic interval of that length to send time critical event data.

A total of 50 20-msec long time slots are available for periodic transmissions. Multiple vehicles share slots, the number depending upon the update rate of the slot. For example, 60 vehicles can share a one minute update interval slot. Slots not assigned to periodic updates are open for any vehicle to use to request access to the network. If more than one vehicle tries to use the same interval in a particular slot, both may still be heard if each is heard by a separate hub receive site. Otherwise there is a collision (interference) of data, and the vehicles involved must retry their requests.

According to an aspect of the invention, a method and apparatus are disclosed for automatically determining and reporting events from a vehicle to an owner or dispatcher of the vehicle at a remote location. Events to be reported are changes in status of vehicle operation, location, or measurements of vehicle systems or cargo. A computer (tracking computer, generally referred to herein as the tracker) installed on the vehicle is connected to various sensors which measure parameters of interest to the dispatcher or owner and reports critical changes in parameters over the wireless TDMA network. Computers at a fixed location display these status changes for use by the dispatcher or record the data for later analysis. Software in the tracker in the vehicle together with data supplied by what may be a small number or a wide variety of sensors allows multiple, complicated, and abstract status events that are relevant to specific vehicle or industry applications to be determined and reported by the tracker. Automatically generated reports from the trackers provide more accurate and timely data to the fleet management offices of the customer than is available from the drivers of the vehicles.

The tracking computer has navigation hardware and software for determining the location, speed, and direction of travel of the vehicle in which it is installed. The application software used by operators to receive data from their vehicles also enables them to send "site dispatch" commands to the trackers which indicates a rectangular region to be used to indicate where events such as "load," or "unload," for example, should take place. Location information is then combined with the sensor data in the algorithms to determine event sequencing, provide exception reporting to indicate that the vehicle performed a specific action at the wrong location, performed unauthorized stops on the way to or from a job, or other events specific to a particular business or industry.

In an exemplary embodiment of this aspect or feature of the invention, three basic components are combined to enable vehicle data to be useful to the fleet operator, namely: (1) sensors on the vehicle to measure parameters to be combined in a computer to automatically determine when events of interest occur, (2) a wireless network that allows prompt, economical transmission of small packets of data containing event status to the fleet operator, and (3) software applications to store and further process event information for improved asset management by the fleet operator.

The tracker has several inputs and outputs to allow it to sense and control numerous vehicle functions simultaneously, with configurable interfaces that include serial interfaces, analog inputs, discrete inputs, discrete outputs, and an interface for pulse measurement or clock outputs. The tracker also has dedicated interfaces for measuring battery voltage, ignition, speed, and reverse. These enable measurement of a wide variety of vehicle functions, either directly or through auxiliary sensor modules that provide data to the computer serial interfaces. The outputs allow control of vehicle functions remotely, through the wireless network.

Tracker software permits processing and integration of various sensor inputs to enable higher level or abstract status events to be determined and reported. For example, in a "loading" status for a ready mix truck, a loading is determined from a number of inputs by combining truck location at the plant, truck stationary, and truck drum rotating in the charge direction at a speed greater than a predetermined minimum speed for a minimum time interval. Examples of other status events include "ambulance emergency lights on" or "four wheel drive engaged," which, as with other simpler status events, are simply detected and reported.

The tracker reports events over the wireless network whose architecture and protocols are tailored for prompt reporting of events while concurrently supporting slower, periodic update intervals for less critical data. As noted above, the network uses a TDMA protocol to enable a large number of vehicles to send short data packets frequently on a single wireless channel. Data is sent to the vehicles over a subcarrier on an FM broadcast channel. An important aspect of the invention is the provision of precise time synchronization required for the TDMA protocol over the FM link to the vehicles and receive sites. In the exemplary embodiment, as many as fifty vehicles per second can report data at a variety of update intervals ranging between five seconds and one hour.

Typical periodic updates of navigation data and other non-critical information are provided at two to three minute intervals. However, it is not practical for the tracker to wait for periodic intervals of that length to send time critical event data. Accordingly, for such events, the network maintains a number of time slots for additional access to the network on request of any vehicle needing to transmit event data. The requesting vehicle is then granted sufficient auxiliary reporting times at twelve second intervals to send its data. The total latency between an event being detected and the transmission of data is kept under thirty seconds.

Owners and dispatchers of fleet vehicles are provided with computer software applications that enable connection of their desktop PC's to the TDMA network using the Internet or other means. Data furnished from the vehicles are routed to these applications by the network servers, and are also stored in a local database. One of these software applications allows viewing the vehicle locations as icons on a map displayed on a monitor, showing event changes for each vehicle on the map in real time as they occur, and also enables the dispatcher to send messages or dispatch locations to the vehicles. Automated events may be provided as well to other dispatch or vehicle management applications, as required. Advantageously, these applications integrate vehicle event data with other systems utilized in the fleet operator's business, such as order entry and call management. Reports on vehicle events may be generated from these applications over the Internet from data stored in the network database.

According to another of its aspects, the present invention minimizes infrastructure cost for time references in the TDMA wireless network and locates the time reference in a central network control facility that is easily maintained and monitored. The time reference uses GPS referenced time, and TDMA network time is held in synchronization to the GPS reference by a wireless phase lock loop (PLL), removing the requirement to locate the time reference within the wireless transceiver devices or infrastructure elements. This aspect of the invention enables precise time synchronization of all wireless network elements by using special timing hardware and by distributing a single, remote GPS based time reference throughout the network using a wireless PLL.

Digital data is remotely synchronized in the TDMA network, a full duplex system designed to efficiently transmit short bursts of data from mobile vehicles to their owner on a frequent basis. Vehicles transmit data using a TDMA protocol in the UHF frequency band in precisely controlled time slots at a rate of 50 vehicles per second. Vehicles send location, status, and message data to the fleet owners or dispatchers who are connected to the wireless network through the Internet or other means. Data transmitted to the vehicles is broadcast over a subcarrier of an FM radio station, including network timing and control information as well and messages and information from fleet operators.

Timing of the TDMA portion of the network is controlled from a central network control facility that houses the servers which control vehicle access to the network and manage fleet owner connections to the network. Synchronization of the vehicle devices and fixed hub receiver systems that receive vehicle data is maintained through synchronization information contained in the FM subcarrier broadcast. The FM subcarrier timing data is, in turn, referenced to a GPS based time source at the network control center.

A Subcarrier Control Computer (SCC), responsible for providing the data to the subcarrier modulator, is located at the FM radio station transmitter or studio facilities. It clocks the transmit data at precise intervals based on timing commands from a Network Timing Control Computer (NTCC), located at the network control center. The NTCC and SCC are connected through a modem for data and timing control commands sent to the SCC. The NTCC computes timing commands based on the synchronization information from a GPS receiver time reference and that from an FM subcarrier receiver which receives data from the SCC. The difference in time from the GPS time reference and the received synchronization data over the FM subcarrier is processed by the NTCC using a PLL algorithm to generate a timing correction which is sent to the SCC.

This wireless PLL timing control loop enables a single, remotely located time reference to synchronize the TDMA network. In addition, the feedback inherent in the control loop allows the system to compensate for variations in FM radio station group delay so that the broadcast synchronization data is applicable at the FM antenna. This is important for large networks based on this technology that require multiple FM stations to cover overlapping geographical areas, because it enables the FM stations to be synchronized.

The invention also relates to bandwidth optimizations for the transmission of data over wireless TDMA data networks. The invention minimizes occupied bandwidth in a wireless channel by digitally filtering the data to be transmitted before modulation. The filter is implemented in a low-cost microcontroller, which replaces each edge in a digital square wave data stream with transitions that have the shapes of rising or falling sine waves. This has the advantages of reducing higher harmonics in the data signal, especially at the highest data rate, where the square wave is effectively replaced by a sine wave. Another aspect of the invention maximizes the efficiency of the TDMA network by refraining from sending any special bit synchronization information in addition to the data. In most systems, a large number of bits is devoted to synchronization, framing, or data clock recovery. In one aspect of the present invention, the bit clock and data synchronization are performed by the receiver by using forward error correction algorithms, special bit interleaving, and high performance digital signal processing hardware and software. Still another aspect of the invention uses space diversity combining between multiple receive sites to improve the reliability of receiving data. More reliable data reception saves bandwidth by reducing the number of retries required to move data through the network.

BRIEF OF THE DRAWINGS

The above and other aims, objects, features, aspects, and attendant advantages of the invention will become apparent from the following detailed description of the presently contemplated best mode of practicing the invention, with reference to presently preferred exemplary embodiments and methods thereof, in conjunction with the accompanying drawings, in which.

Figure 15:
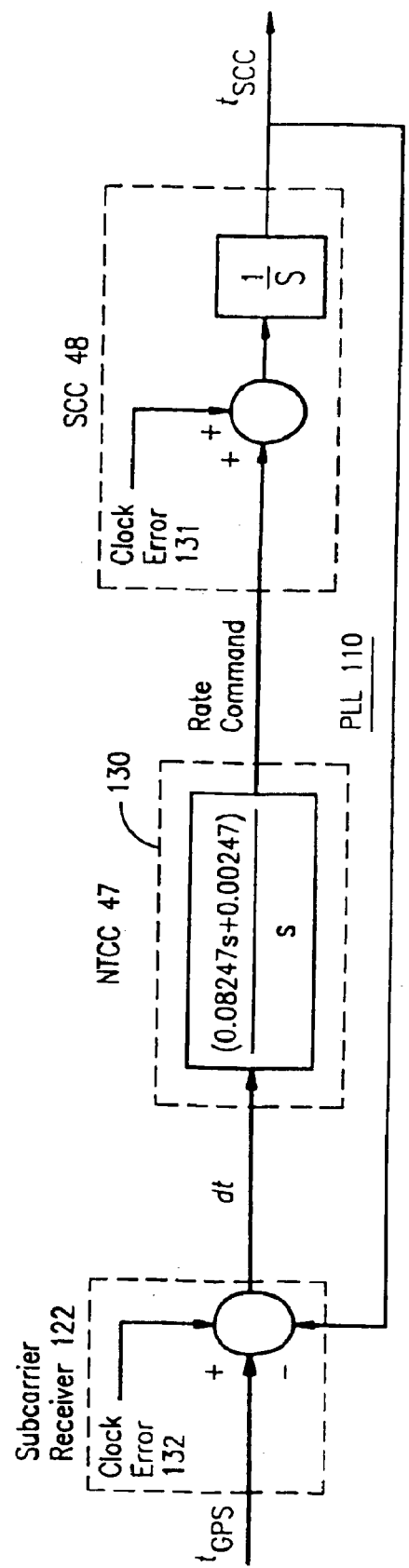
Figure 16:
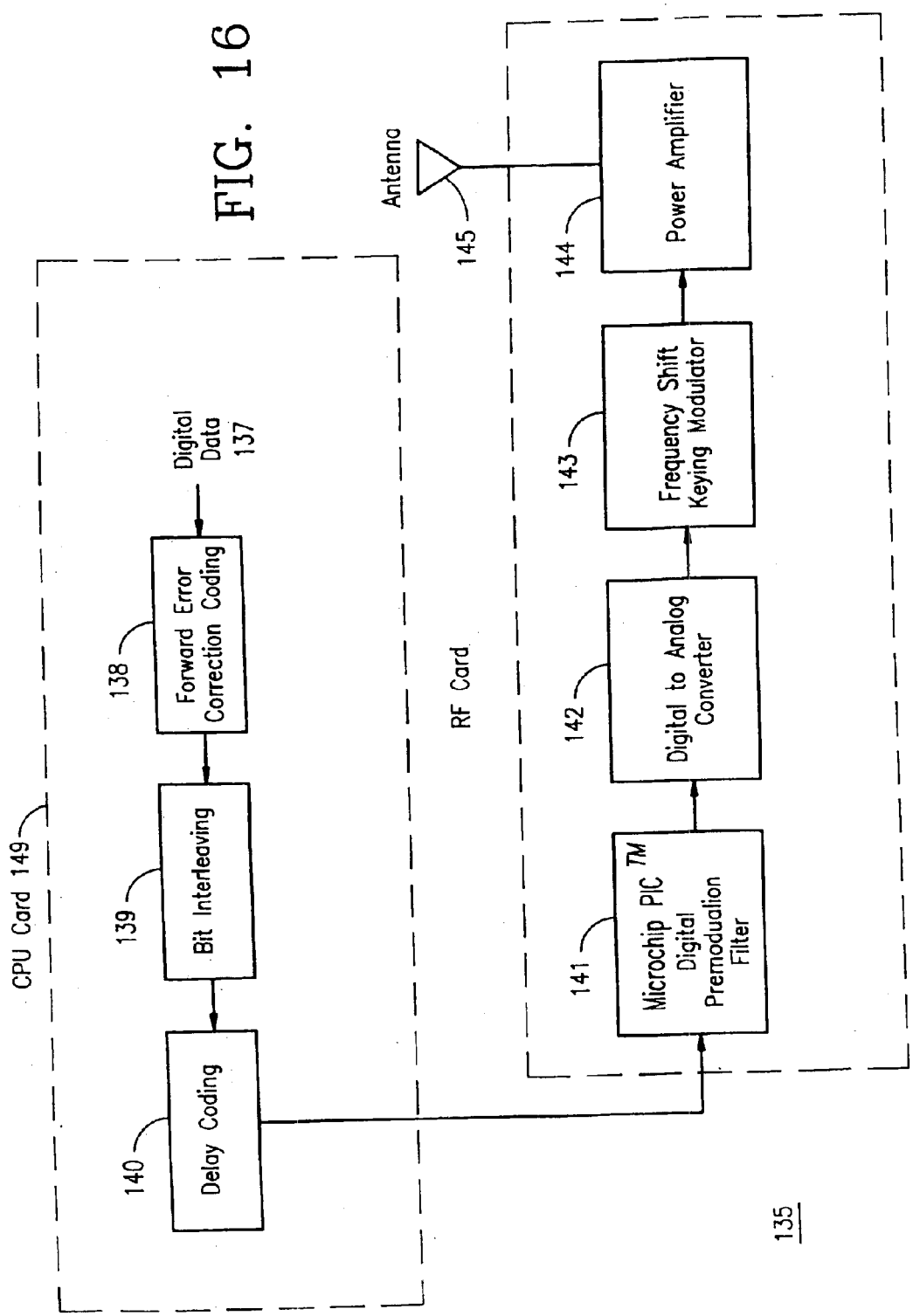
Figure 18:
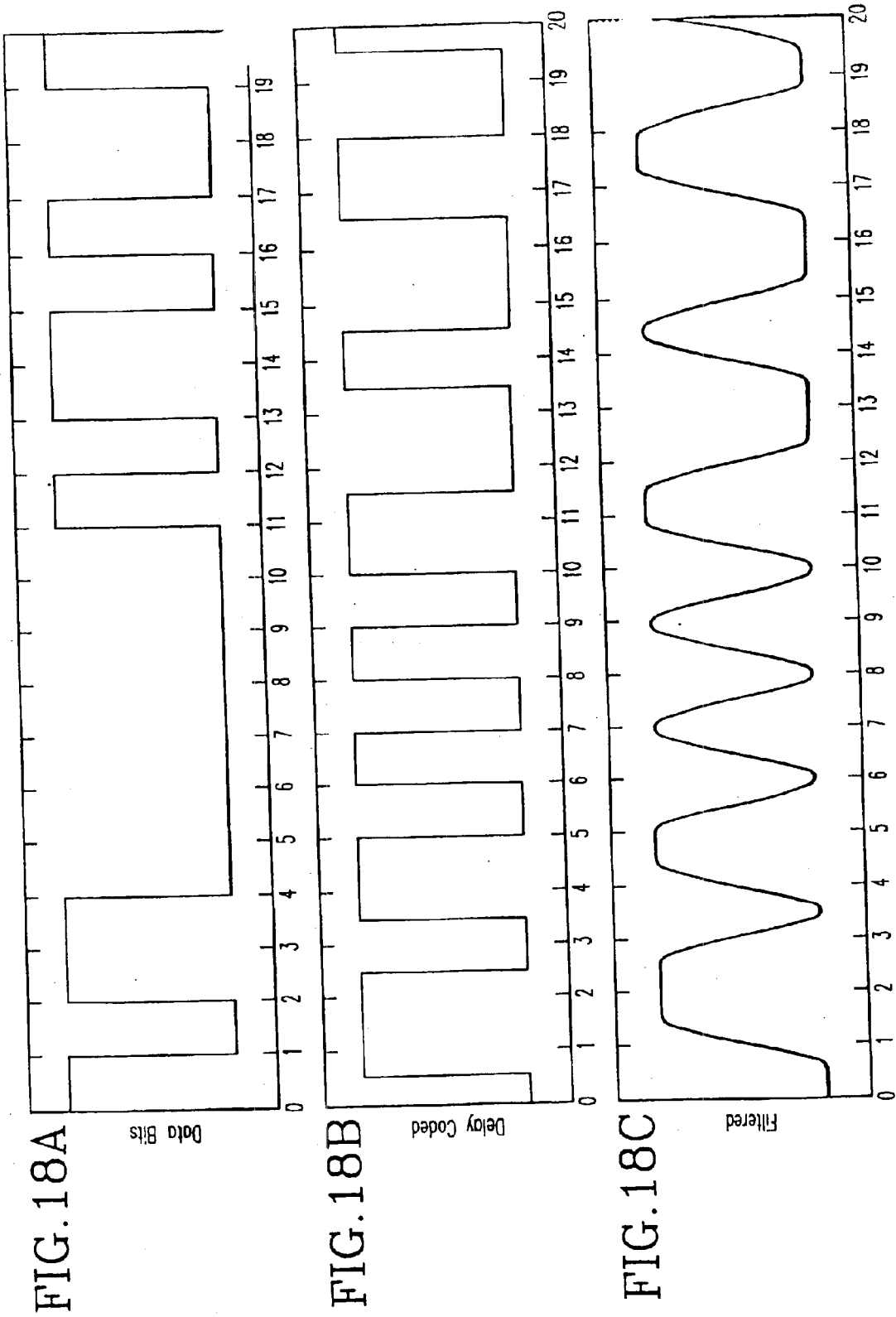
Figure 19:
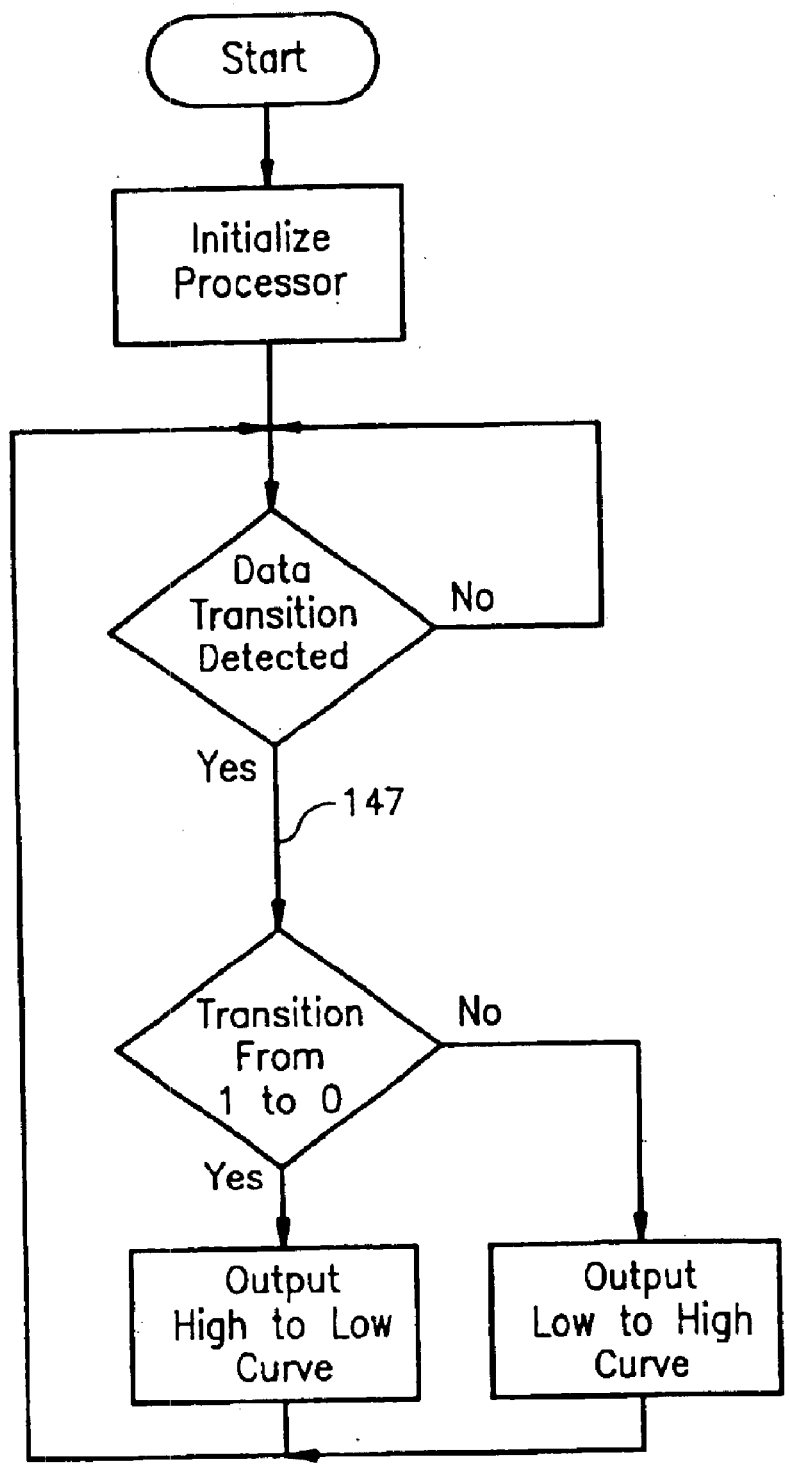
Figure 20:
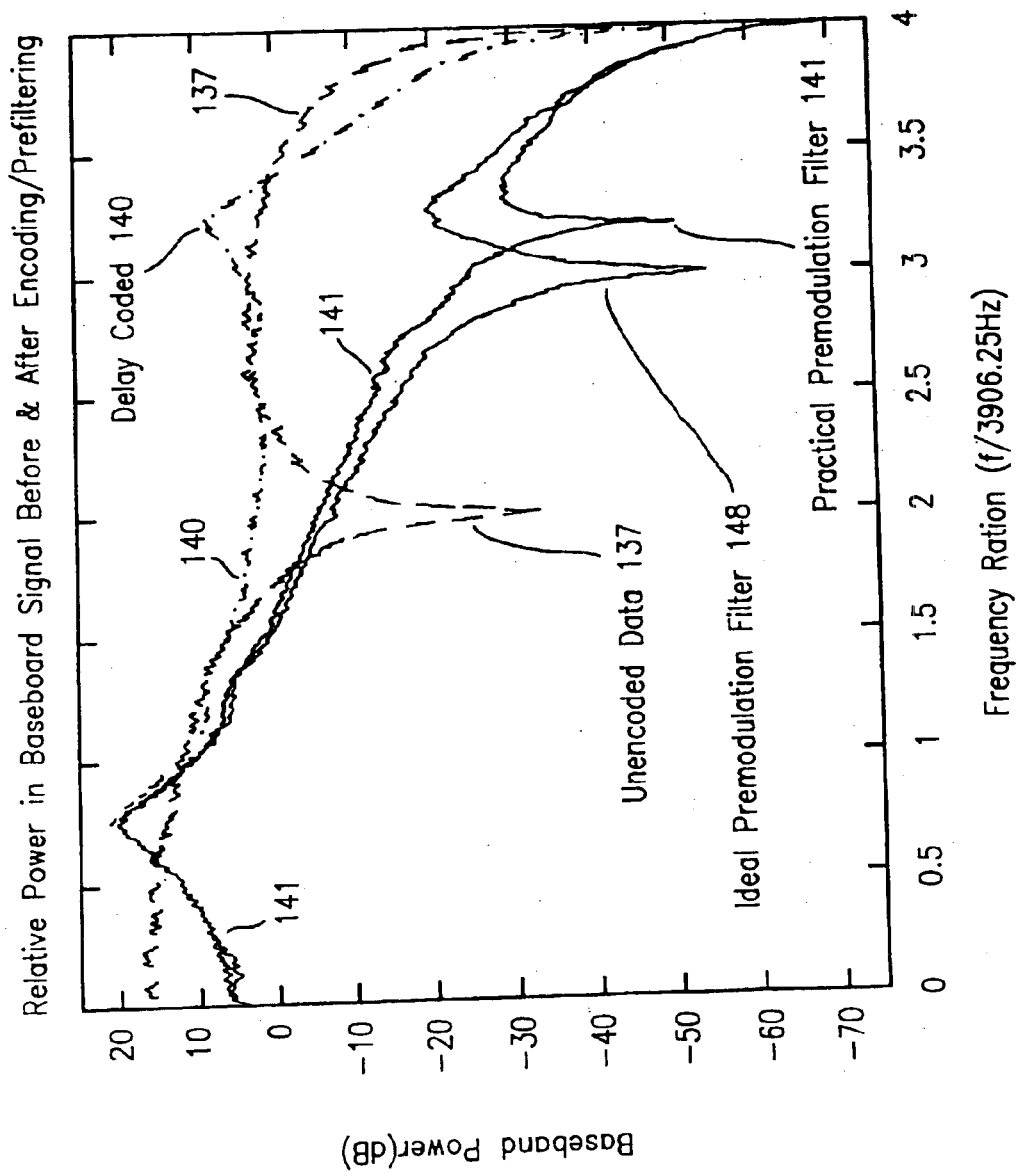
Figure 21:
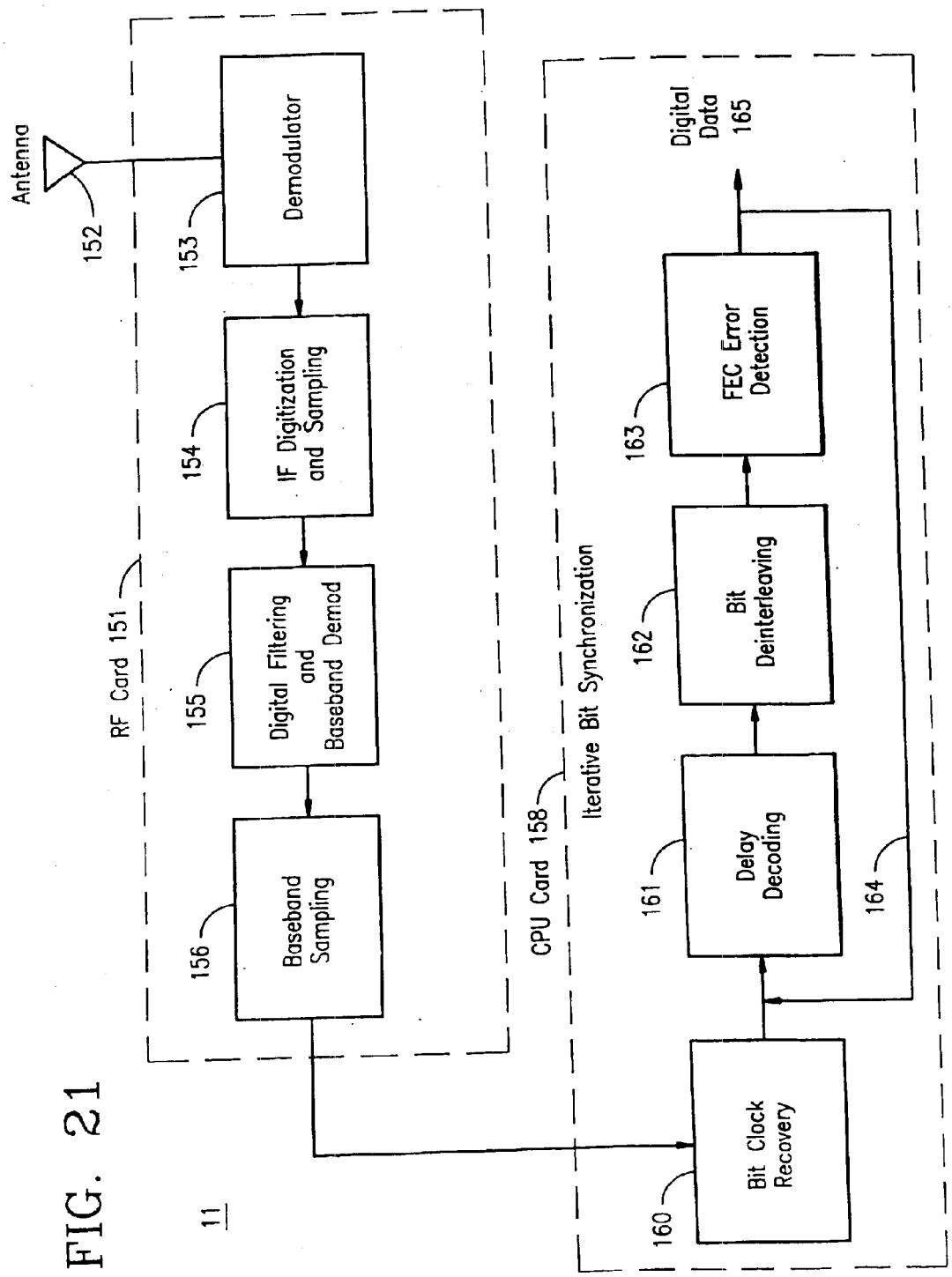
Figure 22:
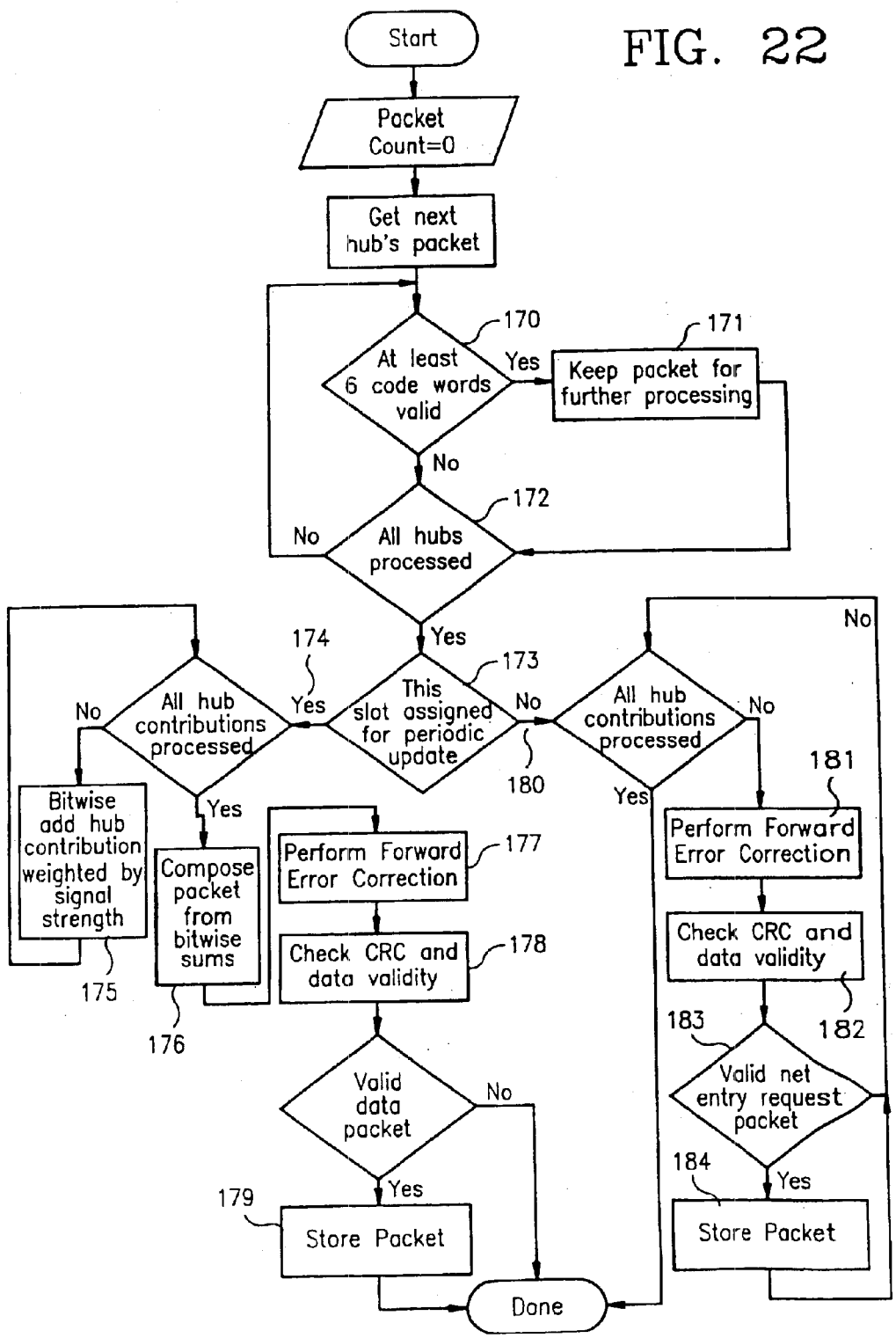
Figure 23:
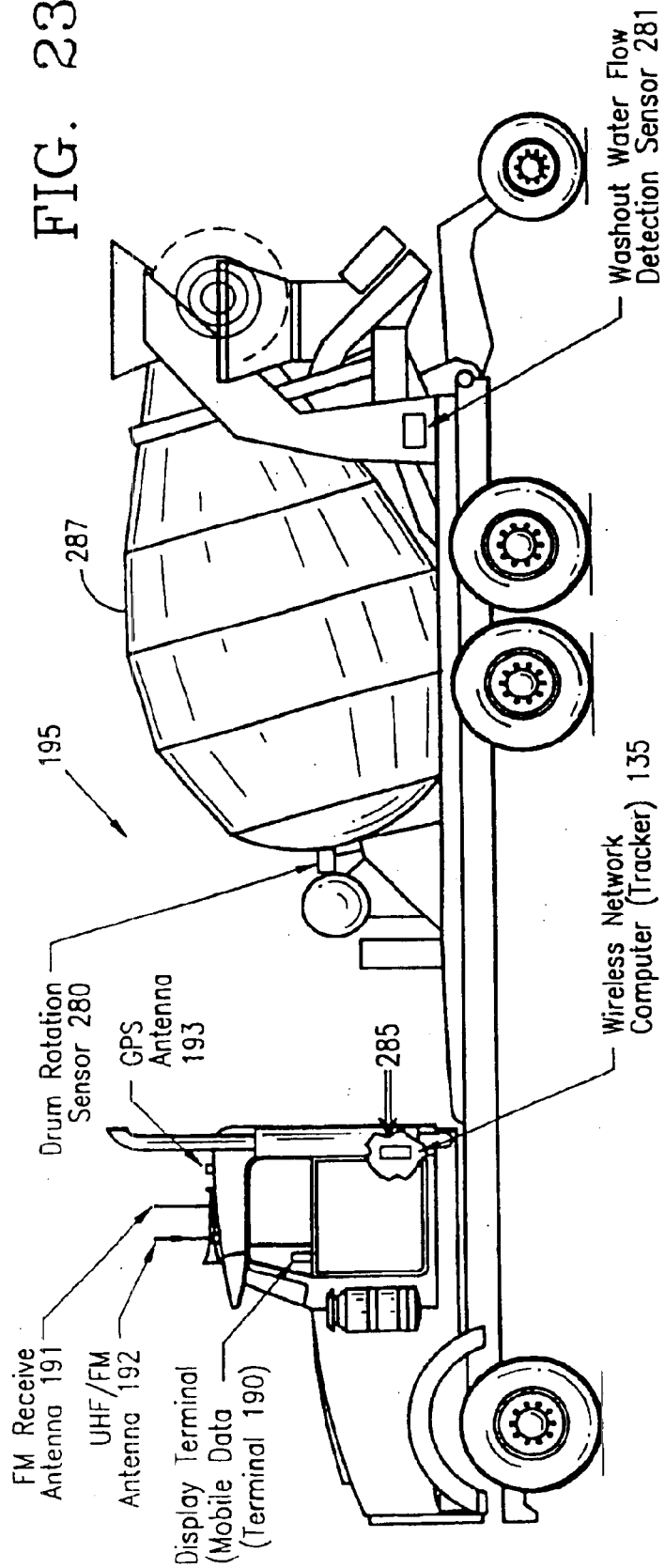
Figure 24:
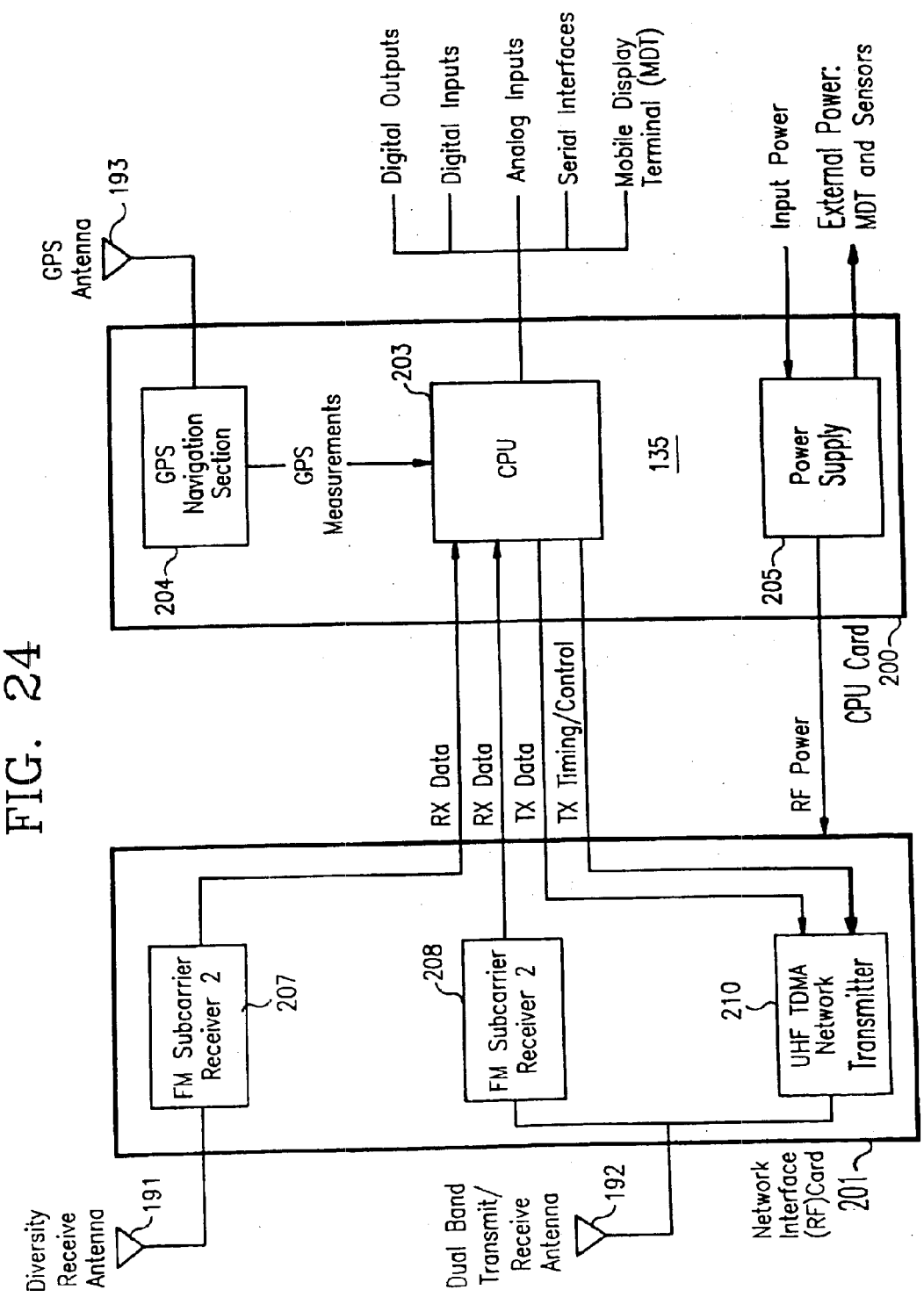
Figure 25:
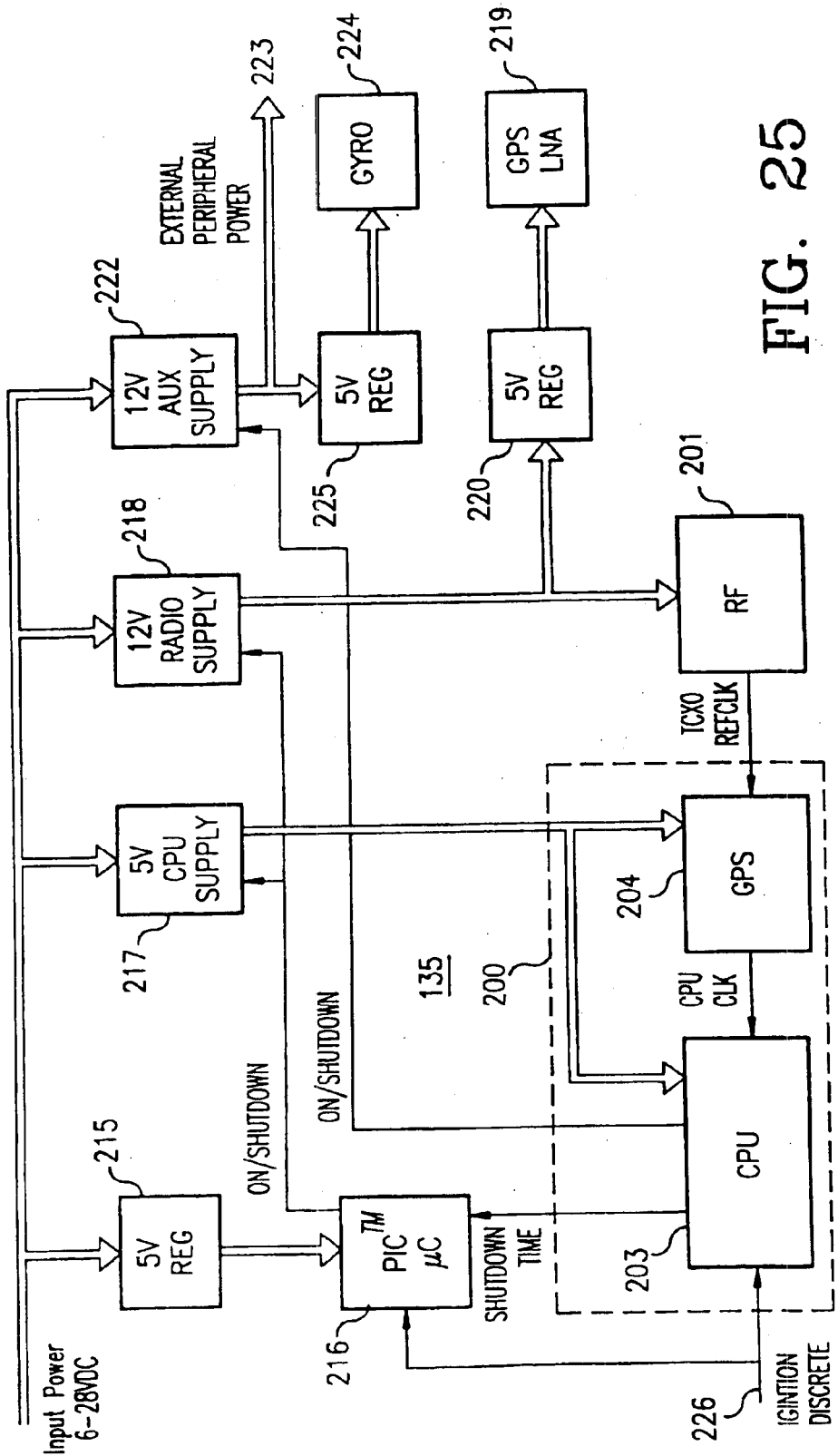
Figure 26:
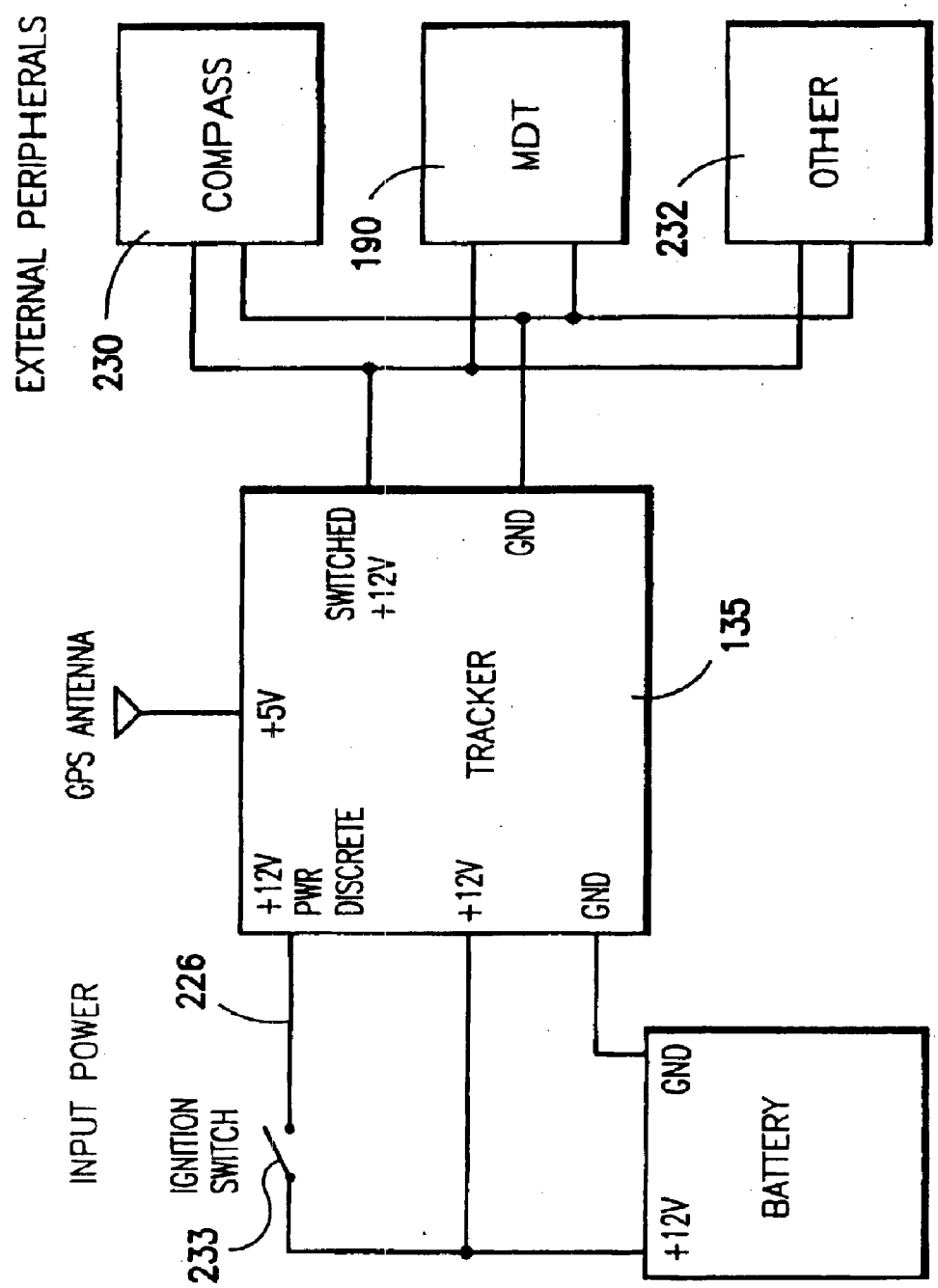
Figure 27:
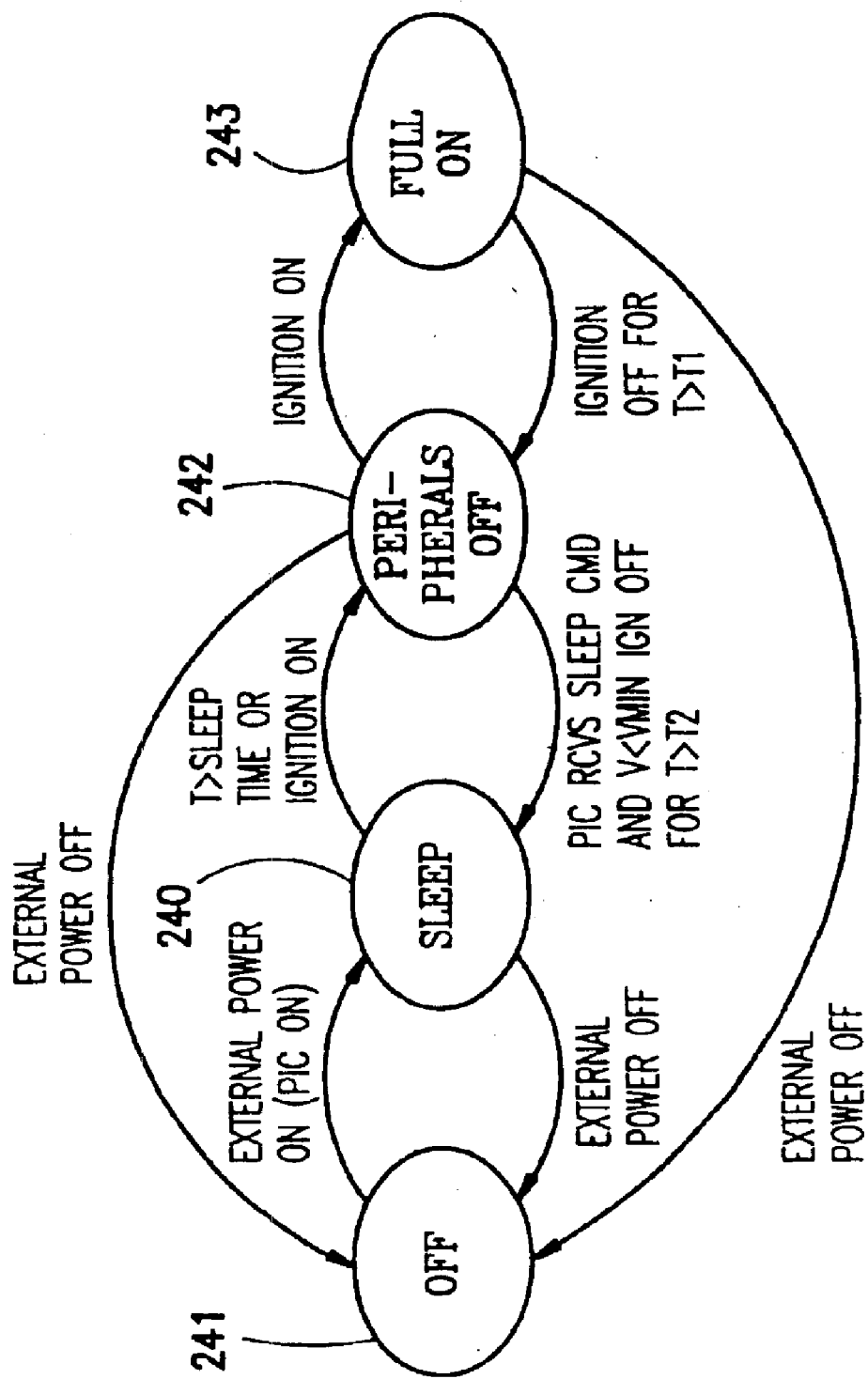
Figure 28:
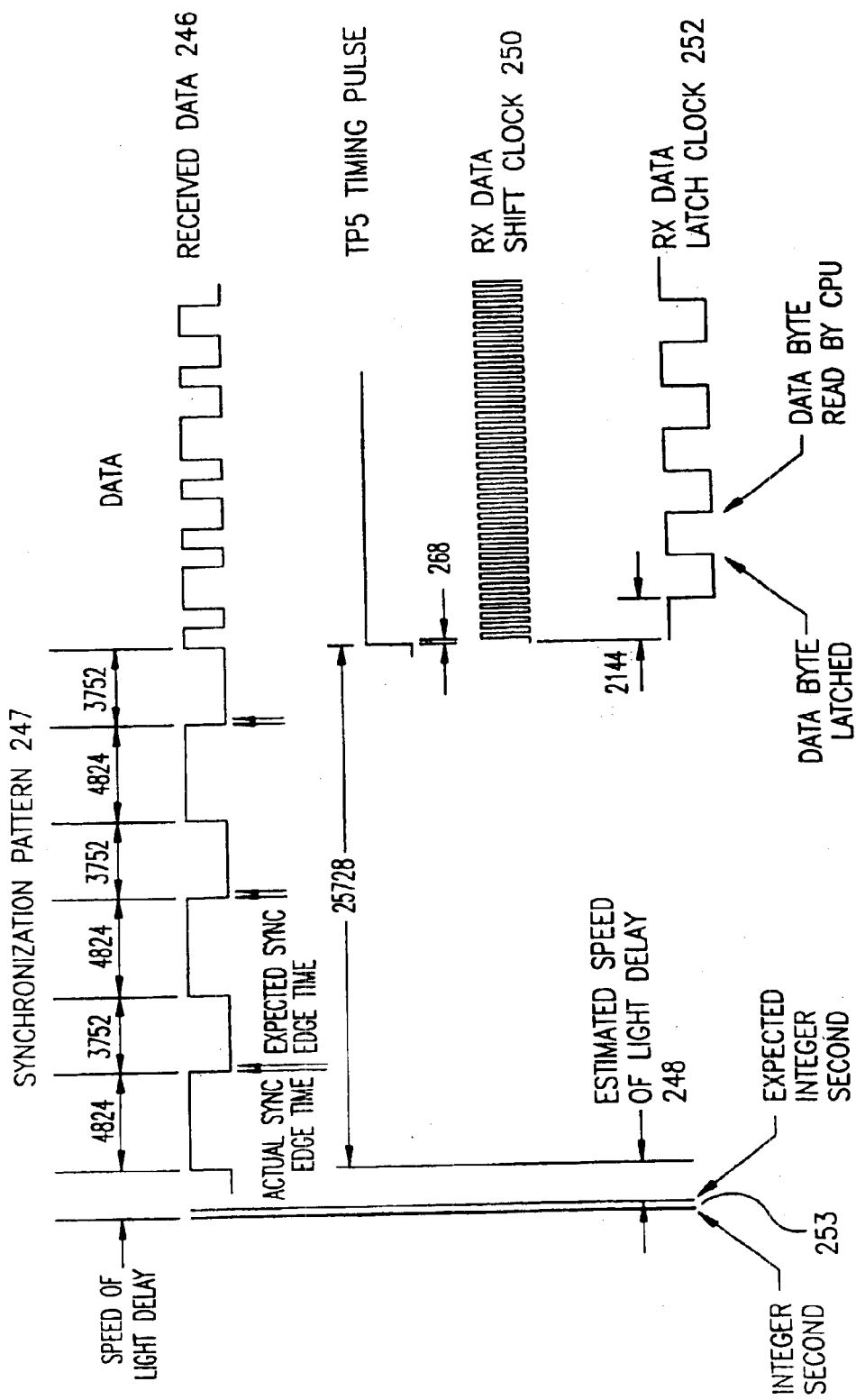
Figure 29:
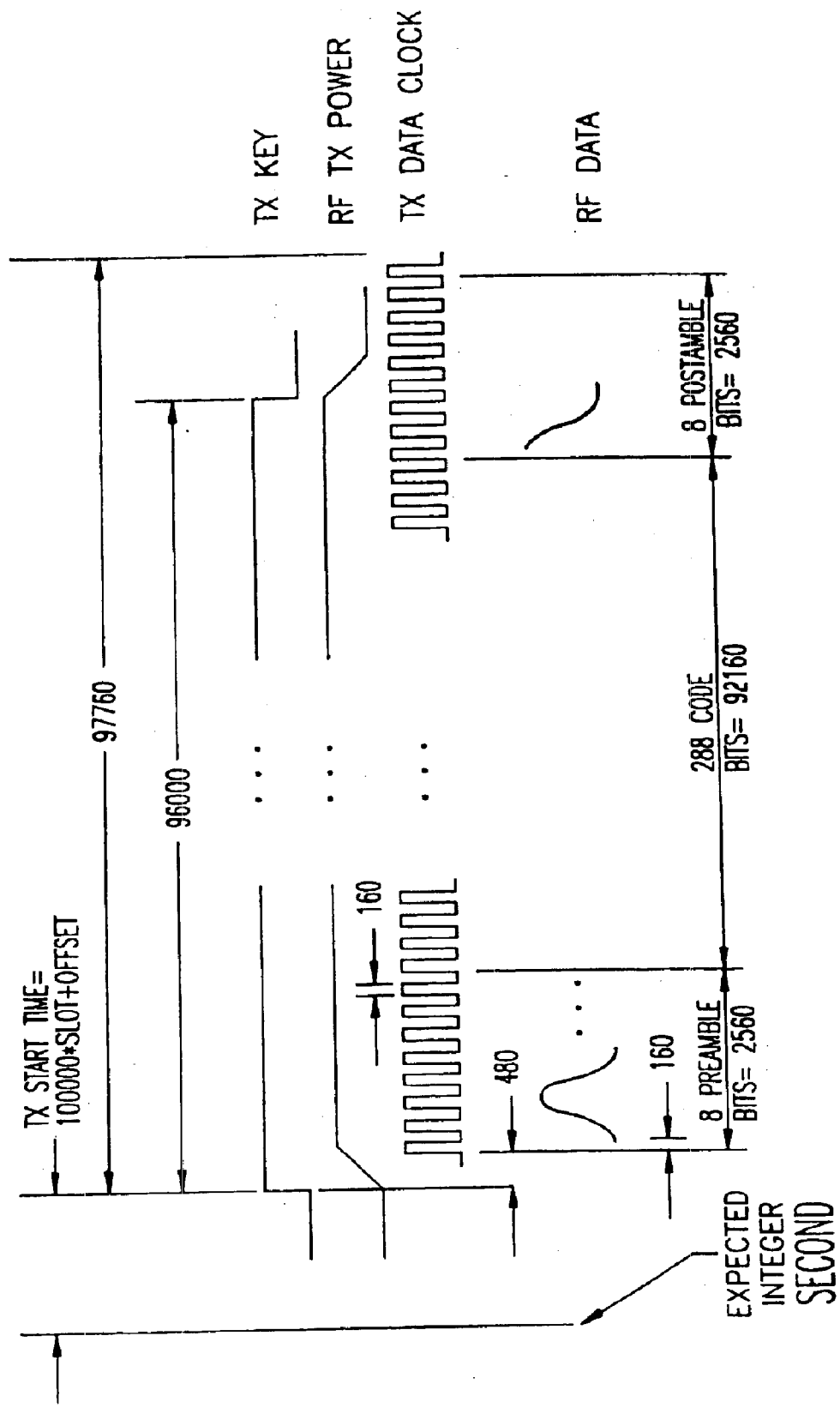
Figure 30:
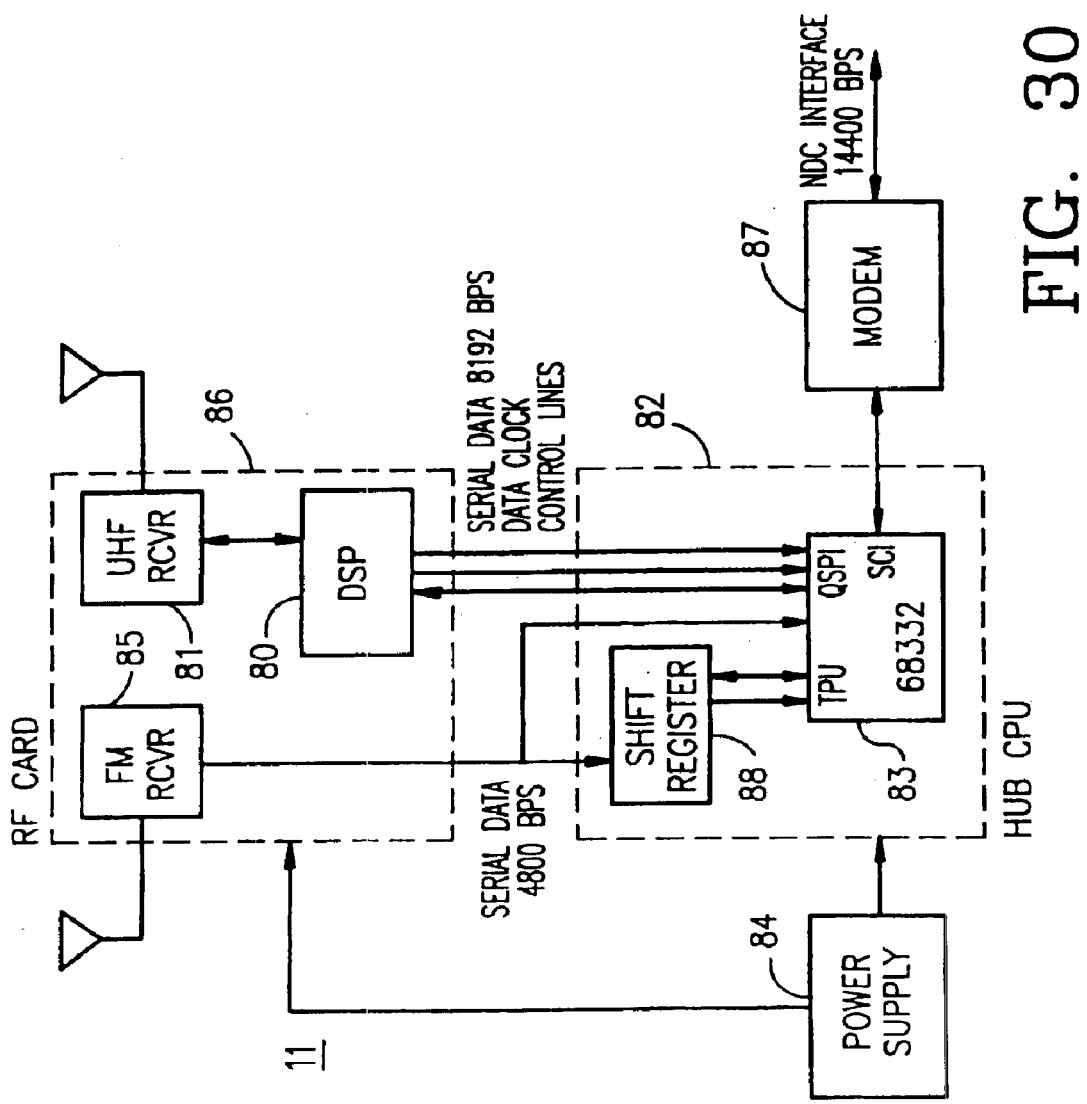
Figure 31:
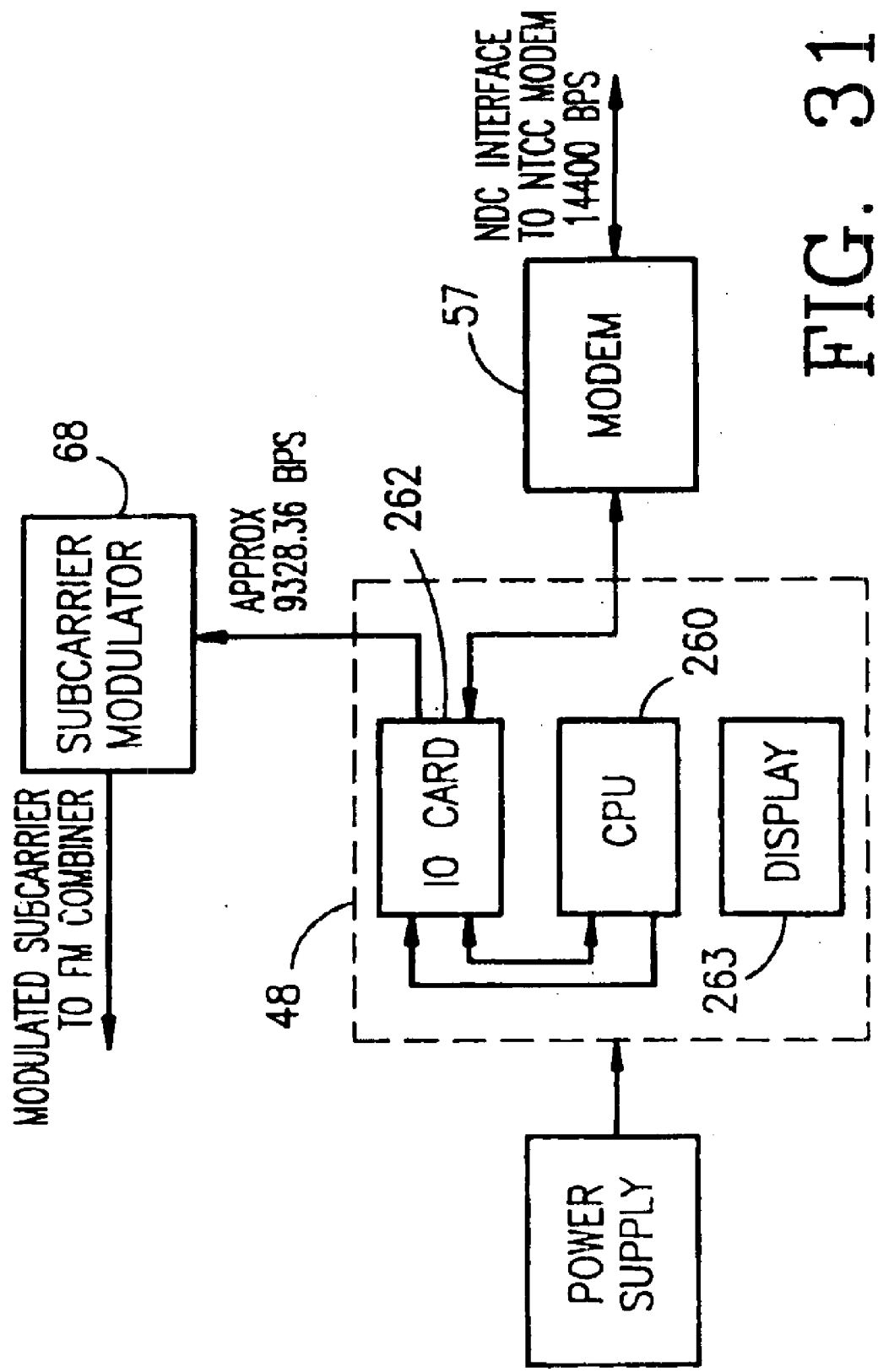
Figure 32:
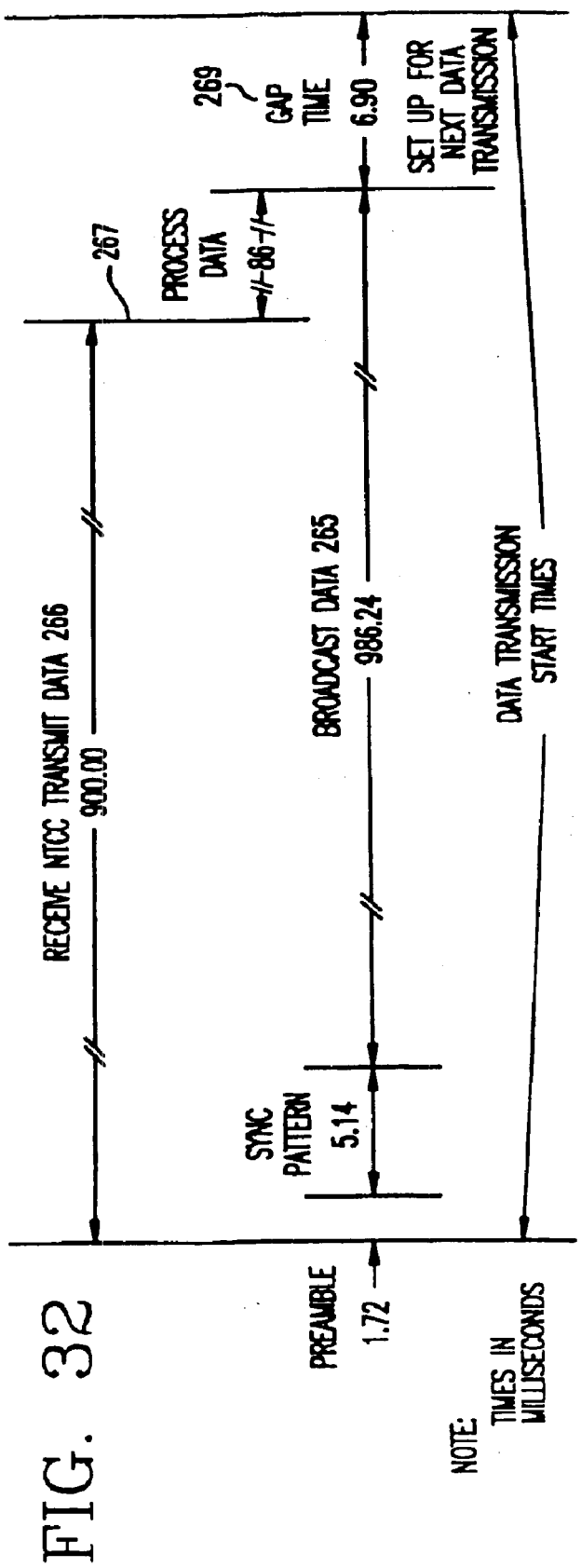
Figure 33:
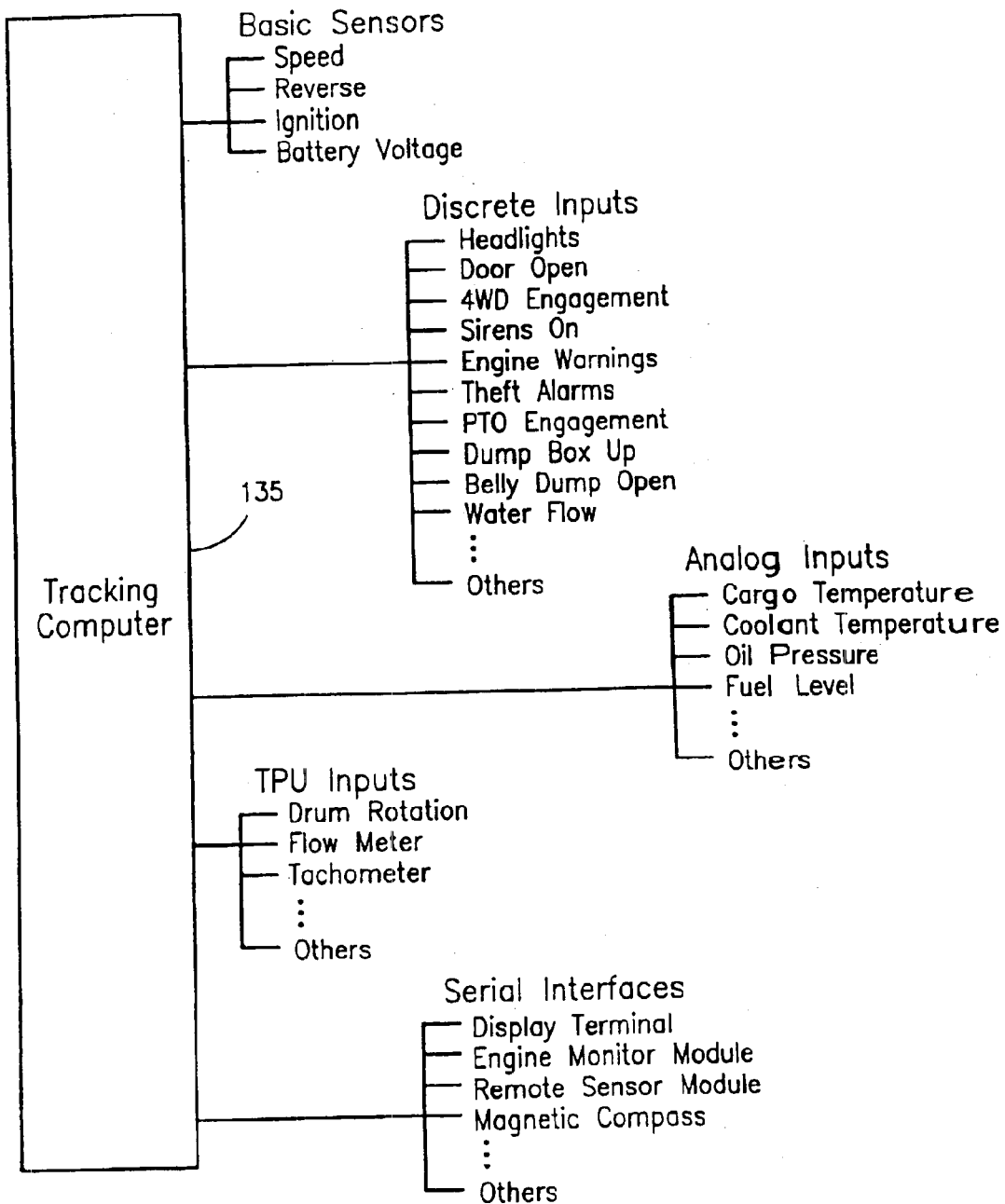
Figure 34:
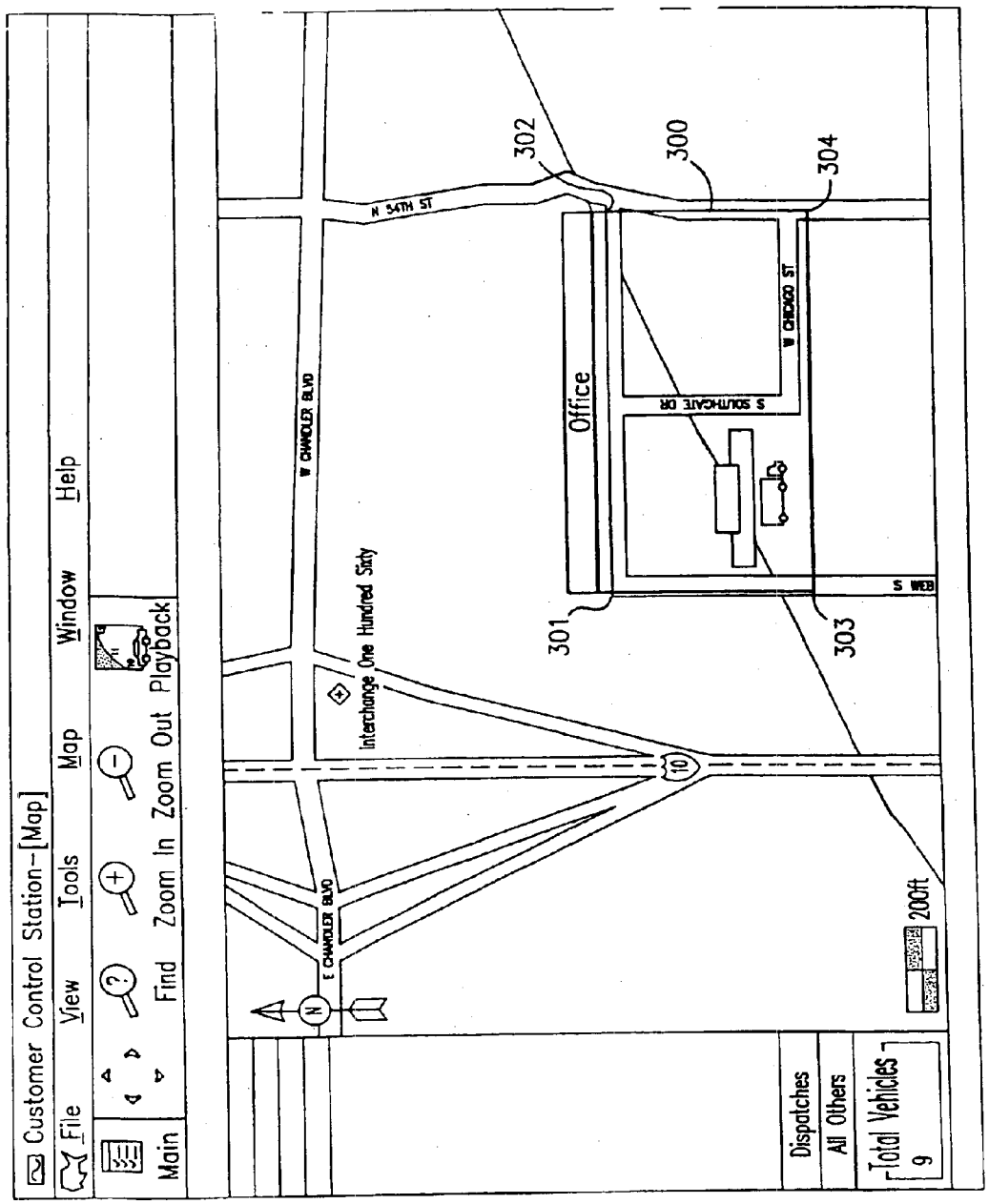
Figure 35:
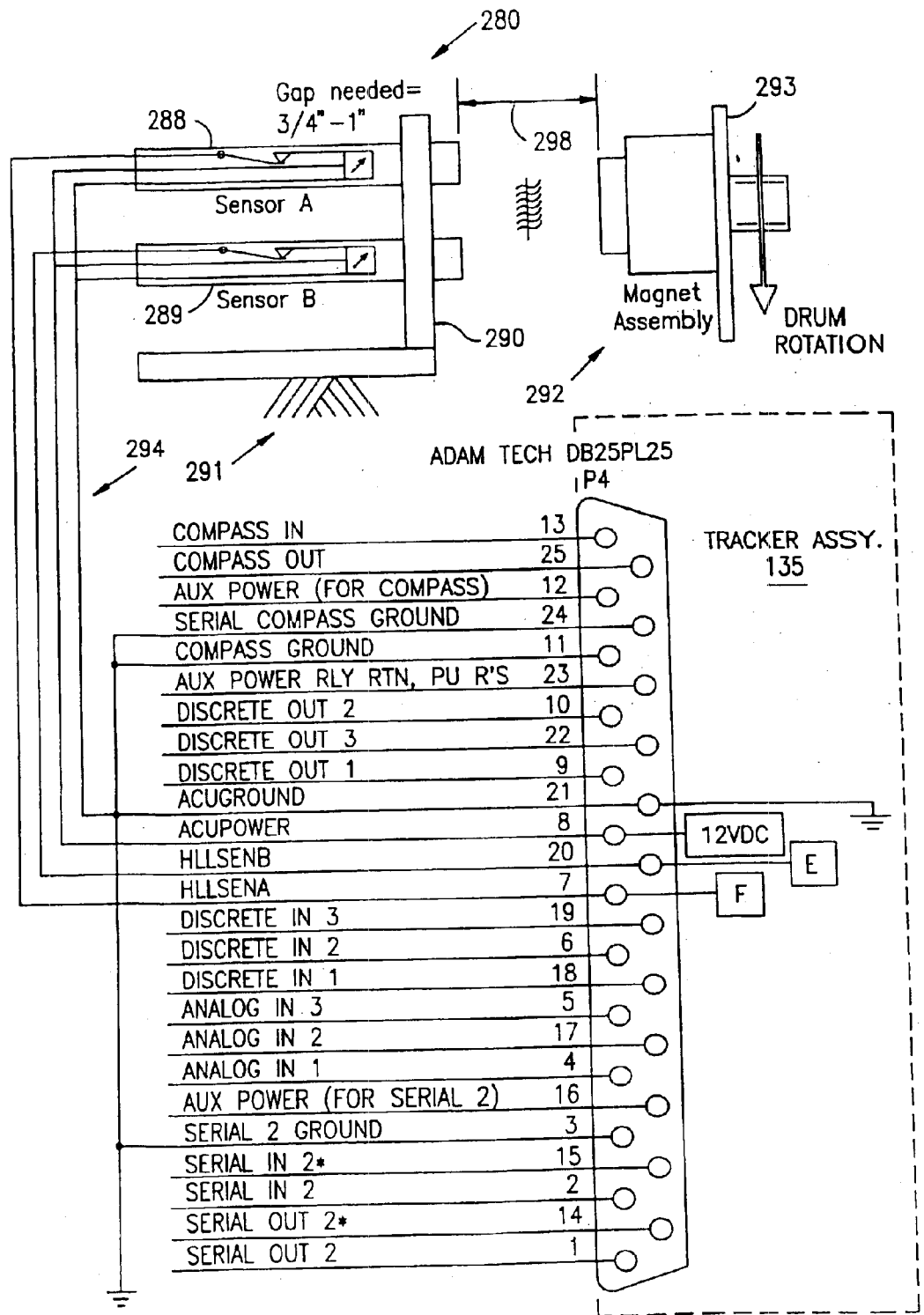
Figure 36:
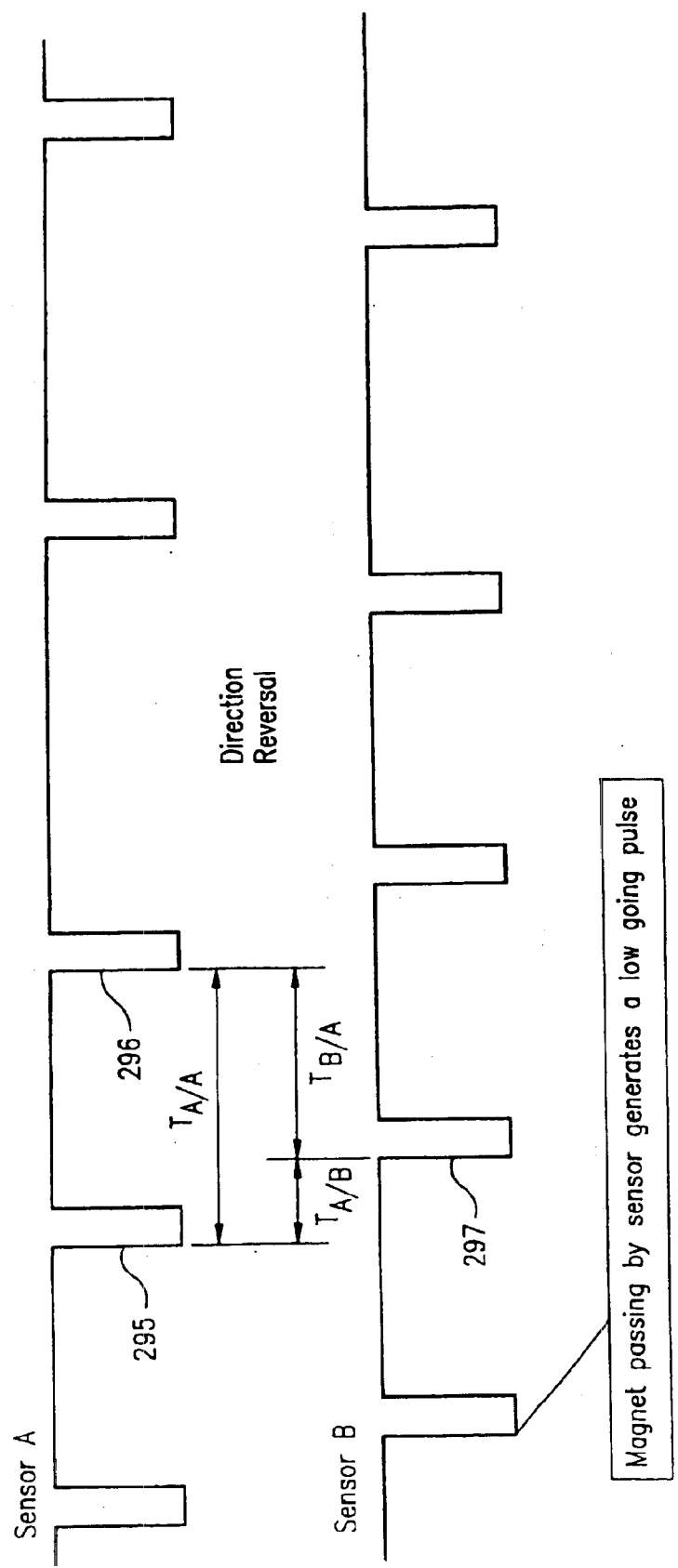
Figure 37:
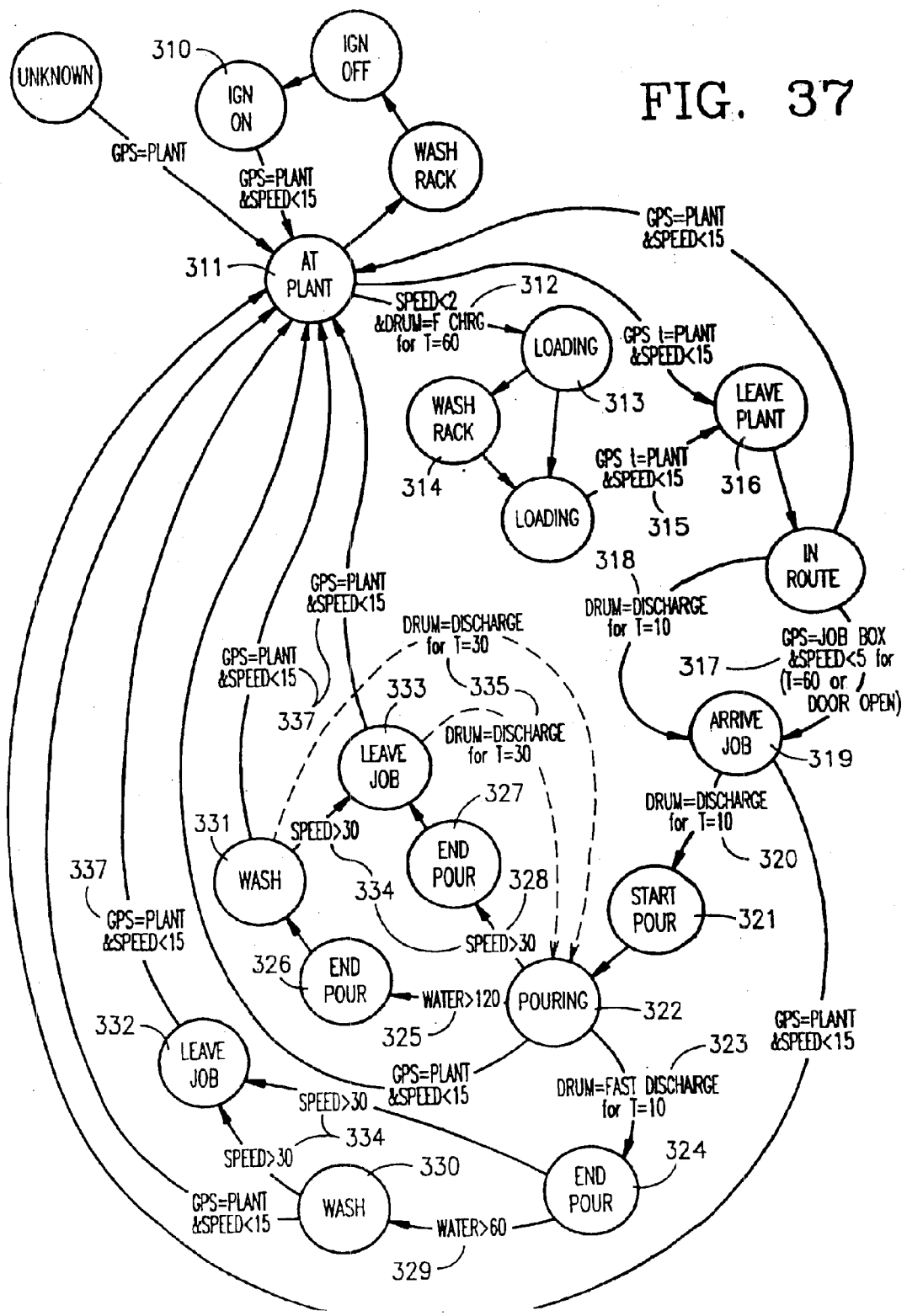
Figure 38:
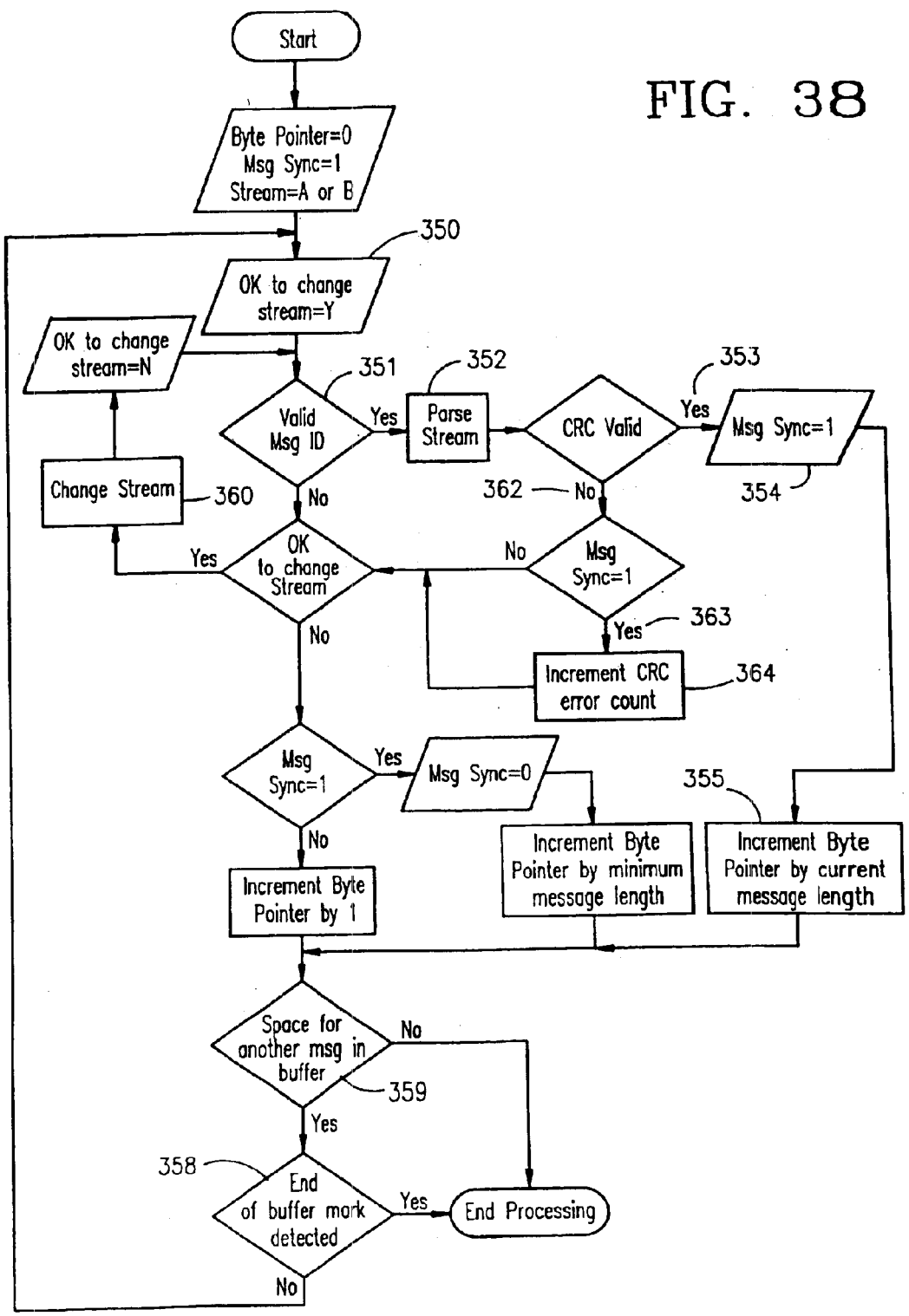

FIGS. 14A–D are flow charts of timing control loop processing performed in operational modes of the NTCC software synchronization of the TDMA network to GPS time;

FIG. 15 is a block diagram (mathematical) of the timing control loop;

FIG. 16 is a block diagram of the transmit TDMA data processing performed by the tracking computer (tracker) installed in a fleet vehicle;

FIG. 17 is a table illustrating the TDMA transmit data interleaving pattern;

FIGS. 18A–C are diagrams comparing an original TDMA data sequence to the delay coded version of that sequence, and also illustrating premodulation filtering of the delay coded sequence;

FIG. 19 is a flow chart of the filtering algorithm performed by a specially selected microcontroller which implements premodulation filtering for the result shown in FIG. 18C;

FIG. 20 is a diagram representing a comparison of the approximate relative power spectrums of the unencoded, delay coded, and filtered data of FIGS. 18A–C;

FIG. 21 is a block diagram that illustrates the receive TDMA data processing performed by the Network Hub receiver, FIG. 22 is a flow chart of the space diversity algorithm used by the NDC server to combine vehicle data received by the network hubs;

FIG. 23 illustrates an exemplary placement of the tracker, a Mobile Data Terminal (MDT) and antennas on a typical fleet vehicle, the vehicle being further equipped for accommodating various sensors for event reporting;

FIG. 24 is a simplified block diagram of a tracker installed in a vehicle of FIG. 23;

FIG. 25 is a block diagram of the internal power distribution to the tracker;

FIG. 26 is a block diagram of the tracker power distribution summary;

FIG. 27 is a diagram of the power mode state transition logic of the tracker,

FIG. 28 is a synchronization timing and data clocking diagram for the tracker and Network Hubs;

FIG. 29 is a timing diagram of tracker data transmissions;

FIG. 30 is a simplified block diagram of a Network Hub;

FIG. 31 is a simplified block diagram of a Subcarrier Control Computer (SCC);

FIG. 32 is a diagram of the NTCC/SCC data flow;

FIG. 33 is a diagram illustrating various sensors, inputs, outputs and interfaces to the tracker of FIG. 24;

FIG. 34 is an exemplary rectangular zone on a stored map used to determine and display the tracker's location (in particular, that of the vehicle in which the tracker is mounted);

FIG. 35 is a simplified block diagram of a drum rotation sensor used for a ready-mix concrete truck;

FIG. 36 is a timing diagram of the pulses resulting from the interaction of sensor and magnets on drum rotation, for the sensor embodiment of FIG. 35;

FIG. 37 is a state transition diagram that defines logic used by the tracker to combine sensor and navigation data to automatically derive status of a ready-mix concrete truck, and FIG. 38 is a flow chart of a preferred diversity algorithm used by the tracker for recovering corrupted data.

DETAILED DESCRIPTION OF THE EMBODIMENTS AND METHODS

I. The Overall PROTRAK System

Figure 1:
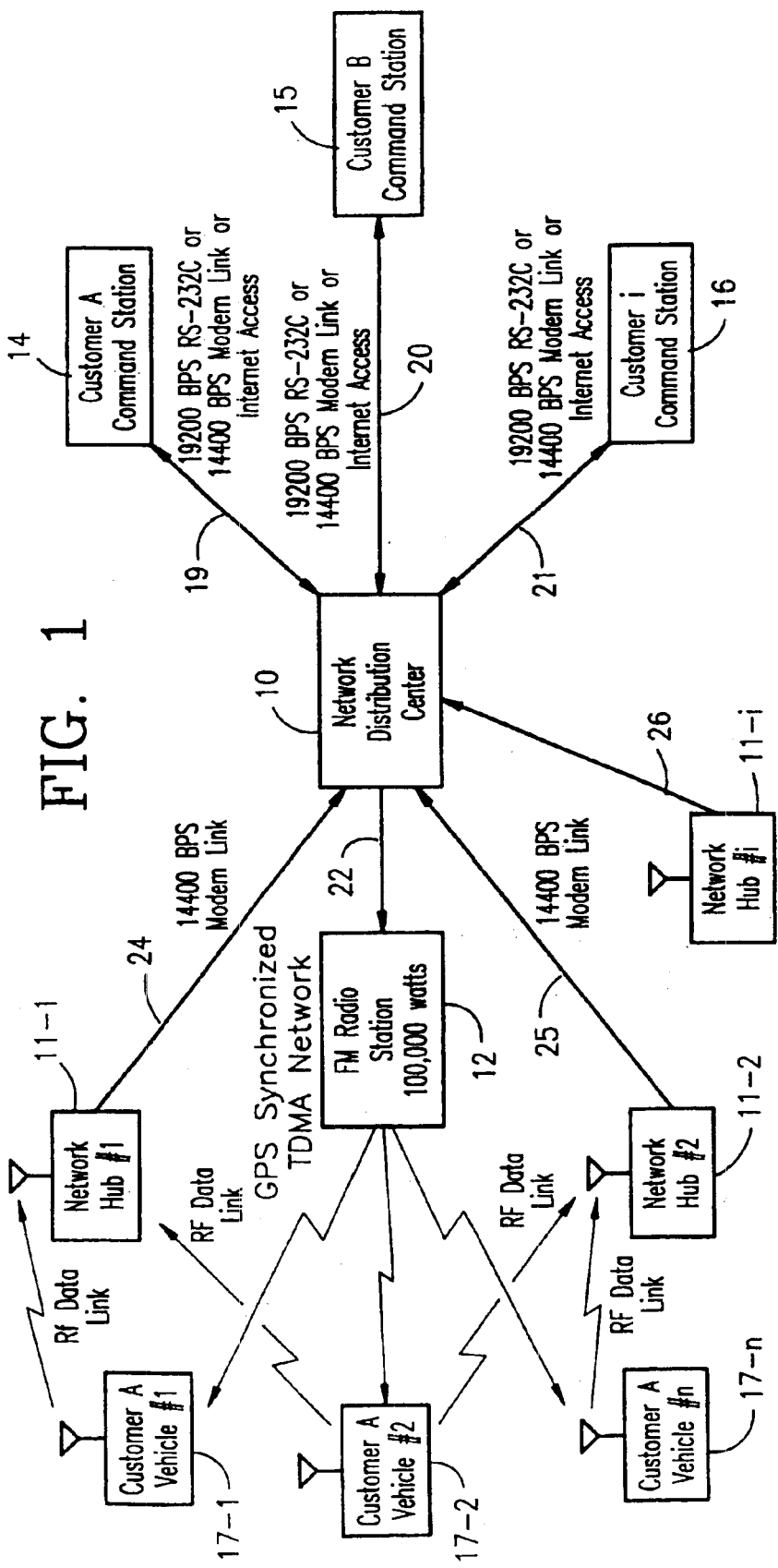
FIG. 1 is a simplified block diagram of the overall PROTRAK system, including the TDMA network, of the invention.

It is desirable, first, to provide an overview of the overall PROTRAK vehicle tracking, communication and fleet management system, a simplified block diagram of which is shown in FIG. 1. In addition to definitions of acronyms and other abbreviated terms presented herein, a glossary of abbreviated terms used throughout this specification is set forth in Appendix A. The "brain" of the system is the Network Distribution Center (NDC) 10 which is responsible for interfacing with subscriber (variously also referred to herein as customer, owner, operator, fleet subscriber, or user) fleets via a modem on a public switched telephone network (PSTN) line or Internet or other wide area network, and interfacing with fleet vehicles through a multiplicity of network Hubs (sometimes referred to herein as Net Hubs, or simply, Hubs) such as 11-1, 11-2, . . . 11-$i$, and one or more FM Radio Stations such as 12.

Information to be passed to vehicles in one or more fleets of interest is generated by a fleet dispatch office terminal or customer command station (CCS) such as 14 for Customer A, 15 for Customer B, . . . and 16 for Customer i, for delivery to the vehicles such as 17-1, 17-2, . . . 17-n for Customer A (and so forth for customers B, . . . i). The information is initially sent from the respective CCS via modem over the PSTN (e.g., lines 19, 20, 21) or via the Internet or other means to NDC 10. The NDC prioritizes the information and sends it via a modem over the PSTN (e.g., line 22) or over such other means to FM Radio Station 12, from which the information is broadcast, e.g., on a 67 KHz or 92 KHz FM subcarrier. The information is broadcast with precise timing defined by GPS satellite navigation information.

All vehicles in the network receive the approximately 4,664 bits per second (bps) binary frequency shift keyed (BFSK) FM subcarrier broadcast from the FM Radio Station (and others, if applicable) and decode the information contained therein. Each vehicle is assigned a slot in time to broadcast its location and responses to CCS requests. The assigned slots are unique to preclude simultaneous broadcasting by two or more vehicles, and the broadcast timing is precisely controlled through GPS and FM subcarrier synchronization.

When a vehicle's time to broadcast arrives, it sends a 144 bit message at a rate of 7,812.5 bits per second. This information is received by at least one of the Network Hubs 11-1, . . . , 11-i, which demodulates the message and provides data therefrom via a modem to NDC 10 over the PSTN (e.g.,.via lines 24, 25, 26). NDC 10 parses all received data and provides the vehicle location and status information for each specific fleet subscriber to its respective CCS over the PSTN.

Real-time tracking of vehicle location and status may be performed by the PROTRAK system as often as once every five seconds, for example, but more generally is updated at a rate of once every three minutes. Vehicle locations are tracked with an accuracy to about 5 meters through the use of DGPS information provided by the FM subcarrier broadcast. Where GPS is intermittently unavailable because of signal masking when vehicles are located on city streets bordered by tall buildings or because of other obstructions, the system employs dead reckoning (DR), map-matching and/or other navigation techniques to detect the vehicle location.

The wireless system provides a versatile medium for sending brief messages consisting of short packets of information to or from a vehicle mounted instrument or other wireless communications device. Although the system is aimed at business asset management, wireless service supports a wide range of packet communication needs for fixed as well as mobile assets. Use of GPS in the receiving device is not required, by virtue of GPS synchronization of the FM subcarrier broadcasts.

The system capacity is sufficient to accommodate at least 5,000 individual vehicles being tracked in the network at any one time with the bandwidth provided by a single FM radio station subcarrier at 67 KHz or 92 KHz for outbound communications and a single UHF or narrowband personal communication services (PCS) 12.5 KHz bandwidth frequency for inbound vehicle messages. System expansion may be provided, for example, in 5,000 vehicle blocks by the addition of another FM radio station subcarrier and another UHF or narrowband PCS frequency. Where feasible, frequency reuse principles on UHF or narrowband PCS frequencies are applied before another inbound frequency is added, to maximize channel capacity.

Communications in the PROTRAK system provide greater reliability than cellular or specialized mobile radio (SMR), and possibly than paging systems, with anticipated reliable reception of messages by vehicles and dispatchers 97% first time. If information is not received the first time, the system is able to make that determination and will re-attempt transmission until successful, or until it is found that delivery cannot be made. At least some fleet operators (e.g., ambulance services) require reliable operation despite adverse conditions, such as power outages. The overall system has internal backups to avoid single point failures.

Fleet subscriber vehicles are allowed to "roam" from one network of the system to another, such as where a vehicle is in transit from one metropolitan area to another. The system enables the vehicle to gracefully exit the first city network and similarly enter the second city network when in range of the second city.

System components are designed to support a wide range off fleet subscribers. Vehicle trackers (i.e., on-board tracker modules) are capable of hosting a number of peripheral functions, such as analog, digital, serial interface, and higher speed data collection required by some subscribers. Network Hubs are capable of supporting various antenna and receiver configurations to enhance coverage and various power configurations to support remote site operation. Unavailability of telephone lines does not present a problem, since wireless means are used for indirect or direct interface to the NDC.

II. The Fleet Data Management Application

PROTRAK system architecture and database management applications that interact with each subscriber's (customer's) existing information systems include the NDC and CCSs which are used to provide real-time vehicle location and message capability for dispatchers. The customer side of the PROTRAK system consists of three applications, including (1) a database management and CCS server (DMCS) that ties the network and customer information together, (2) the CCSs with their real-time location and messaging services, and (3) report generation that allows customers to access and manipulate the data managed by the DMCS.

Figure 2:
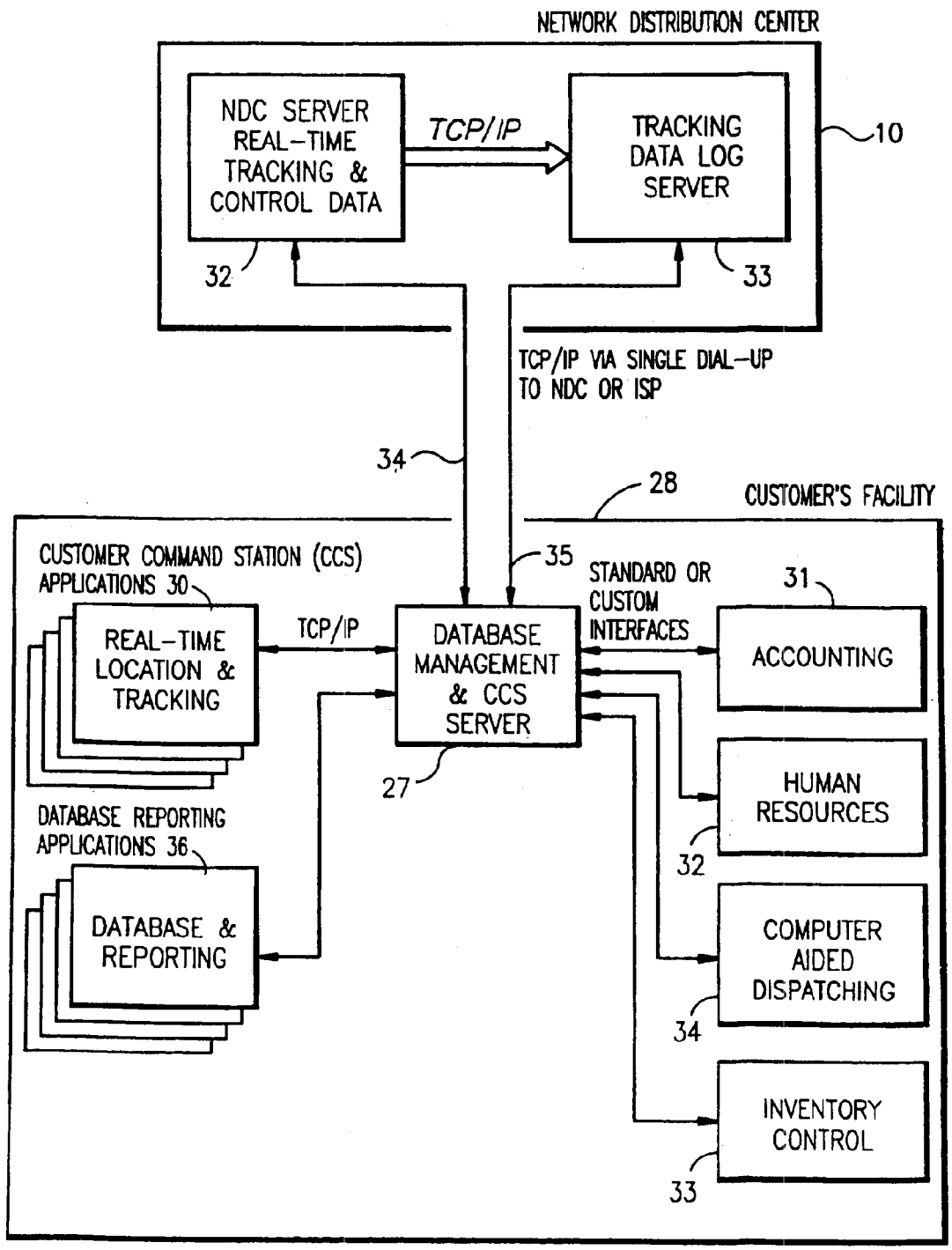
FIG. 2 is a block diagram of the system architecture for customer application interfaces.

A block diagram of the system architecture with respect to customer application interfaces is shown in FIG. 2. NDC 10 runs two server applications, namely, an NDC Server 32 that provides real-time information to connected customers, and a tracking data log server 33 that collects tracking information from the system in real-time and stores it in a large capacity database, with additional capability to respond to queries for historical tracking data. The customer establishes a single conventional TCP/IP connection (34, 35) to each of these servers through a single dial-up line directly to the NDC or through the Internet (via an Internet service provider, or ISP).

The connections to the NDC are controlled by DMCS 27 which may be located at the customer's facility 28 remote from the NDC 10. All of the real-time data available for all of the customer's vehicles are provided to this DMCS application. DMCS 27 stores these data and passes them on to the CCS applications 30 in filtered format so that CCS operators can observe (e.g., as icons on a monitor display or screen at their respective stations) and communicate with only those vehicles for which they are responsible.

Another function of DMCS 27 is to provide interfaces to a customer's other management applications such as accounting 31, human resources 32, inventory control 33, and computer aided dispatching 34 systems. Data are accessed and reports are generated by a database reporting application 36. The interface between DMCS 27 and CCS 30 and database reporting 36 applications is conventional TCP/IP. These applications may run on the same or separate computers using, for example, Windows (trademark of Microsoft Corporation) 95, Windows 98 or Windows NT (or any advance of such software, or any software of other providers which enables the same or similar functions to be performed). The operator's other applications interface to DMCS 27 through standard or custom interface protocols.

The DMCS application is responsible for tying together the NDC server applications, CCS and database reporting applications, and the operator's existing applications (e.g., the customer's management information and back office systems) into an integrated system. The DMCS acts as the enterprise connection to NDC 10. It establishes TCP/IP socket connections to the NDC real-time and data log servers 32 and 33 as required, and maintains access to data for all of the fleet operator's vehicles to be tracked by the PROTRAK system. Vehicle location and message data is provided by NDC 10, and DMCS 27 sends real-time messages and commands to the vehicles and may request archived tracking information from the NDC for time periods when the DMCS was not logged-in to the NDC.

The CCS (or each of multiple CCSs) 30 is primarily a real-time vehicle location display and messaging tool to support dispatching functions. DMCS 27 routes commands and messages from CCS 30 to NDC 10, and provides tracking data from the NDC to the CCS for only those vehicles that the CCS operator is controlling (i.e., dispatching, monitoring, scheduling, etc.). The DMCS supports multiple CCS applications operating simultaneously, controlling and viewing different groups of vehicles in an overall fleet.

DMCS 27 also supports database queries from multiple CCS 30 and database reporting 36 applications. Each CCS 30 requires real-time information from the database regarding vehicle drivers, dispatching, scheduling, and cargo. The database reporting application requires historical tracking data and information from other systems as necessary to produce reports pertaining to the customer's business.

III. The Network Distribution Center

Figure 3:
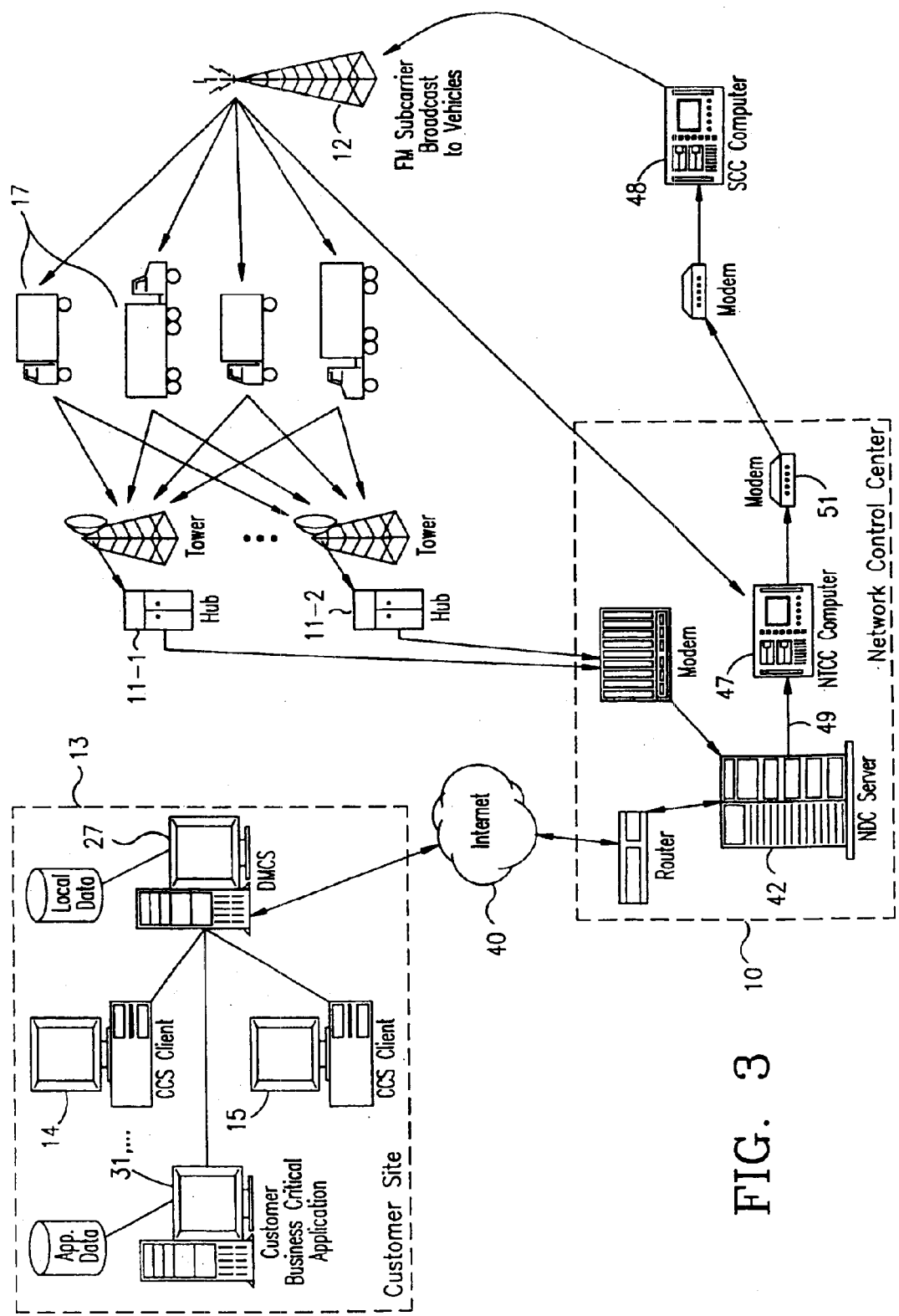
FIG. 3 is a detailed schematic diagram of the components of the wireless network and customer interfaces.

The NDC 10 architecture will be briefly described with reference to the exemplary NDC software and hardware system in the simplified block diagram of FIG. 3, which emphasizes communication protocols used by the NDC software applications. As noted above, the NDC 10 controls information flow between vehicles (e.g., 17) and their fleet subscriber command station (e.g., CCSs 14 and 15 at customer site 13) logged into the system. The RF network is managed by the NDC by controlling network timing, and determining the nature of the data transmitted to the vehicles. All data received by Network Hubs (e.g., 11-1, 11-2) are collected by NDC 10 for processing, distribution to customers, and data archiving, and the NDC allows customers to log in via the Internet, TCP/IP network, or other suitable connection 40. An interface to a PROTRAK Data Center (PDC, not shown) supports roaming between cities and overall tracker-fleet subscriber identification.

An NDC Server 42 in NDC 10 communicates with the CCSs 14, 15, etc., as well as with NDC command stations (not shown) within the NDC, and Network Hubs 11-1, . . . 11-i, through respective sockets and related net connections including a router and a modem, and also with a Network Timing and Control Computer (NTCC) 47 through a serial interface 49. The NDC Server has only one interface—a messaging protocol which will be described presently. NDC administrators use NDC Command Stations (which are similar to CCSs, but within the NDC) for display, control, analysis and maintenance of the NDC Server. NDC Server 42 is assigned a registered domain name and an IP address on the Internet to allow fleet subscribers and/or NDC command stations to connect to the Server through the Internet rather than using a system modem bank. By way of illustrative example and not limitation, three different connectivity options are shown in the NDC hardware block diagram of FIG. 4.

As noted above, DMCS 27 interfaces with the customer's critical business applications 31, etc. including accounting, inventory control, human resources, etc., as well as with CCSs 14, 15, etc., and NDC 10. NDC Server 42 controls all data sent to and received from vehicles and command stations, and also controls the configuration of the TDMA vehicle transmission UHF radio network by assigning vehicles to specific time slots for transmission and controlling which vehicles are allowed to operate. Data from vehicles 17 received from the Network Hubs 11-1, etc. are combined and decoded, and then provided to fleet subscriber CCSs for use in maintaining control of the radio network. Data from CCSs are sent to vehicles as required, and are also used to schedule the appropriate level of update service, with the data being transmitted to the vehicles over a serial interface to each NTCC computer at the NDC.

The network control function is the most critical task of NDC server 42, performed in real-time based on prompts from NTCC 47. System requirements for substantial TCP/IP support, Internet, and maintenance and support workstations require use of a platform such as Windows NT, which allows the system to make use of third party hardware and software. Running this task periodically, once per second, is accomplished, first, by providing the network control function with sufficient priority to complete its required tasks within the one second period allowed; and, second, by polling the NTCC serial interface at a high rate to detect the reception of timing data indicating that the server should start the network control task.

NTCC 47 controls the real-time portion of the PROTRAK system, including the SCC 48 transmit timing through a feedback loop (to be discussed presently in connection with FIG. 6) using an FM receiver in a roof module. One NTCC roof module 55 (FIG. 4) exists for each FM radio station 12 supported by NDC 10. The NTCC 47 is also responsible for introducing frame ID data and differential correction data into the transmitted data stream. Data packets generated by server 42 are sent to NTCC 47 for inclusion in the output data stream. By having NTCC 47 communicate with SCC 48 via a dedicated modem 51 and telephone line or other line that is not part of the modem rack used for the Network Hubs and the CCSs, the time-critical interface for timing and corrections is separated from any unpredictable activities of the modem rack or ethernet interface.

NTCC 47 monitors the FM station 12 broadcast for timing and content. If the broadcast was received skewed with respect to the GPS integer second, then timing correction commands are sent to SCC 48. The NTCC also compares the received broadcast data to the data block that was transmitted, to ensure the data was correct. FM received signal strength is also monitored to detect changes in FM broadcast power. Broadcast and SCC status are provided to the server 42 so that it can determine what action to take in the event of a failure.

A number of Windows NT workstations constitute the NDC command stations (e.g., 43, 45, FIG. 4), which are connected to NDC server 42 via 100 Mbps ethernet or other suitable path such as a local area network (LAN). These stations provide the capability to perform several functions, including displays of different areas of the navigation grid, network and modem monitoring, data log analysis, user account maintenance, and software development.

Figure 4:
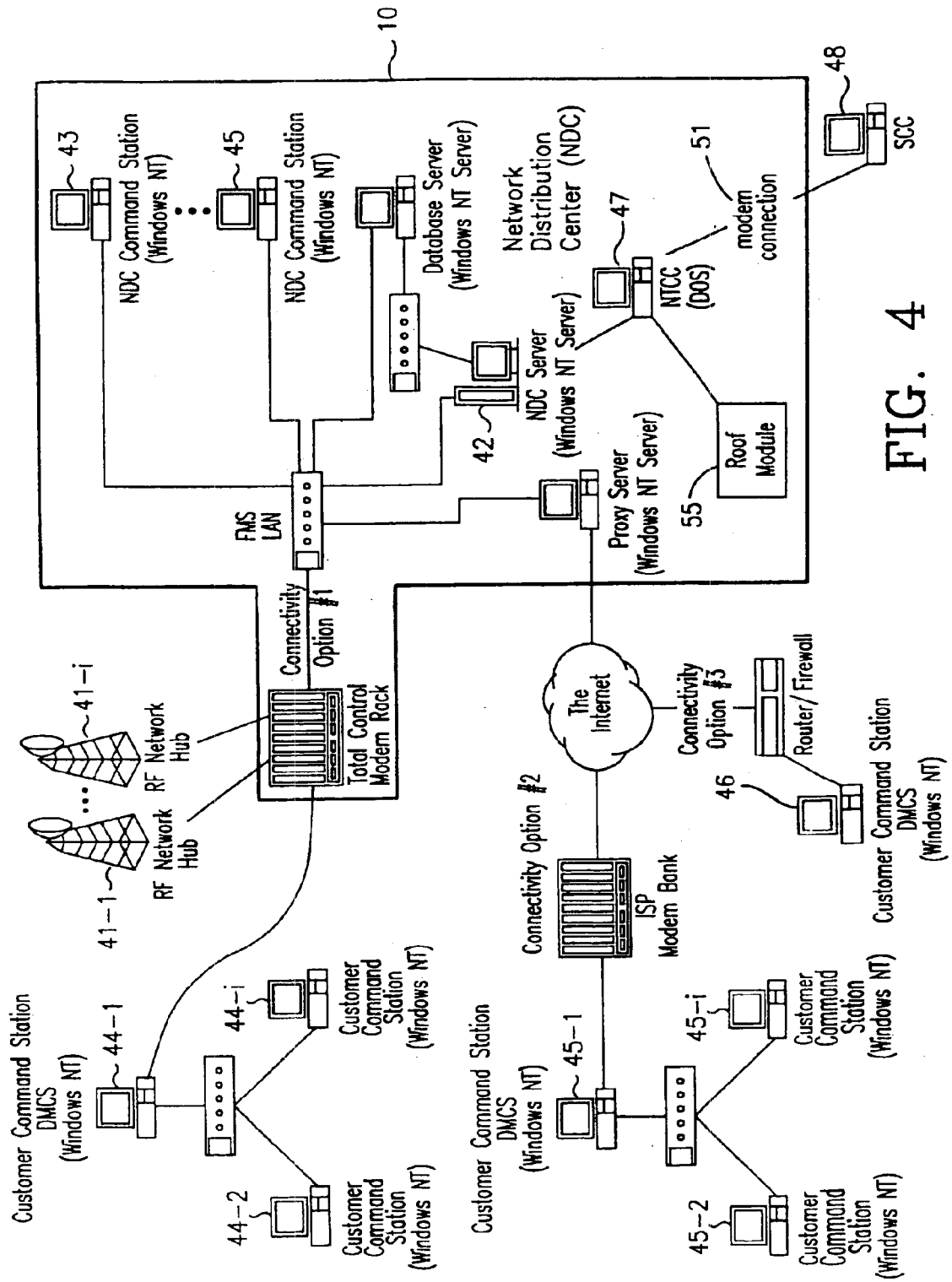
FIG. 4 illustrates details of the NDC in the network of FIG. 3.

The NDC server 42 may communicate with the Network Hubs and CCSs via a TCP/IP, or by way of other connectivity options such as those shown in FIG. 4. A US Robotics Total Control modem rack, for example, may be used to provide TCP/IP connectivity to the server. Each rack is implemented to support 48 modems via 2 conventional T1 lines, and several racks can be stacked to support a larger number of modems. The server may, for example, have two independent ethernet networks, and the modem rack is on a separate network from the NDC command stations so that NDC command station network activity will not introduce any latency in the modem data. User connections do not have any real-time requirements, but data transferred between the server 42 and the Network Hubs (e.g., 41-1, ..., 41-1) must occur regularly at one second intervals.

Figure 5:
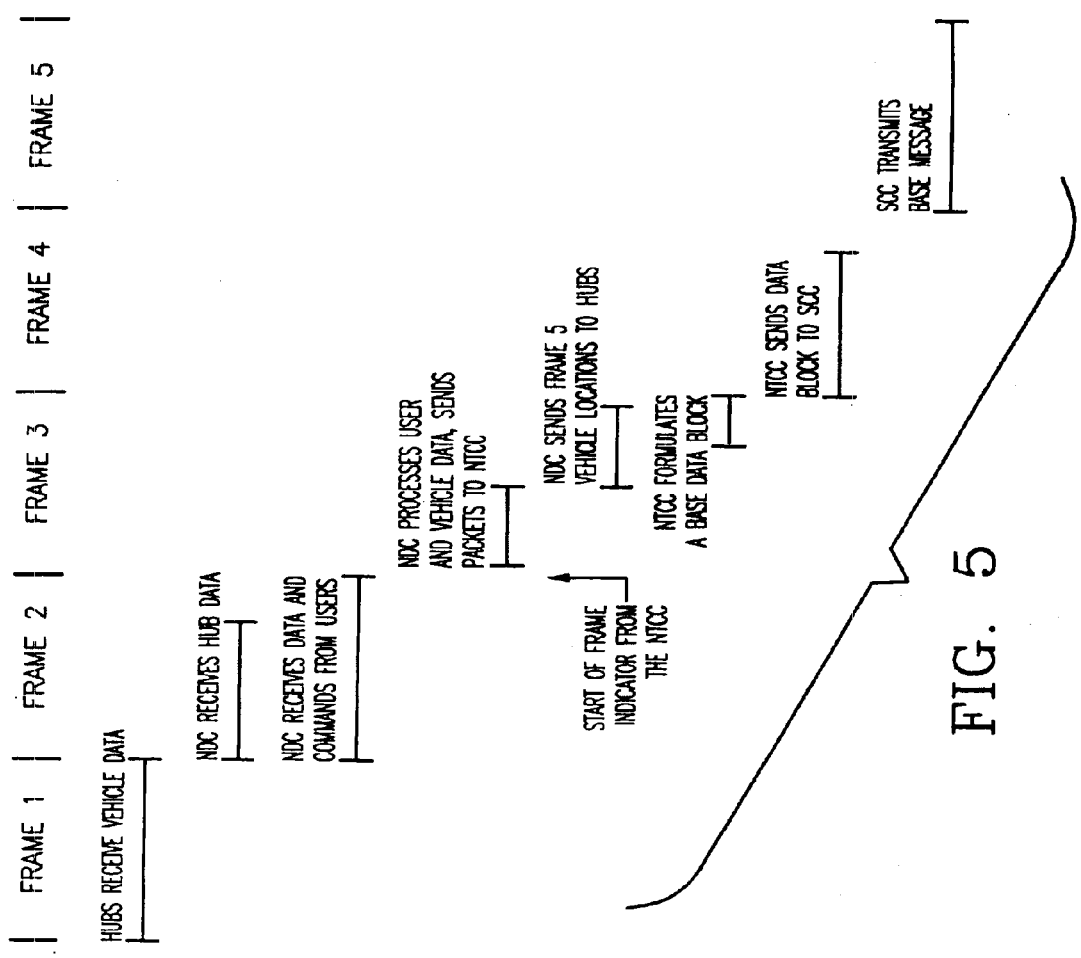
FIG. 5 is a time-line of data flow in the network.

A time-line of the network data flow is shown in FIG. 5. Data transmitted by the vehicles on frame 1 is available to the NDC server 42 (FIG. 3) at the beginning of frame 3. On the detection of the start of frame status from the NTCC 47, that data and user data received over frame 2 are processed. Data packets to be transmitted to vehicles are also sent to the NTCC. In the last part of frame 3, the NTCC formulates a data block which is sent to SCC 48 during frame 4. The SCC finally broadcasts the data block on frame 5.

The network control function comprises radio network management, vehicle and user input data processing, and base output data processing. Based on the time-line shown in FIG. 5, these tasks combined must begin promptly with the detection of the start of a frame (based on serial data received from the NTCC) and complete within roughly one-half second.

NDC 10 controls the assignment of network transmit slots to the vehicles and manages the exit and entry of vehicles into and out of the network. It also coordinates the broadcast of network control, vehicle control, message, and system identification packets to the vehicles. Network management in the system must run at one second intervals and complete within about one-half second. The system maintains data structures for all active vehicles and fleet subscriber command stations, and has a capability to cross-reference vehicles to fleets and to assigned broadcast slots. Data required includes:

vehicle position for transmission to fleet subscribers, and for data logging; position data may also be used for UHF frequency reuse or FM channel assignment;

the transmit slot(s) occupied by the vehicle;

the vehicle's tracker ID, local control ID, owner, and group;

message and control acknowledges, retries, and time-outs;

roaming information; and service type, including nominal update rates, real-time service or track history requirements.

The NDC server requires efficient and logical algorithms to assign vehicles to the transmit slots. The various vehicle update rates, as well as reserving space for network entry and polled response vehicle transmissions must be taken into account. Periodic transmit slot defragmentation may also be required. In practice as the system runs, vehicles enter and exit the network continuously, and slots must be reassigned for use by subsequent vehicles.

Data transmitted by the vehicles such as 17 (FIG. 3) is received at NDC 10 from the Network Hubs (e.g., 11-1, 11-2) via a modem bank in which the modems connected to the Hubs have the highest priority with respect to data transfer between Hubs and NDC server 42. NDC 10 processes the network data in one second intervals, and therefore, the vehicle data from each Hub must be available for processing by the NDC server during the one second interval after that frame's data was received by the Hubs.

The server 42 performs space diversity processing, error control decoding and error correction, and decryption on the received vehicle data packets. Data received in time slots assigned to vehicles maybe available from multiple Hubs. Since only one vehicle 17 has been transmitting, the received data at each Hub should be the same. Multi-path signal loss and other factors can cause errors in the received data, but those errors are likely to be different for each Hub. NDC 10 can then blend the data from all Hubs to produce a most likely solution.

After diversity processing is completed, error detection/correction processing is performed. The vehicle data packets are coded to allow numerous bit errors to be corrected through interleaving of the data bits and forward error correction coding. The data packets are then decrypted.

The received data packets are parsed and the information is used to update the NDC network control data structures. State and status data are logged for off-line analysis. Vehicle state data and fleet subscriber data are provided to the logged in fleet subscribers as it is received. The logged state data may be used to provide fleet subscribers with vehicle tracking history rather than real-time tracking data.

In the case of data received from customers (fleet subscribers, owners, or lessees, for example) 13, the data is processed as follows. Commands and data requests from logged-in fleet subscribers will be combined with vehicle information to generate vehicle control, network control, and messaging packets to be transmitted to the respective vehicles 17. Events such as customers logging in or out may control whether or not vehicles are allowed to enter the network or are forced to exit. For customers desiring real-time tracking data only, the respective vehicles are not allowed in the network unless they are logged-in. Other customers may require track history information and, in those cases, vehicles are tracked any time they are on. Fleet subscribers with low update rate needs, e.g., a few times per day, may request vehicle positions manually through their command stations. Their vehicles are polled by the NDC 10 based on a fleet CCS request, but cannot enter the periodic part of the network. Some subscribers, such as those that provide emergency response services, are able to request changes in vehicle position update rates from their command stations.

When roaming is implemented, fleets are allowed to track vehicles on any grid regardless of their NDC connection. Since fleet subscribers may not know where their vehicles are located at any given time, the system of the invention aggregates data for all vehicles through a wide area network connecting each NDC to enable the CCS to display all vehicles, regardless of the market (metropolitan or other area) in which they are located.

Transmit data is generally processed as follows. On each one second frame, the NDC 10 generates base message data packets to be broadcast to the vehicles 17. The NDC periodically sends Grid, FM, and UHF identification packets. Text message and user data packets are sent as requested by the CCSs such as 14, 15. Network configuration and vehicle control packets are generated from the network management function. All packets are sent from the NDC server 42 over a high speed serial interface 49 to the NTCC 47. The NTCC blends NDC packets with real-time packets and differential corrections and sends a complete base message block to SCC 48. SCC 48 then transmits the base message at the start of the next second. At least a two second delay exists between the time NDC server 42 sends a packet to NTCC 47 and the time it is transmitted by the 48.

Since the NDC server 42 essentially places data packets into an output queue on the NTCC computer, NTCC 47 must indicate to the server the space available in the buffer. Depending on vehicle and user actions, some frames may generate many network/vehicle control or message packets and others may not generate any. NTCC-supplied DGPS correction packets also use bandwidth periodically. This produces a variable delay between the time the packets are generated by server 42 and the time they are actually received by the vehicles 17. The NTCC 47 must provide server 42 information regarding size of the queue, so that the server does not, on average, overflow the output bandwidth of the FM broadcast from station or tower 12.

A data packet priority system may be implemented so that some packets are sent sooner than lower priority packets that were queued first. For example, text message packets may have a lower priority than vehicle control packets. As packets are delayed in the queue, their priority is increased so that they are certain to be transmitted with a maximum of a few frames of delay.

Data to be logged by the NDC server includes information for billing, vehicle track history for some subscribers, and detailed radio packet log data for test, analysis, and maintenance purposes.

A PROTRAK Data Center ties the individual city NDCs 10 together into an integrated system to support national roaming, and serves as a central point for a database of vehicle-mounted tracker IDs and customer IDs with a cross-reference. Subscriber profiles indicate what services and update rates each vehicle tracker requires. Data for roaming vehicles is transferred from the NDC 10 at which it is received to the NDC at which the subscriber is located through the PDC.

The NDC database from which the server dispenses information to CCSs, NDC command stations, etc. upon request is a high capacity database program such as Microsoft structured query language (SQL) server or Oracle 8 enterprise. Since these applications and their associated users are only allowed to access a subset of the data stored in the database, the NDC server is responsible to authenticate users and prevent the unauthorized access of data. For example, a CCS used by Customer A is not normally allowed to access tracking data logged for Customer B unless authorized by Customer B.

IV. The PROTRAK Network

The PROTRAK system time division multiple access (TDMA) RF network control, messaging and user data are transmitted to tracking computers (trackers) installed in the respective fleet vehicles to be tracked, over an FM broadcast subcarrier. Tracker transmissions include tracker position, network status, and user data. Vehicle data are transmitted to Network Hub sites using the conventional UHF business band. Network frame timing and tracker transmit slot timing are ultimately controlled by GPS-derived precise timing. The NDC manages the network and tracker slot allocation. Data sent by the NDC are transmitted via modem to the FM broadcast station, and data received from the trackers are provided via modem from the hub sites.

For the base broadcast, the TDMA network timing is based on precise time from GPS. The network is partitioned into one second long frames, 3600 frames are present in a frame cycle, and 168 frame cycles exist in one week. Since the frame cycle period is an even divisor of 604800 (the number of seconds in a week), the frame number can be directly determined from GPS time. To support network users (fleet subscribers) without GPS receivers, the frame number is transmitted in each base message.

A bit-sync in the base broadcast controls the timing of the entire network, indicative of the start of each network frame to the trackers and Network Hubs, all of which have FM receivers. The Hubs and trackers with position information account for their distances to the FM transmit antenna to derive the frame start time.

Figure 6:
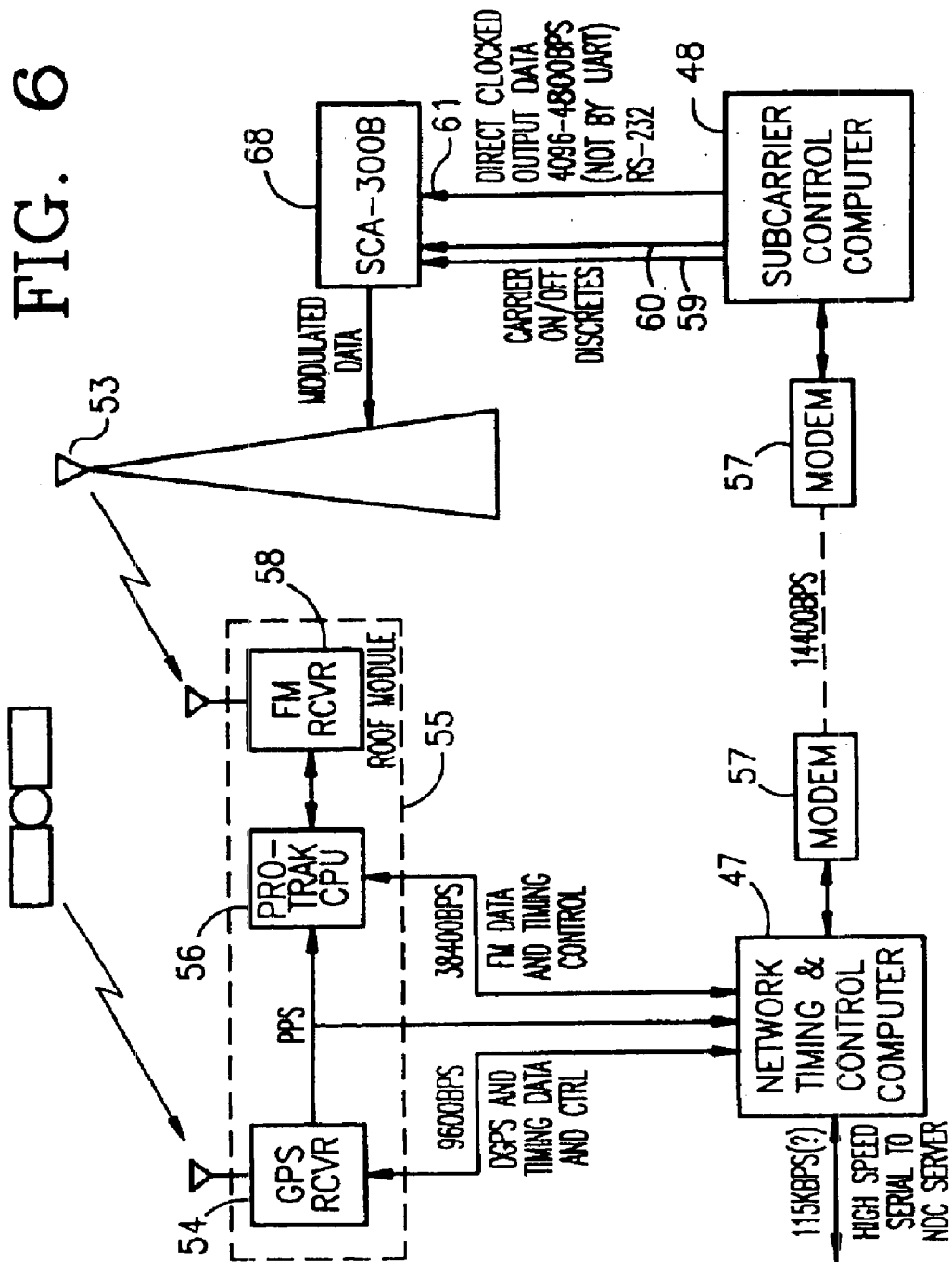
FIG. 6 is a block diagram of the base message feedback loop for bit-sync timing.

The manner of handling closed loop timing will be described with reference to FIG. 6, which illustrates the base message feedback loop for bit-sync timing. The base message contains a bit synchronization pattern which is used to control tracker broadcast timing. The synchronization is controlled to indicate each GPS integer second by a closed loop feedback system. NTCC 47 at the NDC uses an FM receiver 58 and GPS receiver 54 to measure the delay between the integer second and the arrival of the bit-sync in the FM subcarrier transmission received at the FM receiver. After accounting for the predetermined distance between the FM broadcast antenna 53 and the NDC, the difference between the GPS indicated integer second and that indicated by the bit-sync is sent to SCC 38 at the FM station via modem(s) 47. SCC 38 then slews the broadcast start time to correct for the measured error.

The SCC receives transmit data and timing control information from the NTCC computer 47, and clocks the data out to the subcarrier modulator 68. For example, an external USRobotics 28.8 Kbps modem is connected to SCC 48 via a Motorola 68332 peripheral serial communications interface (SCI). SCC 48 answers calls from NTCC 47, data to be transmitted on the next frame is provided by the NTCC, and the SCC buffers that data for transmission. NTCC 47 also provides SCC 48 with timing control commands, which the SCC uses to adjust the start time and period of its transmit frame clock to maintain coherency with the GPS integer second. The SCC sends mode and status information to the NTCC.

SCC 48 must accurately control the timing of the start of the output data stream so that the bit-sync pattern leaves the transmit antenna at a precise time with respect to the GPS integer second. It is desirable that the start of the data transmission be repeatable to less than one microsecond ($\mu$sec) and be controllable to about 0.4 $\mu$sec. The SCC uses programmable timers within the time processing unit (TPU) of the Motorola 68332 microprocessor to trigger the transmission of data to the subcarrier modulator. NTCC 47 uses data from FM receiver 58 and GPS receiver 54 to evaluate the offset and period of the base transmission. Synchronization is achieved by changing the timer period based on commands from the NTCC. When the system is first turned on, a period of about 20–30 seconds is required to achieve synchronization. Thereafter, minor corrections to the SCC clocking are provided periodically. The data clock is accurate to less than about 2 parts per million (ppm) relative to the receive data clocks on the remote trackers. A detailed description of the timing control algorithms employed by NTCC and the trackers installed on the vehicles is presented in Section V below.

In practice, SCC 38 is mounted together with subcarrier modulator 68, modem, and DC power supply for the SCC in a rack. Subcarrier modulator 68 may be an SCA-300B subcarrier modulation generator available from Circuit Research Labs, Inc. of Tempe, Ariz., which receives binary data from SCC 48 at a ±12V data input port 61. The binary data is filtered and modulated on a digitally generated subcarrier. Subcarrier modulator 68 also has two discrete switch closure inputs 59, 60 which are used by SCC 48 to turn the subcarrier on and off.

The NTCC roof module 55 includes GPS receiver 54, PROTRAK CPU 56, and FM receiver 58. CPU 56 compares the time at which the FM bit synchronization is received by receiver 58 to the integer second pulse-per-second (PPS) from the signal received by GPS receiver 54. Time difference is measured by recording at a timing control register of the TPU in the Motorola 68332 microprocessor on receipt of the PPS and on receipt of the bit-sync. The TPU timer resolution is on the order of 0.2 μsec. The measured time difference provided to NTCC 47 is used to compute timer corrections for SCC 48 to apply to its transmit timer.

The NTCC acts as the real-time interface between the NDC server and the network. For timing control, NTCC 47 maintains the network frame count based on GPS time and computes and provides updates to the SCC transmit timer to keep the base transmission aligned with GPS time. Three timing controls are available, as follows: (1) In frame lag/advance control, for PPS-bit-sync offsets greater than 0.5 seconds the NTCC can delay or advance the frame number contained in the output data so that the transmitted frame number matches the actual frame as defined by GPS, which allows the time to be adjusted in one second steps. (2) In SCC transmit timer lag/advance control, for offsets 0.5 seconds or less the transmit timer can be loaded with a longer or shorter value to introduce a one-time shift in the output time with respect to the GPS integer second. (3) In SCC transmit timer period adjustment control, the interval between bit-sync epochs and the PPS integer second can be measured, and scale factor (frequency) errors in the transmit timer can be corrected by adjusting the nominal timer value up or down.

A period of 20–30 seconds of coarse alignment may be necessary or desirable using controls (1) and (2), above. Once the SCC is synchronized, controls (2) and (3) are used to make fine corrections to the synchronization to account for small timer errors attributable to temperature and residual synchronization errors.

"Base messages" are data sent from the NDC to the trackers over the broadcast network on the FM subcarrier. The base message data contains network control information, repeating interval slot allocation definitions, DGPS correction data, messaging/paging data, and user specific data. The format of the base data broadcast to trackers will be described presently herein.

For information flow, message data which controls network activity (network and tracker control packets) is created by the NDC server 42 (FIG. 4) in response to data received from trackers and from CCSs (e.g., 44) (or NDCs, e.g., 43). Paging and user data packets are created from commands by the users. These packets are sent to NTCC 47 for assembly into a base message. The NTCC adds a network frame number and DGPS correction data, as required, and then applies encryption, error control coding, and bit interleaving. The resulting message is sent to SCC 48, which inserts the bit-sync pattern and transmits the message data at the beginning of the next frame. The processing steps are summarized as follows:

1. NDC 10 computes base message data packets and sends them to NTCC 47.
2. On each one second interval, NTCC 47:
    a) Assembles available data packets from NDC 10, frame number, and DGPS corrections, if necessary, into a single message block. Unused bytes are filled with a pad.
    b) Performs encryption on the message block.
    c) Performs error control coding on the message block. A Golay (23,12) code is used in the presently preferred embodiment, but a different code may be used.
    d) Performs bit inter-leaving. Data is transmitted by sending long segments of all bit 1's followed by bit 2's etc., which provides significant burst error correction capability.
    e) Sends the message block to SCC 48 for transmission.
3. SCC 48 inserts a bit synchronization pattern in front of the message block, Miller encodes the data, and transmits it to the subcarrier modulator 68 (FIG. 6) at the start of the frame after the message block is received from NTCC 47.

The format of the message block is as follows. The maximum bit rate for the SCA-300B subcarrier modulation generator used as 68 is 4800 bps. It is desirable to use the maximum available bit rate consistent with modulation index requirements (for receiver sensitivity) and data block size. A Golay (23,12) code is used with bit interleaving; data is sent in 40×23=920 bit blocks. Five blocks are transmitted for a total of 4600 bits. SCC 48 Miller encodes the data and adds the bit sync. The Miller code doubles the number of bits so the SCC will transmit data at a bit rate of approximately 9328.36 bps. 4600 bits require 986.24 milliseconds. Since an 8 bit preamble and 24 bit long bit sync require 6.8608 msec, SCC 48 has a 6.8992 millisecond gap time to restart the transmit clock with updated synchronizations to send the next message.

Figure 7:
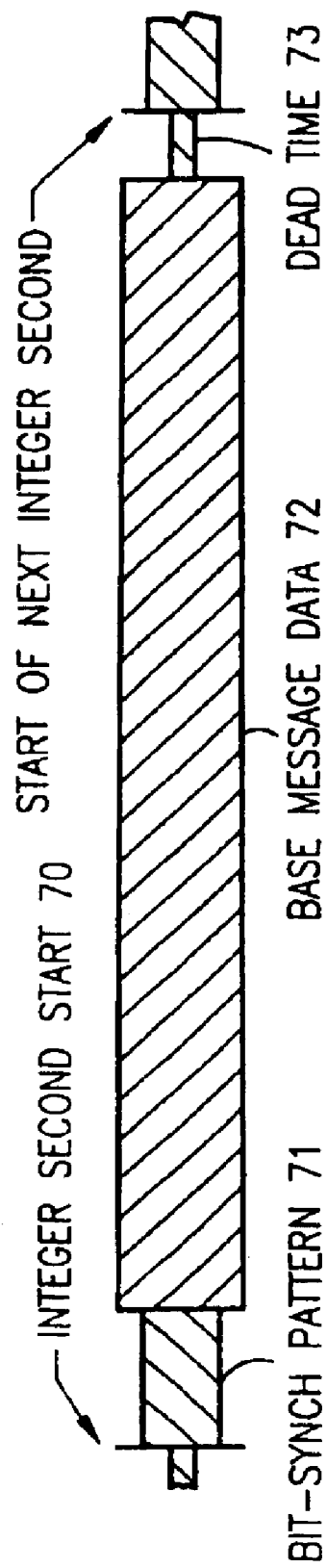
FIG. 7 is a diagram of the base message broadcast format.

FIG. 7 is a diagram of the base (NDC) message broadcast format. At the start 70 of each integer second the bit-sync pattern 71 is transmitted, followed by the base message data 72, and finally by a very brief interval 73 of dead time up to the start of the next integer second. Bit interleaving is applied to the base message to reduce susceptibility to burst errors. Interleaving is applied on a block by block basis. The Golay code corrects 3 errors in 23, so 40 bit deep interleaving allows a burst of 120 bits or 25.728 milliseconds to be corrected. This is long enough to correct desensitization that occurs in the shared transmit/receive antenna when a tracker transmits in its 20 millisecond TDMA slot.

For bit synchronization, the trackers and Net Hubs use the bit-sync in the FM broadcast to synchronize their clocks for transmission and reception of tracker data. Trackers with valid position data can use the known range to the FM broadcast site to offset their transmissions to account for the delay in reception of the bit-sync.

For tracker identification, all trackers are assigned a 30 bit tracker ID at the factory, unique throughout the PROTRAK system. While this could be the only ID used to identify a tracker, a shorter ID is assigned to trackers when they receive their main repeating interval slot assignment, which allows the NDC Server to identify trackers in its RF network grid with fewer data bits. The shorter IDs consist of a Network ID and an Interface ID. Since two network sizes are used, the most significant bit of the 16 bit ID is used to indicate the network size. Table 1 below shows the Network/Interface ID format for the two lot sizes used.

TABLE 1

Network/Interface ID Format

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| 0 | | | Network ID | | | | | | | | Interface ID | | | | |
| 1 | | | | Network ID | | | | | | | | | Interface ID | | |

To minimize disruption of the text, other tables are, for the most part, set forth in Appendix B.

Trackers may be assigned an ID within one of the 128 Networks with 256 Interface IDs or one of the 2048 Networks with 16 Interface IDs. Network IDs are used by the NDC Server to reduce the number of bits required to identify a subset of a customer's tracker modules. For example, if a fleet operator sends a message to ten of its trackers (vehicles) that are all contained in the same 16 tracker network, the NDC server may individually address these trackers using 52 bits, with 12 bits indicating the Network ID an only 4 bits being required to identify each tracker Interface ID.

Since the DMCS manages customer groups, the NDC server may coordinate with the DMCS to learn about customer groups. Or, the NDC server may use logged data to determine what trackers have been grouped together. As a result, the NDC server places trackers of the same group and/or customer ID into the same network. While trackers from different customers and/or groups may be placed in the same network, tracker groups that are placed together in the same network may be identified with a relatively small number of bits.

The network/Interface ID assignment scheme is used in data packet formats. The base broadcast data contains a variable number of short data packets concatenated together, which are of fixed or variable length depending on type. The packets include DGPS correction data, network description information, user commands and messaging, and tracker control commands.

A. Data Packets and Formats

Data packet decoding is performed after error detection/correction and decryption. Each base message (i.e., from NDC 10) begins with a frame ID. Data packets follow until the available space in the data block is filled or no packets remain to be sent. The unused space in the message is filled with all zeros that encode to an alternating one-zero pattern in Miller code. Each packet starts with a packet ID byte followed by the data in the packet and a checksum/parity word. Synchronization of the packet decoder on the data is maintained by verifying the first byte after the frame ID is a packet ID, and then looking ahead the number of bytes in the first packet to verify that checksum is correct and the subsequent byte is also a valid packet ID. This continues until all of the data packets are decoded. A Base Packet Summary is set forth in Table 2 (Appendix B).

Text message packets are generated in response to messages/paging commands from user command stations (i.e., from the CCSs). By way of example for the present exemplary embodiment, the maximum message length is assumed to be 80 characters. In addition, an optional 28 character response set may be appended as discussed below with reference to pre-defined message response sets.

Text messages may be addressed to the trackers (i.e., to tracking computers installed in the vehicles 17) in the following ways:

Tracker ID
Network/Interface ID
Customer ID
Interface ID
Interface ID range within a Network In the present exemplary embodiment, the tracker ID number is 30 bits, the Network/Interface ID is 16 bits, and the customer ID is 24 bits. A variable number of address bits are reserved depending on address mode and number of trackers being addressed.

Acknowledgment of text messages is performed by the tracker requesting an auxiliary repeating interval time slot. The auxiliary slot repeats at 12 second intervals and includes enough slots to send the acknowledgment, e.g., one plus additional slots to allow for retries.

Table 3: "Text Message Packet—Single Tracker or Entire Fleet"; Table 4: "Pre-Defined Message Response Sets"; Table 5: "Test Message Packet—Tracker Group"; Table 6: "Tracker Group Message Interface ID List Packet"; and Table 7: "Tracker ID List Block", are set forth in Appendix B.

A "Pre-Defined Message Definition" packet (Table 8, Appendix B) provides trackers (sometimes referred to herein as tracker modules) with a text message that should be associated with a specified pre-defined message ID. Although individual trackers request this definition, the message is broadcast to all trackers associated with a particular customer (fleet operator, subscriber or user, as those terms are used interchangeably herein). Trackers receiving this message store the pre-defined message definition if the specified customer ID matches their known customer ID. This stored association is then used to display the appropriate message upon receipt of a "Pre-Defined Message Packet." The latter packet allows a shorter message format for "canned" user messages that are frequently transmitted by an individual customer. Since the trackers know the text of these messages a priori, only a message ID and a 16-bit cyclic redundancy check (CRC) need be sent by the NDC. The ID identifies the message and the CRC allows the tracker to determine whether the text matches the CRC of the known pre-defined message.

Pre-defined message CRCs are computed using the entire pre-defined message. Hence, a tracker may determine if the ID has been reassigned to a new message. If that is true, or if a specified pre-defined message is unknown, the tracker may request the entire pre-defined message using a "Pre-Defined Message Request Packet." Upon receipt of such a request packet, the NDC server provides the requesting tracker with the pre-defined message in a "Pre-Defined Message Definition Packet." Tracker addressing is similar to that for text messages. The "Pre-Defined ID Message Packet" structure for a single tracker or entire fleet is shown in Table 9, and for a tracker group, in Table 10, of Appendix B.

DGPS correction data packets (Table 11) are generated by the NTCC and inserted into the base message block at roughly 10 second intervals. The range/range-rate corrections are computed by the GPS receiver (e.g., 54, FIG. 6) in the NTCC roof module 55. These may be in RTCM or other desired format. The scaling on the corrections is the same as that in RTCM-104. The NTCC transmits correction data in a format with complete "Type 1" and "Type 2" style corrections. Other RTCM message types may alternatively be supported if desired. RTCM message types 1 and 2 have the same format, with only the frame IDs being different. The packet is of variable length depending upon the number of corrections therein. The number of bytes is $5+5N_{SV}$.

A User Data message packet supports generic, user specific data that is sent to the trackers from CCSs. The format of the message is similar to the text message packet, having 80 data bytes available for any customer purpose. Customer specific software must be programmed into the tracker, MDT, and CCS for the customer to make use of this message. User Data packet addressing and acknowledgments are identical to those of text packets. The "User Data Message Packet" structure for a single tracker or entire fleet is shown in Table 12, and for a tracker group is shown in Table 13.

Figure 11:
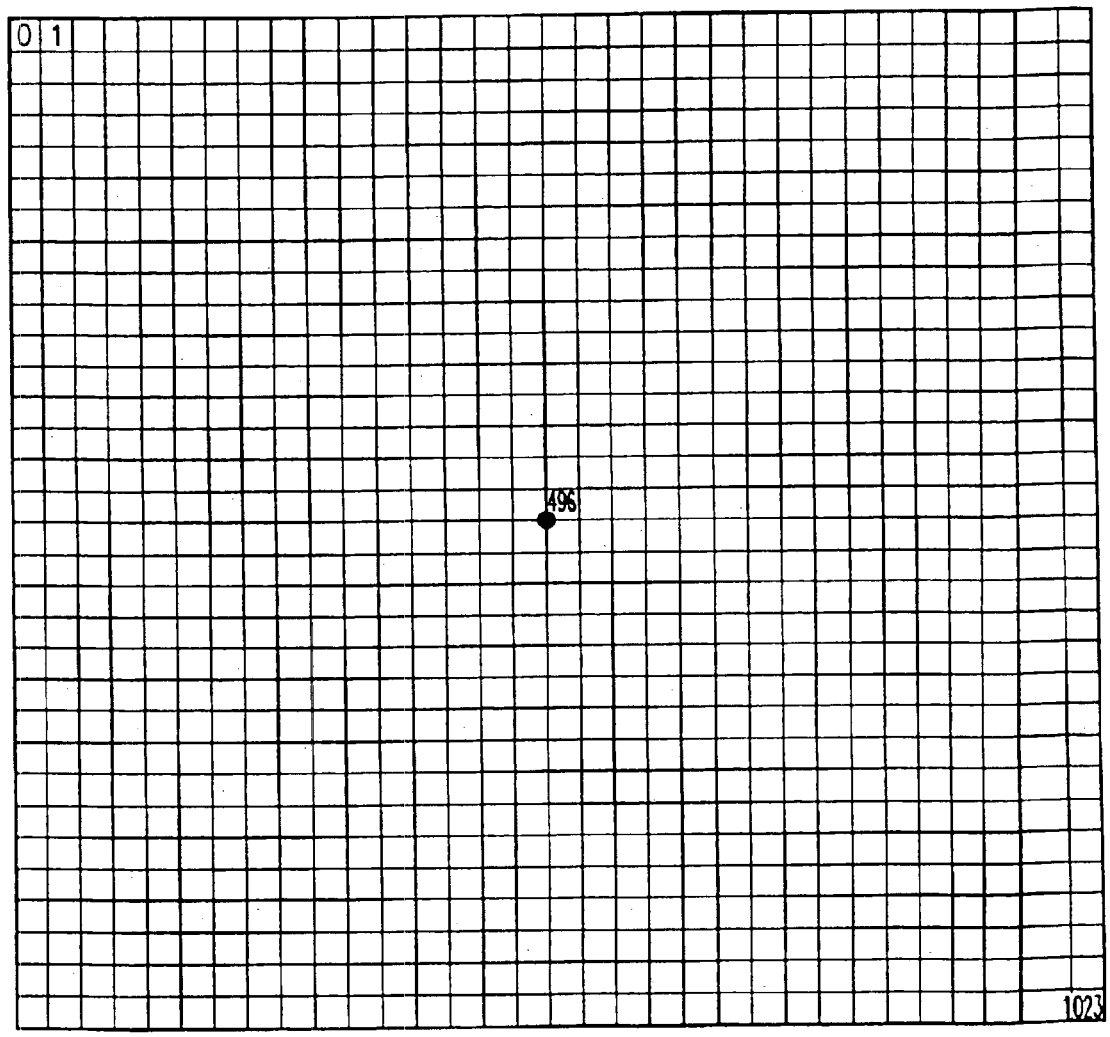
FIG. 11 is a diagram of a nominal navigation grid used in the system of the invention.

A "Grid Identification packet" (Table 14) provides the trackers with the center of local and adjacent PROTRAK navigation grids (e.g., see FIG. 11, to be discussed presently herein). In an exemplary embodiment, the navigation grid is a square area about 262 Km on a side, roughly centered on each PROTRAK market area. Each navigation grid (market) has a unique 15 bit ID number. The "Grid ID packet" is transmitted at roughly 20 second intervals, and alternates between the local grid and adjacent grids. Adjacent grid information is provided to allow roaming trackers to quickly locate the PROTRAK system in new markets as they move through markets. Preferably, the trackers store grid information in non-volatile memory.

The center of the navigation grid is provided in 24 bit scaled integers with an LSB (least significant bit) of about 2.4 m in latitude, which should be adequate for most tracker navigation applications. The nominal navigation grid is assumed to be square and made up of 1024 adjoining 64 square Km squares. If necessary, additional data may be added to this message to define rectangular or oddly shaped navigation grids.

An "FM Identification packet" (Table 15) provides the trackers with the FM base broadcast frequencies and transmitter locations for the local and adjacent PROTRAK navigation grids. The transmitter location is used for broadcast delay time computations. The frequency of the subcarrier is also provided. Preferably, the trackers also store transmitter information in non-volatile memory. The transmitter location is provided in 24 bit scaled integers with an LSB of about 2.4 m in latitude, which is quite adequate for broadcast delay computations. Each navigation grid may have multiple FM transmitters. The packet supports up to 4 transmitters by a transmitter ID number. If required, additional data in this message or another message may be used to define grid areas served by each transmitter for capacity or coverage reasons.

A "UHF Identification packet" (Table 16) provides the trackers with the UHF frequency on which they are to transmit their state data. Frequencies are provided for the local and adjacent PROTRAK navigation grids. Here again, the trackers should store the UHF frequency information in non-volatile memory. Each navigation grid may have multiple tracker transmit frequencies, and the "UHF Identification packet" supports up to 4 frequencies by a frequency ID number. If necessary, additional data in this message or another message may be used to define grid areas in which to use each UHF frequency for capacity or coverage reasons.

NDC 10 transmits a packet containing the current GPS time at 10–20 second intervals to aid the initialization of the vehicle-mounted GPS receivers associated with the trackers. The "GPS time packet" (Table 17) is computed and inserted into the base message block by the NTCC. The time zone offset and UTC leap seconds are added to the current GPS time to determine local time.

A "set main repeating interval slot definition packet" (Table 18) assigns a continuous repeating interval and a Network/Interface ID to a tracker. Trackers receiving this packet send a tracking update to NDC server 42 when (Frame ID) mod (Interval Length) is equal to the repeating interval index indicated in the packet. If a tracker already has an assigned main repeating interval, it will be replaced by the interval in this packet. Trackers can determine if this packet is addressed to them by checking whether the tracker ID field is equal to the recipient's tracker ID. If it is, the tracker will use the assigned repeating interval and Network/interface ID. Otherwise, the tracker will ensure that none of its repeating intervals match the described interval. If the described interval matches the tracker's current main interval, the tracker will cease using this interval (and Network/Interface ID) and attempt a network entry. Or, if the described interval matches one the tracker's current auxiliary intervals, the tracker will remove this interval from its list.

The Network/Interface ID assigned with the main repeating interval is valid while the main repeating interval is valid. As a result, trackers will respond to messages with their Tracker ID or their temporary Network/Interface ID while they are in the RF network. Once a tracker exits from the RF network (or had its main repeating interval purged), the associated Network/Interface ID is no longer valid for that tracker. Trackers receiving a main repeating interval assignment may use the assigned interval until they request to exit the network, acknowledge a purge repeating interval packet, or exceed the self-purge update count.

An "add auxiliary repeating interval slot definition packet" assigns a repeating interval to a tracker for a single interval (Table 19). Trackers that receive this packet send a tracking update to NDC server 42 when (Frame ID) mod (Interval Length) is equal to the repeating interval index indicated in this packet. As a result of receiving this packet, trackers will send a single update. Trackers may determine if this packet is addressed to them by using the tracker ID or the Network/Interface ID field. If the tracker ID field identifies the recipient, the tracker will use the assigned repeating interval to report its tracking information to the NDC server. Otherwise, the tracker will ensure that it does not report its tracking information using the described interval. It should be noted that although a tracker may have multiple auxiliary repeating intervals, each tracker only has one main repeating interval. Table 20 (Appendix B) shows the "Add Auxiliary Repeating Interval Slot Definition packet" structure for a single interval by network/interface ID.

The "add auxiliary repeating interval slot definition" packet for a limited number of intervals assigns a repeating interval to a tracker for a specified number of intervals. Trackers that receive this packet send a tracking update to the NDC server when (Frame ID) mod (Interval Length) is equal to the repeating interval index indicated in this message, and these updates are sent by the trackers an interval count number of times. Here again, trackers may determine if this packet is addressed to them by using the tracker ID or the Network/Interface ID field, and report their respective tracking information to the NDC server, or not, in the same manner as specified above. Tables 21 and 22 show the structure of the "Add Auxiliary Repeating Interval Slot Definition" packet structure for a limited number of intervals by tracker ID and by network/interface ID, respectively.

An "Available Network Entry Slots" Packet (Table 23) contains a slot count that indicates the number of slots within a one-second frame, and a bit mask that indicates the slots that are currently available for network entry. Bit 0 of byte 2 indicates if slot 0 is available, bit 1 of byte 2 indicates if slot 1 is available, bit 0 of byte 3 indicates if slot 8 is available, etc. Before a tracker is allowed to send a "Net Entry Request" packet, it must receive an "Available Network Entry Slots" packet and successfully receive every base packet message prior to sending its "Net Entry Request." The packet is only valid until the next one is received, so the tracker will not send a network entry request in a slot that is no longer available. The NDC server 42 broadcasts this packet as the available network entry slots change, and also sends it at least once every 10 seconds.

A "Repeating Interval Slot Configuration Information" Packet (Table 24), sent every 30 seconds by the NDC Server, indicates the frame cycle length, the self-purge interval count, and the tracker ID request mode. Each of these values is needed for a tracker to determine the transmit timing and/or format of its periodic tracking update packets. The frame cycle length indicates the number of one-second frames that are contained in a frame cycle. Since this number will always be a divisor of the number of seconds in a GPS week, a frame ID may be determined using GPS time. The Frame ID is calculated using the GPS Second as follows:

$$\text{Frame } ID = (GPS \text{ Second}) \bmod (\text{frame cycle length})$$

The self-purge update count indicates the number of periodic updates that a tracker may provide in an assigned repeating interval slot without requesting to re-enter the network. Trackers with an assigned repeating interval slot must request to have their repeating interval slot re-assigned to them by indicating "Re-assign Main Repeating Interval Slot Request" or "Re-assign Auxiliary Repeating Interval Slot Request" for their network status code. Trackers that fail to have their repeating interval slot re-assigned before reaching the self-purge update count will purge their assigned repeating interval slot.

The "Tracker ID Request Mode" indicates if trackers are required to supply their tracker ID number within tracker data packets. This request mode may indicate that trackers are not required to supply their tracker ID number, trackers are required to supply their tracker ID for their next update only, or trackers are required to supply their tracker ID for all updates.

Tracker modules collect built-in test (BIT) information, which is then supplied to the NDC Server at the rate (in seconds) specified in the "Repeating Interval Slot Config Info" packet. If the rate is zero, the tracker is not required to supply the BIT packet. If the rate is greater than zero, the tracker will provide its BIT packet at the rate indicated. To supply a BIT packet update, trackers request an auxiliary slot when (tracker ID) mod (BIT packet rate) equals the current frame ID. As a result, tracker requests for auxiliary slots are distributed evenly. If a request for auxiliary slot would interfere with a tracker's scheduled update, the tracker will defer the request to a later time.

The NDC server uses a "Network Entry Response" packet (Table 25) to respond to a tracker's network entry request when the tracker's service type does not otherwise permit network entry. The assigned tracker state code contained in this packet enables a tracker to determine its type and requirements to be assigned a repeating interval slot. Manual tracking trackers are to wait for a "Repeating Interval Slot Definition (Single Interval)" packet, and login-only tracking and unknown trackers must wait for a "Network Entry Request Permission" message. The NDC server 42 may send a "Network Entry Request Permission" message as a result of a CCS (e.g., 14, FIG. 3) connecting to the DMCS 27 or because an individual tracker's service type has changed.

The NDC erver sends a "Network Entry Request Permission" packet (Table 26) to a subscriber's entire fleet of LOT trackers, to a subscriber group of trackers, or to an individual tracker, for one or more trackers to request network entry. If a subscriber is not connected to view its group of LOT trackers, the trackers are not allowed to enter the RF network but are notified instead to wait for network entry request permission. When a subscriber connects to the DMCS using CCS software, the DMCS checks whether a subscriber with this ID is already connected, and, if not, sends a message to the NDC Server identifying all trackers in the CCS user's group. The NDC Server responds to this message by sending a "Network Entry Request Permission" packet to allow the trackers in the CCS user's group to request network entry. Depending on the subscriber group size or subscriber fleet size, this packet may be sent by the server to the entire fleet or to only a group of trackers, with a view to reduce the required RF bandwidth as much as possible. The "Network Entry Request Permission" packet may also be sent if a tracker's service type is modified, such as if a manual tracking tracker is changed to a continuous tracking tracker.

A "Purge Assigned Repeating Intervals" message (Table 27) is sent by the NDC server by Tracker ID, Customer ID, or Tracker ID List Packet, to indicate that a tracker or a group of trackers should purge some or all of its assigned repeating intervals. This would be done, for example, when the only subscriber in a group of LOT trackers disconnects from the DMCS, because information from those trackers is no longer reported when its viewing is ceased by the disconnected subscriber. The DMCS provides a list of trackers to be removed from the RF network to the NDC Server. The "Purge Assigned Repeating Intervals" message may also be sent to individual trackers, such as where a continuous tracking tracker has its service changed to manual tracking, in which case the tracker in question is informed of its new service and to wait for a repeating interval slot. Similarly, if an individual tracker's service type and update rate are both changed (e.g., from continuous with an update rate of 30 seconds to LOT with an update rate of 60 seconds) it will be sent this message if its subscriber is not connected to the NDC server. And where a tracker has been assigned an auxiliary interval for an emergency condition, to report data at a high update rate, for example, for a short period in addition to its main repeating interval, the message is sent by the NDC server to that tracker when the emergency ends, to purge its auxiliary repeating interval.

Trackers acknowledge receipt of the "Purge Assigned Repeating Intervals" message by setting the appropriate status bit in their next periodic update, or, if necessary, by requesting a one-time slot to provide an acknowledgment. A tracker whose main repeating interval slot is purged may use that slot a final time to provide the acknowledgment in a state and status tracker packet. When the NDC server receives a purge acknowledgment, it may reassign the repeating interval slot at that time, or wait until a self-purge update count has been reached to re-assign it.

When a Text or Pre-defined text message is sent to a tracker, a pre-defined or custom response set may be identified, indicating the text labels associated with the mobile data terminal softkeys when the message is displayed. When a softkey is pressed to respond to a message, the softkey number is returned to the NDC server in a "Message Response State and Status" or a "Message Response Reduced State and Status." A "Message Response Acknowledge" base message (Table 28) acknowledges the NDC server's successful receipt of a response packet. A message response is only discarded by the tracker module if it successfully received an acknowledgment within 2 minutes; otherwise, the response is re-sent.

A "Site Dispatch" Message (Table 29) aids in automating the fleet operator's ability to determine when a specific tracker has arrived/departed from a job site, by providing the tracker module a pair of latitude/longitude values that define the tracker's next job site, and a text description of the site location (destination address). Upon receipt, the tracker module acknowledges the message using a "Message Response State and Status" or "Message Response and User Data" packet.

Trackers send "Site Status" packets when they enter or leave one of their known sites. A "Site Purge" Message packet (Table 30) from the NDC requests a tracker to remove one of its known sites. After receiving this packet, the tracker will no longer provide a "Site Status" message for the site associated with the "Site ID" specified in the "Site Purge" Message.

A "User Data Acknowledge" packet (Table 31) serves to acknowledge the NDC's receipt of a reliable user data message from a vehicle's tracker. The tracker retains a copy of all reliable user data packets until it receives this acknowledgment message from the NDC server. If the acknowledgment is not received within 2 minutes, the tracker will resend the reliable user data packet.

An "NDC server Boot Sequence ID" may be used by the tracker to determine if the NDC server of a navigation grid (see the reference to and discussion of the "Grid Identification" packet above) has re-booted. When a tracker module discovers that this ID has changed, it purges all RF state information (including RI Slot assignments) received with a previous boot sequence ID. New RF state information received is then associated with the new "NDC server Boot Sequence ID." The "NDC Server Boot Sequence ID" allows trackers in low-power mode or trackers that have been out of FM subcarrier range to determine if their RI Slot and other information is still valid. Trackers that have been so for an extended period of time must ensure that the NDC Server boot count has not changed before they provide a tracking update. A "Grid Identification Packet2" (Table 32) provides the "NDC Server Boot Sequence D."

A "Site Status Acknowledge" packet (Table 33) is used to acknowledge the NDC's receipt of a reliable "Site Status" message from a tracker. The tracker retains a copy of each reliable site status message packet until it receives this acknowledgment message from the NDC Server. If the acknowledgment is not received within 2 minutes, the tracker re-sends the reliable "Site Status" packet.

B. Tracker Messages

Tracker messages are transmitted from the trackers to the NDC over the TDMA UHF radio network. Tracker data consist of navigation state information, responses to network related commands from the NDC, paging/messaging responses, and user specific data. Each tracker has its own unique assigned repeating interval slot(s) to transmit its data. The data are received by the network hubs and transmitted to the NDC when each frame is complete. According to an aspect of the invention, since a tracker data packet may be received by more than one hub, the NDC is provided with a capability to perform diversity processing to aid in recovering corrupted data.

Although, according to the invention, trackers generally have an assigned continuous repeating interval time slot in the TDMA network, provision is made for trackers with low update rate requirements to operate in a polled mode, in which NDC 10 must request such low update-need tracker installed on a vehicle 17 to transmit during a single repeating interval time slot. A short time before the tracker's assigned transmit time, the tracker must assemble a packet of data for transmission. Based on the broadcast FM bit-sync received at FM receiver 58 of NTCC roof module 55 and estimated distance to the broadcast antenna 53 (FIG. 6), the applicable tracker must begin its transmission at its assigned transmit time within its assigned repeating interval slot with an accuracy of about one microsecond.

Over each frame, each Network Hub 11-1, etc., attempts to receive data from trackers in every time slot. At the end of the frame, Hub-received packets are packed into a single message and sent via modem to the NDC 10. The NDC server 42 performs error correction and diversity processing on the tracker packets from all of the hubs. Tracker state data is logged and/or transmitted to the applicable CCS and/or NDC Command Stations via the TCP/IP or other connectivity application. Summarizing, the processing steps are:

1. On the frame prior to its assigned repeating interval transmit slot, the tracker:
   a) Forms a data packet to be transmitted;
   b) Performs encryption on the message;
   c) Performs error control coding on the message (preferably using a (12,8) code, although a different code may be employed if desired);
   d) Performs bit interleaving (a complicated interleave pattern is required to reduce bit errors when the data is shifted by 1 bit from truth, to permit the hub baseband processing. The interleave scheme provides a depth of 11 bits, which improves burst error correction capability).
2. A high resolution timer synchronized to the GPS integer second using the FM bit-sync and tracker position is set to trigger the tracker transmission at the appropriate time with an accuracy of about one microsecond.
3. Each hub attempts to clock in data at the appropriate time for each slot.
4. At the end of a frame, the hubs send all tracker data received over the frame to the NDC.

Figure 8:
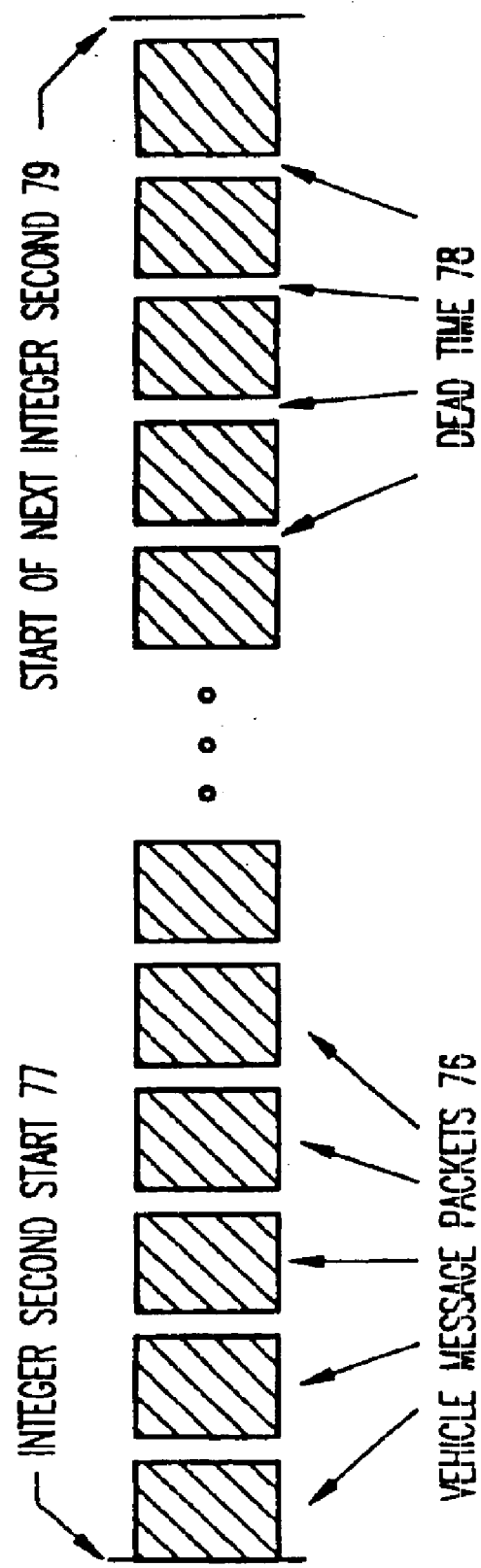
FIG. 8 is a diagram of an exemplary tracker module message transmit frame.

Tracker message timing, and format of the tracker data block must be considered. The tracker broadcast TDMA network consists of 168 frame cycles in one week, with each frame cycle having 3600 one second long frames. Each frame is divided into several tracker transmit time slots. The number of slots depends on the tracker message length, the transmit bit rate, and the required gap between slots for transmitter power up/down and message propagation delay. The transmit rate is 7812.5 bps (15625 bps Miller encoded). A tracker message length is 144 bits, 8 Miller bits of preamble (10101010). The transmit data requires 18.944 milliseconds. A total slot time of 20 milliseconds is therefore allocated to allow for speed of light delays and transmitter power on/off time; accordingly, 50 tracker transmit slots are available on each frame. An example of one tracker transmit frame is shown in FIG. 8, in which vehicle (tracker) message packets 76 are sequentially transmitted in their (the trackers') respective assigned slots from the start 77 of an integer second, and followed by an interval of dead time 78 (if necessary) which is sufficient to occupy the balance of the frame up to the start 79 of the next integer second.

Because of hardware limitations and CPU load times required to setup transmit timers and clocks, a tracker cannot transmit in two adjacent time slots. The gap between tracker transmission slots must be large enough to account for propagation delay of the radio signal through the air and time required for the transmitter to come on and off power. The worst case propagation delay is 1.2 msec. This is the time it takes light to travel twice the length of the navigation grid diagonal. A gap time this long will prevent the transmission from a tracker that is 181 Km from the FM transmitter and is using only the FM bit-sync for transmit timing from overlapping with the transmission from a tracker that is near the FM transmitter and using GPS to aid transmit timing. Given tracker transmit power and antenna heights, a reasonable distance at which a hub can hear a tracker transmission will be about 30 Km. Therefore, the gap time must support about 211 Km or 0.7 msec. The radio on/off power time is required to be less than 0.1 msec. Hence, the total gap time between tracker transmissions must be at least 0.8 msec.

The normal tracker data packet requires 90 data bits (including 24 user data bits). The other tracker data packets require 90 or 96 data bits. These message packet size requirements directly drive error control coding requirements for the packets. The present exemplary tracker packet error coding design uses a (12,8) code for all tracker packets, which provides a total packet length of 144 bits with 96 data bits for all time slots.

The trackers use the one second interval bit-sync in the FM broadcast for their transmit timing. The transmission time is accurate to within one microsecond. In the present approach, the tracker estimates the integer second time from the received FM broadcast bit-sync event time. The timer value of a TPU (i.e., time processing unit of the 68332 microprocessor used in the trackers, CCSs, and Networks Hubs) for each integer second will then be known. From that, the TPU timer value for the start of the tracker's transmit time can be computed. The TPU is programmed to assert the transmit key to start the output data clock precisely at the start of the transmit slot time, and to de-assert the key to stop the data clock when the message is complete.

For data clocking at the Network Hub (e.g., 11-1, which is to be described in greater detail in the subsequent description of FIG. 31, but for present purposes brief reference is now made to the latter), a digital signal processor (DSP microprocessor) 80 is used at the Hub to demodulate the message data received from the vehicle trackers by the Hub's UHF receiver 81 and provide it to the Hub CPU 82. CPU 82 determines the TPU time (of the Motorola 68332 microprocessor 83) for the integer second based on the FM broadcast bit sync received at FM receiver 85. The two receivers 81, 85 and the DSP 80 are on an RF card 86 of the Hub. CPU 82 signals DSP 80 to begin sampling UHF data at the start of each transmit slot time. The DSP then collects data, recovers the bit clock, and samples the bits. It performs Miller decoding, de-interleaving, and (12,8) error detection for up to 13 different bit delays to support the unknown speed of light delay from the tracker to the hub. The bit delay with the lowest number of code words with errors is selected, and that data is clocked to CPU 82 for transmission by the Net Hub to NDC server 42 (FIG. 3) at NDC 10 via a modem 87 or other connectivity option. DSP 80 must complete all of its processing in the 20 millisecond window available for each tracker transmission.

As described earlier herein, each one second frame is divided into fixed length tracker packet transmit slots. Since the number of slots within a frame is also fixed, the trackers in the system of the invention must share these transmit slots. Most trackers transmit their state, position, and/or user data information on a periodic basis. Accordingly, a periodic slot allocation scheme is selected for use by which to share individual slots within a frame across an interval of time.

Figure 9:
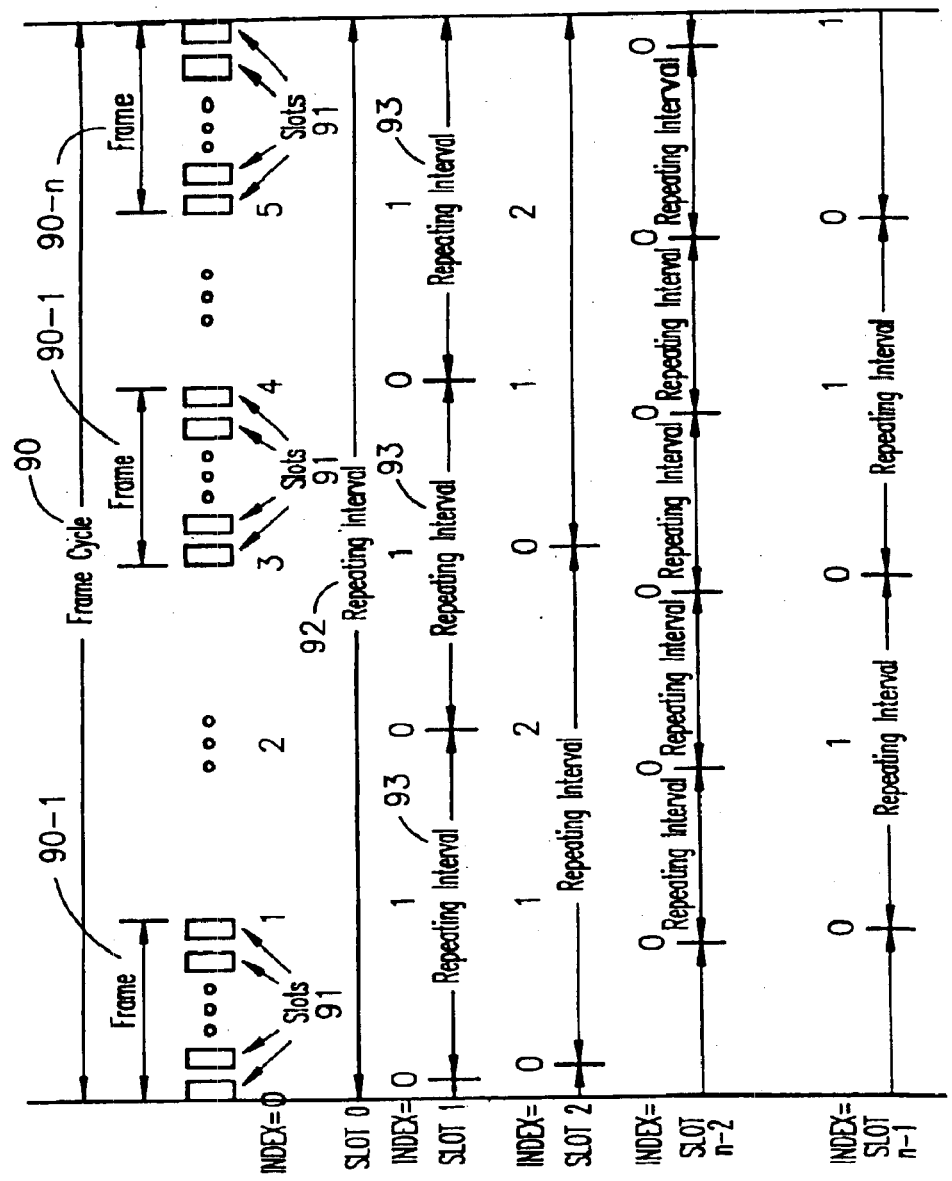
FIG. 9 is a diagram illustrating the-repeating interval relationship to slots, frames and frame cycles for tracker message packets.

In this periodic slot allocation scheme, individual slots are associated with repeating intervals. This allows trackers with a common periodic update rate to share a specific slot across an interval (equivalent to the common periodic update rate) of time that contains multiple frames and is a divisor of 3600. FIG. 9 illustrates a repeating interval for several individual transmit slots for tracker message packets, showing the repeating interval relationship to slots, frames, and frame cycles. Frame cycle 90 consists of a multiplicity of frames (e.g., 90-1, . . . , 90-$i$, . . . , 90-$n$) as mentioned above. Each frame contains a multiplicity of slots 91 which are allocated to tracker message transmissions according to the scheme. The interval index for the repeating interval 92 associated with slot 0 is different from the interval index for the repeating interval 93 for slot 1, and so forth for slots 2, . . . , $n$-2, $n$-1, n. The interval index shown may be calculated using the following equation:

Repeating interval index=(frame *ID*) mod (interval length)

Trackers are assigned one main repeating interval and/or multiple auxiliary repeating intervals to transmit their tracking data. Tracking data is transmitted by the trackers during their main repeating interval until they are informed to cease transmitting by the NDC server, or until the tracker's state changes (e.g., switches to low-power mode). Main intervals are only assigned to trackers with continuous or LOT tracking service. Trackers transmit their tracking data during auxiliary intervals for a specified number of times unless their state changes or the NDC server informs them otherwise. One or more auxiliary repeating intervals may be assigned to trackers of all service types.

As indicated in FIG. 9, each repeating interval is defined by a slot, a repeating interval index, and an interval length. In addition, auxiliary repeating intervals have an interval count. Since a tracker may calculate the frame ID using the GPS second, the repeating interval index may also be calculated using the repeating interval length and the frame ID. Trackers will transmit their tracking information in their assigned slot during the frame when the (frame ID) mod (interval length) is equal to their assigned interval index. Auxiliary repeating interval updates are provided by trackers an interval count number of times. Trackers that are assigned an auxiliary repeating interval with an interval count of −1 will provide tracking updates indefinitely during their assigned repeating interval.

As noted above, very long update intervals—e.g., longer than 3600 seconds—may be handled by polling. Trackers having such long update needs do not have an assigned continuous repeating interval, but transmit only on command from the NDC server. Tracker update repeating interval rates are summarized in Table 34 (Appendix B).

Since slots within a frame are dynamically associated with a repeating interval, so that trackers with a common tracking update rate may share a slot across an interval of time, the NDC server uses a set of repeating interval slot assignment algorithms to dynamically associate slots with repeating intervals, as follows.

Initialization:
  Make all slots network entry slots.
  Add a tracker to a desired repeating interval for a desired interval count:
  1) Add tracker to best available repeating interval:
    Search for a slot associated with the desired repeating interval with the least amount of space available, If an available repeating interval is found, add the tracker to the repeating interval for the desired interval count and set interval status equal to assigned, If tracker was not added to a repeating interval, go to step 2, Else, grant request.

2) Associate desired repeating interval with an available network entry slot.

Search for an available network entry slot,

If an available network entry slot is found, associate the slot with the desired repeating interval, Else, if repeating interval ≠ to frame cycle length, change desired repeating interval to next available repeating interval. Go to step 1

3) Add tracker to the interval associated with a slot in step 2.

Add tracker to the interval for the desired interval count,

Grant request.

Find the tracker ID for a received packet (and decrement interval count if necessary):

1) Use the packet's slot number to determine if the slot is associated with a repeating interval.
2) If the slot is associated with a repeating interval, determine the tracker ID using the interval index, reset the missed update count, decrement the interval count if necessary, set the interval status to active, and free slot if necessary.

Compute the interval index: (packet frame ID) mod (interval length)

Use the interval index to determine the tracker ID.

Set the missed update count to 0.

If interval count is ≠ to −1, decrement the interval count.

If interval count=0, remove tracker from repeating interval. If no other trackers are associated with this slot's repeating interval, convert this slot to be a network entry slot.

3) Else, the slot is a network entry slot. The tracker ID should be in tracker packet.

Process empty slot:

1) Use the missed packet update slot number to determine the slot type.
2) If the slot is associated with a repeating interval, increase the tracker's missed update count.
3) If interval status=assigned or interval status=active, poll tracker.
4) If interval status=assigned, re-broadcast repeating interval slot assignment.

Remove tracker from repeating interval:

1) Search for slot associated with the tracker's repeating interval.
2) Remove tracker from repeating interval.

Set interval status=empty.

Send base packet to tracker to purge assigned repeating interval.

3) If no other trackers are associated with this slot's repeating interval, convert slot to be a network entry slot.

Figure 10:
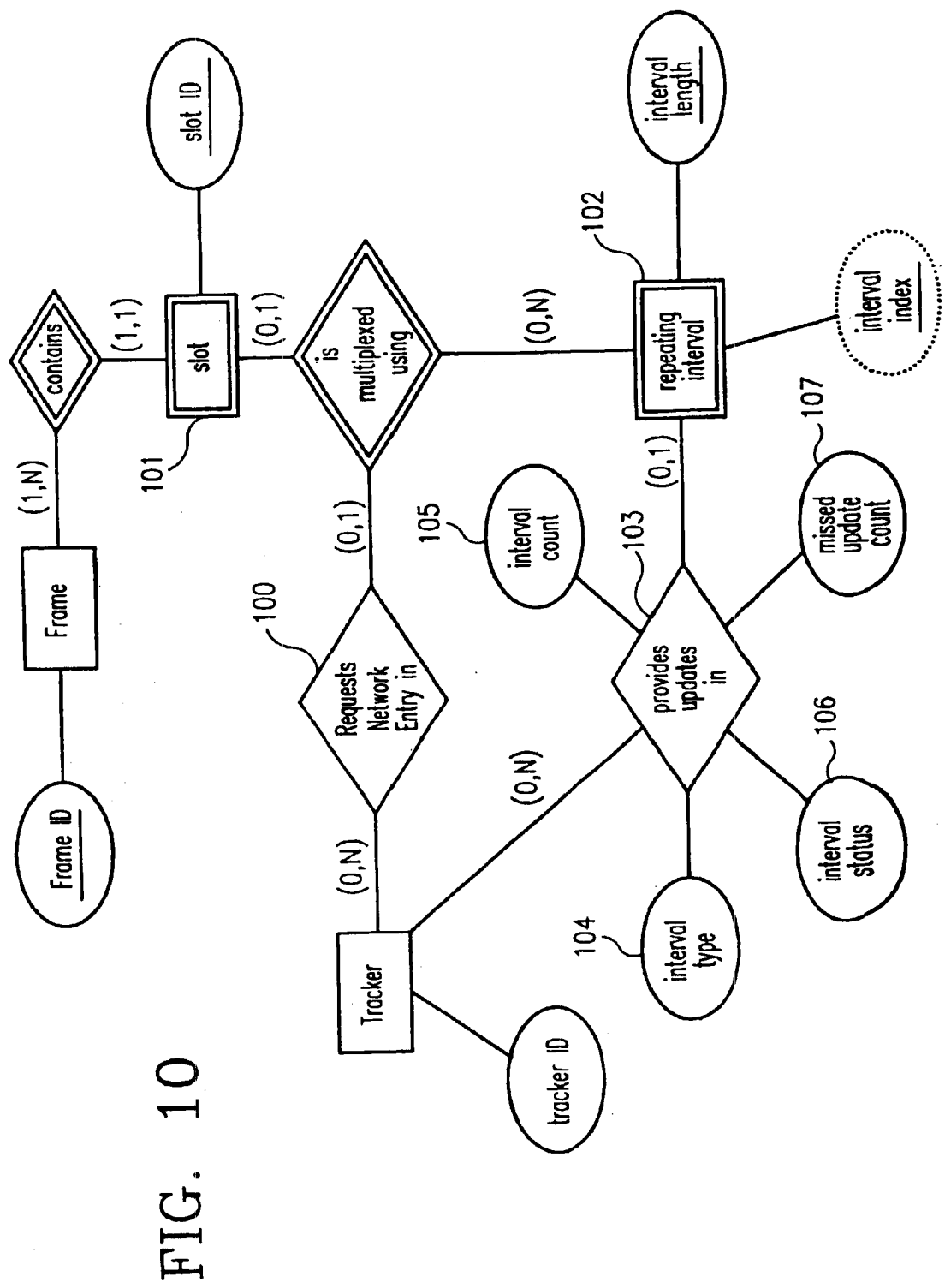
FIG. 10 illustrates the relationship between trackers, slots, and repeating intervals.

The NDC server 42 maintains information in memory regarding the relationship between trackers, slots, and repeating intervals, as a form of repeating interval slot assignment storage. FIG. 10 is a diagram that illustrates the repeating interval slot entity relationship, with the diagram notations that:

| | |
|---|---|
| box = entity | oval = attribute |
| double box = weak entity | underline = key |
| diamond = relationship | dashed underline = partial key |
| double diamond = weak relationship | dashed oval = derived attribute |
| (x, y) = (minimum, maximum) | |

Also, uncaptured constraints are as follows:

1<=interval length<=frame cycle length

Interval length is a divisor of the frame cycle length

Interval index=(Frame ID) mod (interval length)

If the interval count=−1, trackers provide updates indefinitely.

Interval status={empty, assigned, active, inactive}

Interval type={main, auxiliary, none}

Thus, for example, the "Requests Network Entry in" relationship (diamond 100) in FIG. 10 indicates that trackers may request network entry in slots (double box 101) that are not associated with a repeating interval (double box 102). Hence, trackers must be notified of valid network entry slots before they attempt to request network entry. And the "provides updates in" relationship (diamond 103) indicates that trackers provide tracking updates in repeating intervals (double box 102). In addition, attributes such as interval type (oval 104), interval count (oval 105), interval status (oval 106) and missed update count (oval 107) are associated with this relation. Interval count indicates the number of repeating intervals a tracker should transmit its tracking information. Missed update count indicates the number of successive times a tracker has missed providing its tracking update during its assigned repeating interval. Interval status is an enumerated type that indicates if an interval is empty, assigned, active, or inactive. Interval type is an enumerated type that indicates if a repeating interval with a non-empty status is a main or auxiliary interval or no interval is assigned.

The tracker message block format of the data transmitted by the trackers consists of an error coded and bit-interleaved data block. Since the UHF transmitter/receiver requires that the data contain frequent state changes so that the phase-locked-loop (PLL) does not chase the data, the transmit data is Miller line encoded to ensure such state changes content.

The basic data size requirements for information transmitted by the trackers, and the minimum space requirements for tracker state, network status, and network command responses are defined as follows. Tracker state consists of position, speed, and direction. As previously stated, the PROTRAK system navigation grid for the presently preferred embodiment is about 262 Km on a side. The grid is broken down into 1024 8.192 Km by 8.192 Km grid zones. The position supplied by the tracker consists of a grid zone and an offset into the zone from the southwest corner. The nominal navigation grid is square, but other forms such as odd-shaped grids may be used if desired or more suitable in a particular system/network configuration. The odd shaping may be accomplished by arranging zones in unique patterns.

FIG. 11 is a diagram of a nominal navigation grid, for a latitude of 45 degrees at the center. It should be noted that in practice (but not shown in the idealized Figure) the curvature of the earth causes the grid to be wider in latitude at the north than in the south. The lines of constant longitude bounding the grid are about 3 Km closer together at the north end than at the south end of the grid.

For a given grid, the grid center latitude and longitude ($\phi_0$, $\lambda_0$) is provided to the trackers by the NDC in the grid identification packet. The tracker computes its latitude and longitude, ($\phi$, $\lambda$), and then computes the offset from the grid center: $\Delta\phi = \phi - \phi_0$ and $\Delta\lambda = \lambda - \lambda_0$. The north and east delta positions from the grid center are:

$$\Delta N = \rho_0 \Delta \phi$$

$$\Delta E = \nu_0 \Delta \lambda \cos(\phi)$$

where $\rho_0$ and $\nu_0$ are the earth radii of curvature:

$$\nu_0 = a/\text{sqrt}(1 - e^2 \sin^2(\phi_0))$$

$$\rho_0 = \nu_0(1 - e^2)/(1 - e^2 \sin^2(\phi_0))$$

where a is the earth semi-major axis and e is the earth eccentricity.

For example, the lower left corner of the 8.192 Km square containing the position is:

$$\Delta N_{8K} = \text{floor}(\Delta N/8192)$$

$$\Delta E_{8K} = \text{floor}(\Delta E/8192)$$

The offset into the square is:

$$\Delta N_{off} = \Delta N - 8192(\Delta N_{8K})$$

$$\Delta E_{off} = \Delta E - 8192(\Delta E_{8K})$$

For the nominal square navigation grid, the 8 Km zone number is computed as $$Z = (16 + \Delta E_{8K}) + 32(15 - \Delta N_{8K})$$

The NDC computes the original latitude and longitude by adding the north and east offsets to the north and east coordinates of the SW corner of the zone indicated by the tracker using the following equations:

$$\Delta N_{8K} = 15 - (Z/32)$$

$$\Delta E_{8K} = (Z \mod 32) - 16$$

$$\Delta N = 8192(\Delta N_{8K}) + \Delta N_{off}$$

$$\Delta E = 8192(\Delta E_{8K}) + \Delta E_{off}$$

Then it computes latitude as:

$$\phi = \phi_0 + \Delta N/\rho_0$$

Then longitude may be computed as:

$$\lambda = \lambda_0 + \Delta E/(\nu_0 \cos(\phi))$$

The full latitude and longitude are provided to the applicable CCS by way of message data from the tracker to the Network Hub(s), which is forwarded on to the NDC and then to the customer site.

The amount of data required to describe the tracker state is 48 bits. The zone ID number requires 10 bits. The north and east offsets within the zone each require 11 bits for a resolution of 4 meters. Speed requires 7 bits for a resolution of 0.5 m/sec (about 1.1 mph) and a maximum value of about 143 mph. Heading requires 7 bits for a resolution of 0.015625 semicircles (about 2.8 deg). Two state data validity bits are defined. Two additional spares can be provided to make the state data fit simply into a 48 bit "Tracker State Data Block" (of which Byte/Bit Definitions are summarized in Table 35).

A "Reduced State Data Block" (Byte/Bit Definitions summarized in Table 36) is required so that trackers may provide their full tracker ID number, respond to user messages and/or NDC Commands, and provide user data. This data block contains only a low-resolution position (8 meters), and requires 34 bits.

A "Network Status Code" (Definitions in Table 37) is used by trackers to enter and exit the RF network. Additional codes may be provided to automate tracking service changes. In the present exemplary embodiment, nine network status codes, out of an available total of 32, are defined.

Most data packets provide room for customer defined data to be provided to CCSs. The NDC simply passes the data through to the customer, the content of the data being specific to the needs of the respective customers. The user data consists of a minimum of 1 byte, and may be as long as a full tracker transmit packet. All of this is defined by the user, and the user data is referred to here as the "User Data Block."

Text messages, pre-defined messages, user data, and site dispatch messages are acknowledged by trackers to indicate their receipt. In addition, text messages, pre-defined messages, and site dispatch messages may require two responses, one being a return receipt that indicates when the message was read, and the other indicating the recipient's softkey response. Acknowledgments/responses are sent to the NDC Server in a "Message Acknowledgment/Response" Block (Table 38).

A packet ID number is used to identify each packet. The packet ID requires 4 bits for a total of 16 different packet types. The first 4 bits of each packet are reserved for the ID Block.

Tracker data packet formats include the following. The tracker transmit data block consists of a single data packet, each of which is 96 bits long for a (12,8) error coded block. Initially, all trackers must send a "Net Entry Request" Packet to enter the RF network. The latter packet allows trackers to request their main repeating interval slot or a single auxiliary repeating interval.

Once in the RF network, trackers can send a variety of different packet types depending upon the tracker state. The normal packet used by periodic trackers is a state and status packet. A short state and status packet is also used by trackers when the NDC Server requests trackers to provide their tracker ID number. Trackers needing to send a large amount of user data may use the "User Data" packet and/or "Short User Data" packet during its repeating interval. When trackers need to send their tracker ID number, position information, and user data, a "Reduced State User Data and Status" data packet may be used. Trackers needing to acknowledge user data or acknowledge/respond to text/pre-defined messages may use "Message Response" and "User Data" packets.

Tracker packet types are identified by packet ID, with space being provided for 16 different packet types (summarized in Table 39). Unused or spare data bits and bytes in the packets are set to zero. Packets consist of bit-packed data blocks, each of which has been defined earlier herein.

A "Net Entry Request" packet (Bit Definitions shown in Table 40) is used by tracker modules to enter the RF network. Trackers may request their main repeating interval slot or a one-time auxiliary repeating interval slot. Before a tracker is allowed to send such a request, it must receive an "Available Network Entry Slots" base packet and continue to successfully receive the FM base broadcast until it sends a "Net Entry Request" packet. Of the network entry slots available, trackers will generate a random number to select the next frame to send the request and generate a second random number to select an available slot. For each random number generated, the trackers may use their tracker ID. If a tracker does not receive a repeating interval (RI) slot assignment within 60 seconds after sending a network entry request, it resends the request.

Since it is possible that multiple trackers may talk within the same slot, the "Net Entry Request" packet indicates the RI slot type and tracker ID multiple times to allow the NDC server to determine if the packet is valid. Trackers must purge their main RI slot prior to sending a "Net Entry Request" packet. For example, a tracker that has been in "low-power" mode will purge its low power slot before sending the net entry request. This rule allows the NDC server to release re-assigned RI slots associated with a tracker requesting net entry.

A "State and Status" packet is the normal packet transmitted by periodic trackers. This packet contains full resolution tracker position, velocity, network status information, and five user data bytes. The "State and Status" packet bit definitions are shown in Table 41.

A "Reliable User Data" packet (Bit Definitions in Table 42) provides several bytes of user data. Instead of providing position information during its assigned repeating interval, a tracker may utilize this user data packet to send ten user data bytes at one time. If necessary, a one-time repeating interval slot may be requested to send/resend this packet.

Upon receipt of a "Reliable User Data" packet, the NDC server broadcasts a "Message Response Acknowledge" message with the same User Data Sequence ID. Trackers must retain a copy of each "Reliable User Data" packet until the NDC server successfully acknowledges it. If an acknowledgment is not received within 2 minutes, the tracker will resend the user data packet.

A "Short State and Status" packet (bit definitions illustrated in Table 43) is broadcast by trackers during their normal transmission slot when the NDC Server requests that trackers send their status. It contains full resolution tracker position, velocity, one user data byte, and network status information.

A "Reliable Short User Data" packet (Table 44 showing its bit definitions) is transmitted to provide several bytes of user data. Instead of providing position information during its assigned repeating interval, a tracker may employ this user data packet to send six bytes of user data at one time. Upon receipt of a "Reliable User Data" packet, the NDC server broadcasts a "Message Response Acknowledge" message with the same User Data Sequence ID. Trackers must retain a copy of each "Reliable User Data" packet until the NDC server successfully acknowledges it. If an acknowledgment is not received within 2 minutes, the tracker resends the packet.

A "Reduced State User Data and Status" packet (bit definitions shown in Table 45) is used by trackers to provide a reduced state and status with user data. The packet contains network status, the full tracker ID number, reduced state data, and user data.

A "Message Response and User Data" packet (bit definitions shown in Table 46) is broadcast during a tracker's normal transmission slot. This packet provides both an acknowledgment/response and user data. If necessary, tracker modules may elect to request a single slot to provide this response to the NDC server more quickly than waiting for their normal transmission slot to send the packet. Single slots may be assigned to a tracker using a "Net Entry Request" packet.

A "Short Message Response and User Data" packet (Table 47) is broadcast during a tracker's normal transmission slot when the NDC server requests that trackers send their tracker ID. This packet contains the full 30 bit tracker ID, an acknowledgment/response, and user data. As in the case of the regular "Message Response and User Data" packet discussed above, if necessary trackers may elect to request a single slot to provide this response to the NDC server more quickly than using their normal transmission slot. Single slots may be assigned to a tracker using a "Net Entry Request" packet.

A "Site Dispatch" message from the customer dispatch office (through a CCS) indicates to the tracker the area of a job site. Consequently, the tracker is able to determine when the tracker has arrived at or departed from a job site. A "Site Status" packet (Table 48) is used by a tracker to indicate job site arrival/departure. This packet indicates the tracker ID, message sequence ID (originally associated with the site dispatch message), arrival/departure status, time of arrival/departure, the source of arrival/departure status, and user data Geocoding with mapping data may not always be accurate. Hence, it is not always possible to determine if a tracker has reached the job site using the expected latitude/longitude for an address. The tracker sends a "Site Status" packet based on latitude/longitude if arrival/departure occurs (using the latitude/longitude values in the "Site Dispatch" message) to allow the user to manually indicate arrival/departure. The site source bit in this packet indicates how arrival/departure was determined. Initially, the "Site Status" packet may be sent twice for arrival and twice for departure using the two status sources. If necessary, here also the trackers may elect to request a single slot to provide this response to the NDC server more quickly than would occur using their normal transmission slot. Single slots may be assigned to a tracker using a "Net Entry Request" packet.

A "Built-In Test" (BIT) tracker packet is sent to provide the NDC with information about trackers to aid in system testing and to determine whether trackers are functioning properly. At a rate specified in the "RI Slot Config" base packet, trackers provide one of the valid "BIT" packets in an auxiliary slot requested by each tracker. Each "BIT" packet type should be sent in rotation. If necessary, the "BIT" packet type rotation may be modified to supply urgent built-in test information. The bit definitions for the "BIT" Packet are shown in Table 49, and the various types of "BIT" packet data blocks are shown in in Tables 50 (Network and RF System, Type=0), 51 (Vehicle and Environment, Type=1), 52 (Navigation, Type=2), 53 (Version, Type=3), and 54 (Ready Mix, Type=4). All values supplied in a "BIT" packet data block indicate the values recorded since the last "BIT" packet of the same packet type was supplied to the NDC server.

When a tracker receives a pre-defined message, discussed earlier herein, it displays the known message associated with the specified pre-defined message ID/16 bit CRC. However, if the tracker does not know the message associated with that ID, or determines that the CRC of the known message does not match the CRC in the received packet, it may request the message definition by transmitting a "Pre-Defined Message Definition Request" packet. For more efficient use of bandwidth, this packet may be sent by the tracker in a network entry slot.

When the NDC server receives this request packet, it broadcasts a "Pre-Defined Message Definition" packet (Table 55) that provides the tracker with a pre-defined message ID/message pair. Since pre-defined messages are defined on a customer-by-customer basis, all trackers associated with the same customer benefit from this message definition packet. Hence, trackers need not always request the message definition packet from the NDC server even when they receive a pre-defined message ID for the first time.

V. Time Division Multiple Access (TDMA) Network Timing

As has been discussed hereinabove, a feature of the TDMA network is that it allows multiple users of a single channel or frequency by assigning specific time slots to each user to use exclusively for transmission of data. Efficient use of bandwidth in such a network requires that the gap times between transmissions of each user, which is wasted time, be minimized. The gap time must be sufficient to account for uncertainties in user clocks, propagation delays, and transmitter turn-on and turn-off times; Minimization of clock uncertainty is a primary objective of this aspect of the invention.

Transmitter on/off times are a function of the electronics hardware. In the overall system, the vehicle computer network interface hardware is optimized to turn on and off in less than 128 microseconds. Minimization of propagation delays is limited by speed of light delays between vehicles and hub receive sites. Approximately 800 microseconds are allotted in the network for worst case near/far vehicle locations of 240 kilometers. With these parameters fixed, then, attention is turned to minimizing the clock uncertainty.

The simplified block diagram of FIG. 1, described earlier herein but to which reference is again made for purposes of the present discussion, illustrates the entire TDMA wireless network utilized in the exemplary embodiment of the invention. NDC 10 maintains precise synchronization of the vehicles 17-1, 17-2, . . . , 17-n on-board trackers and the Network Hubs 11-1, 11-2, . . . , 11-i to enable operation of the TDMA network. Synchronization of the timing of the trackers with each other and with the Network Hubs which receive the data transmitted by the trackers is achieved through the reception of a synchronization pattern in the data transmitted over the modulated subcarrier broadcast from FM radio station 12. Receivers in the NDC, the trackers and the Hubs receive the FM subcarrier data, and these units align their internal clocks to synchronization pulses contained in the data.

The error budget for clock synchronization between each vehicle (or more specifically, the tracker thereof), e.g., 17-1, and the Net Hub sites, e.g., 11-1, is 10 microseconds. It is essential that trackers have the correct time within this window, or run the risk of transmitting at the same time as another tracker, reducing the likelihood that either transmission will be correctly received. Similarly, if Hub receivers (e.g., 81, FIG. 31) lack the correct time within the 10 microsecond window, they may not activate at the correct time to receive tracker transmissions.

The internal clock reference for each network component, SCC, tracker, Hub receiver, and NDC receiver, in the exemplary embodiment is a temperature compensated crystal oscillator (TCXO) with 1.5 ppm frequency stability. This means that the clock will generate less than 1.5 microseconds of error in one second; however, the 10 microsecond error budget would be violated in seven seconds of free running operation. Clocks in all of the vehicle and receive sites will drift at different rates and different directions. A stable clock reference is required to keep all of the clocks synchronized to each other. A GPS receiver located at the NDC as opposed to the transmitter site, is the stable time reference for the TDMA network.

Figure 12:
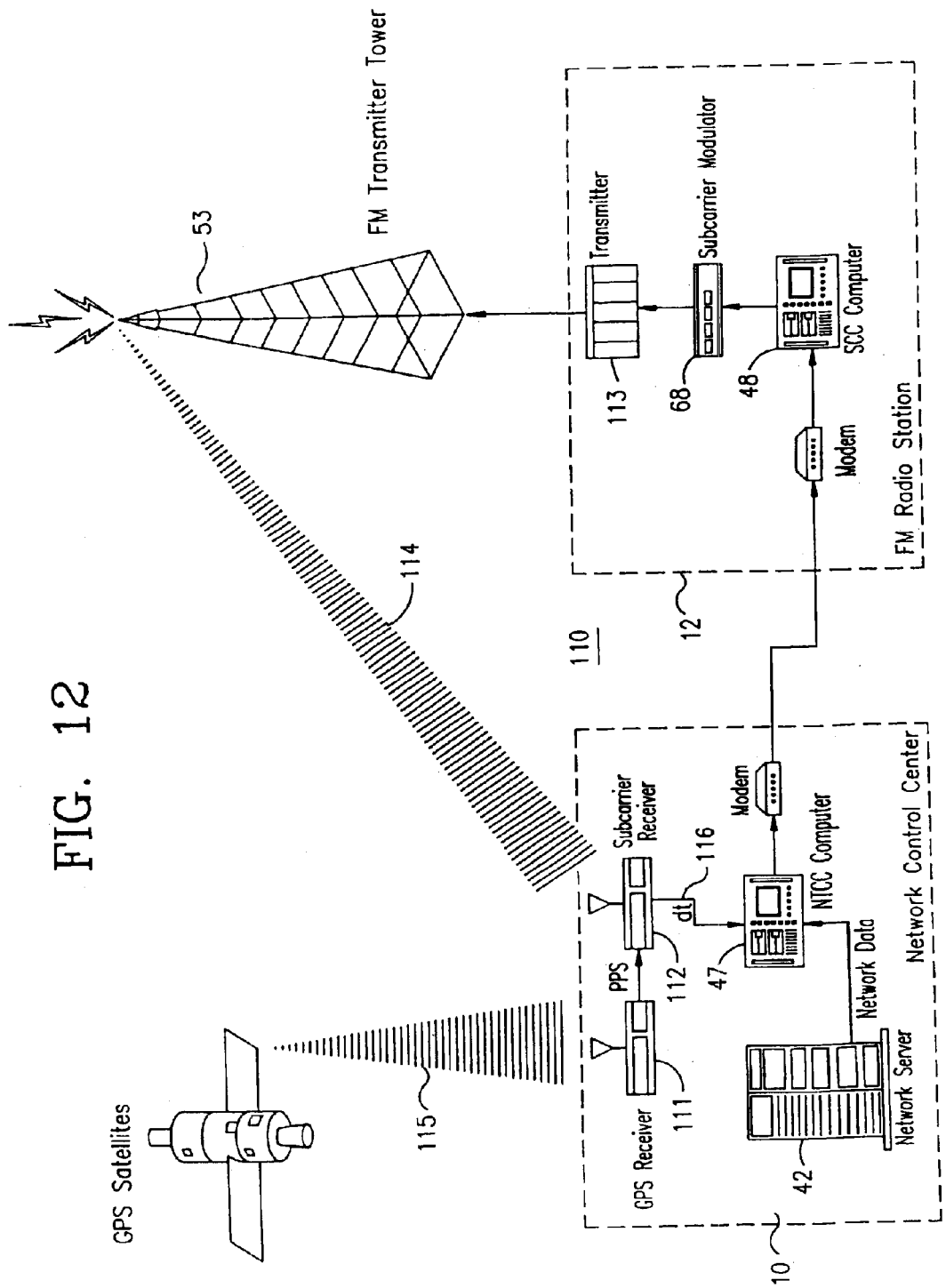
FIG. 12 is a diagram of a timing control phase locked loop (PLL) according to an aspect of the invention for the TDMA network of FIG. 1.

FIG. 12 is a simplified diagram of the timing control loop 110—a remote timing control phase locked loop (PLL)—for the TDMA network. Timing control loop 110 includes a GPS receiver 111 time reference, an FM subcarrier receiver 112, and the NTCC 47, all located at NDC 10 (here and occasionally elsewhere herein referred to as the Network Control Center). PLL 110 also includes SCC 48 at the FM radio station 12 to control the timing of the transmitted data, and subcarrier modulator 68 to provide the data to the mixing equipment in a transmitter 113 at the radio station, for broadcast on FM subcarrier signal 114 via transmitter tower 53.

Crystal oscillators (including TCXOs) are relatively accurate time sources, but drift over time without periodic correction. The GPS receiver 111 acts as a stable, precise time reference for the TDMA network timing synchronization, that provides a Pulse Per Second (PPS) on a discrete output interface. The PPS is at a GPS time indicated by a message in the serial output interface of receiver 111, typically on integer second boundaries, and is typically accurate to about 300 nanoseconds when subject to Selective Availability introduced into the GPS satellite signals 115.

FM subcarrier receiver 112 at NDC 10, which is identical to the FM subcarrier receivers used by the trackers and the Network Hubs, receives the synchronization pulses from SCC 48 in the FM subcarrier signal 114. The same hardware ensures that variation in delay through the receivers is minimized. The subcarrier receiver 112 determines the time of reception of the synchronization pulses relative to the reception of the PPS from GPS receiver 111. The difference dt between the average time of the synchronization pulses and the time of the PPS is provided through a serial interface 116 to NTCC 47. The NTCC software processes the time difference, and computes in different ways depending upon its mode of operation a time correction command to be sent to SCC 48. In its normal, continuous mode, time corrections are computed using a low bandwidth control loop.

Every second, SCC 48 sends a new block of data which is slightly shorter than one second in length, leaving a very short gap in the data from one second to the next. A sequence of three synchronization pulses is present at the start of the data. SCC 48 applies the received time correction commands to the time at which it starts sending the next block of data. The gap between data blocks allows the start time of the data to be adjusted to be earlier or later than the interval used by SCC 48 at the time the command was issued.

Figure 13:
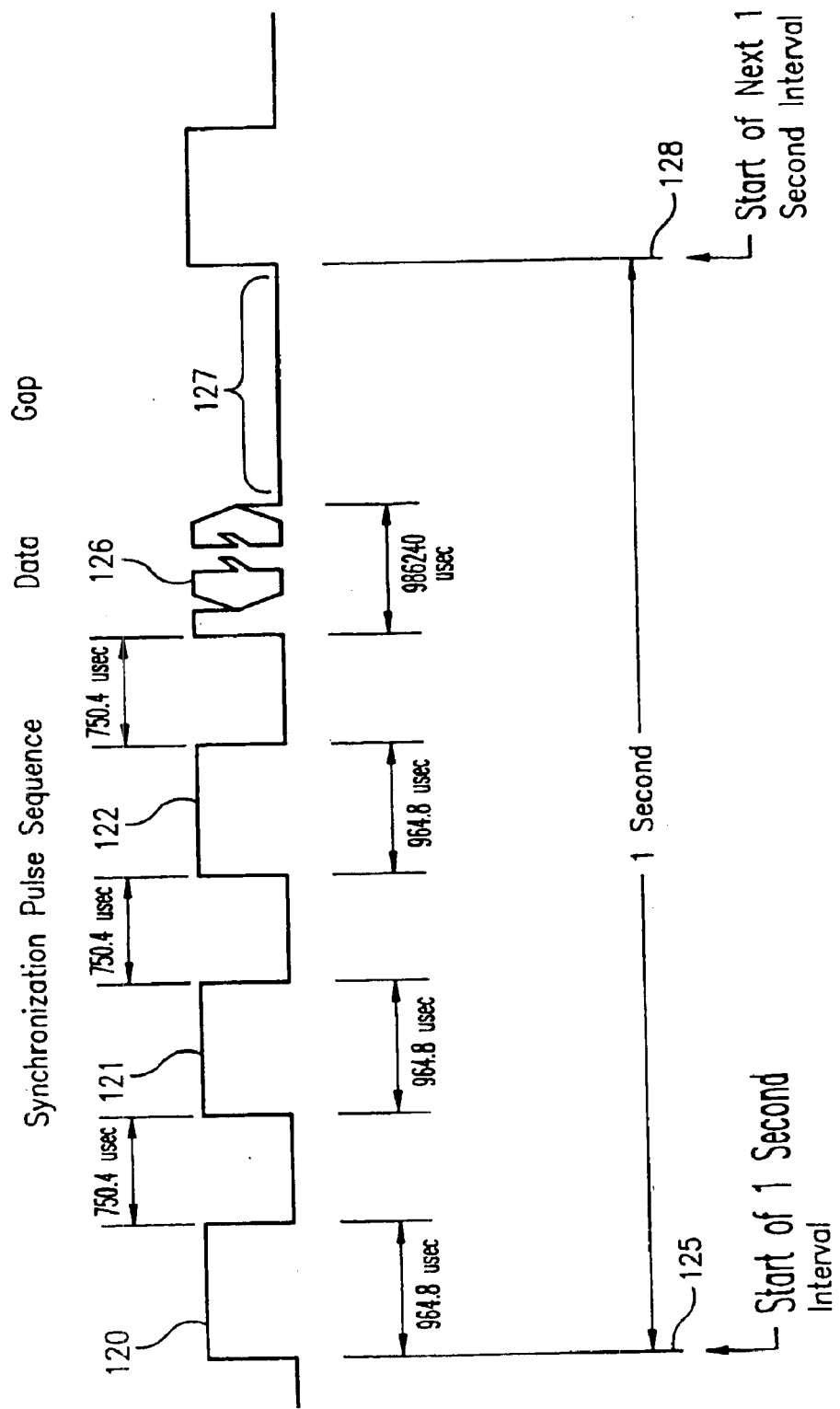
FIG. 13 is a timing diagram of the synchronization pulse sequence transmitted by the SCC on the FM subcarrier at the start of each second's data, for the control loop of FIG. 12.
Figure 14A:
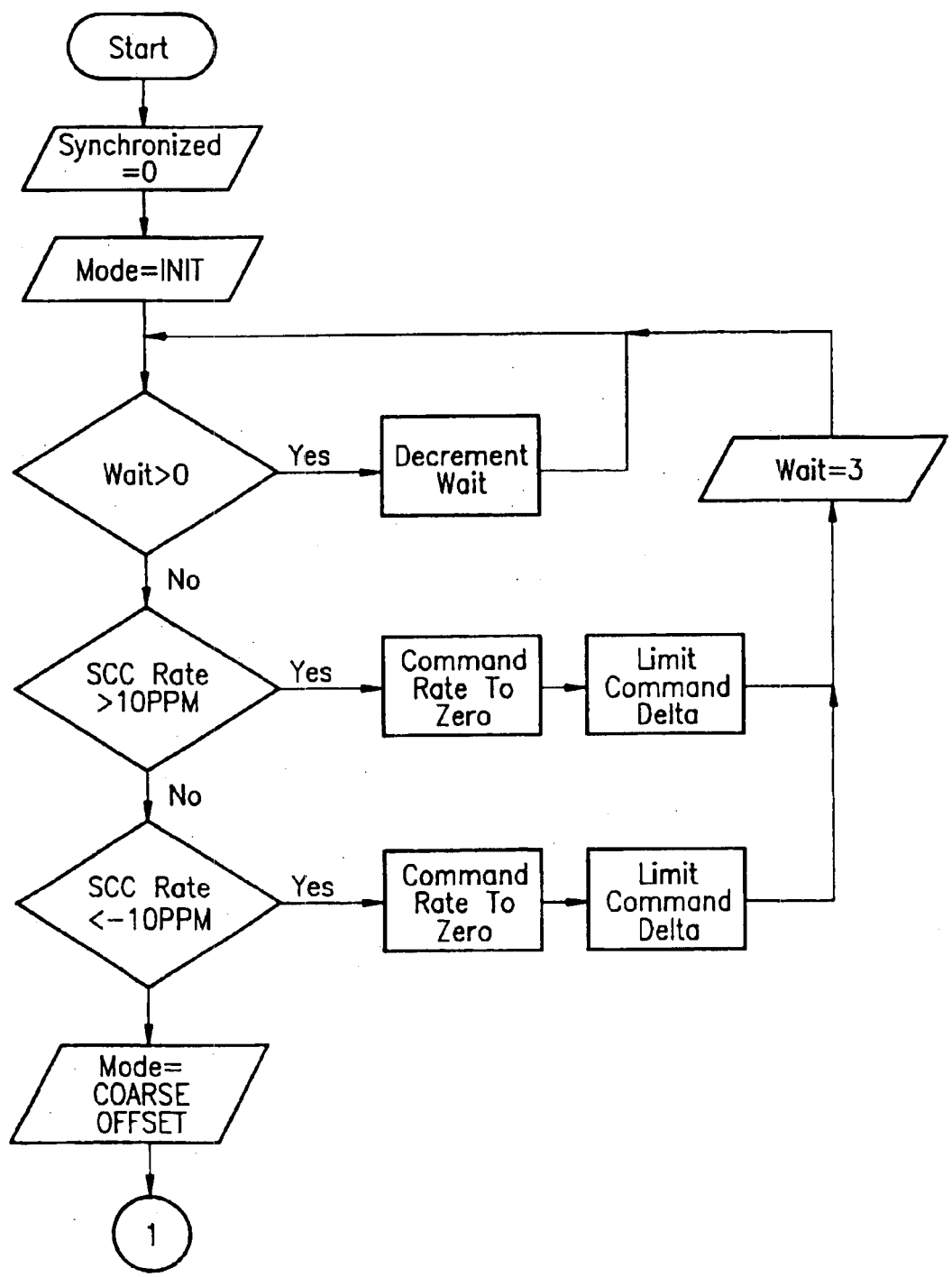
Figure 14B:
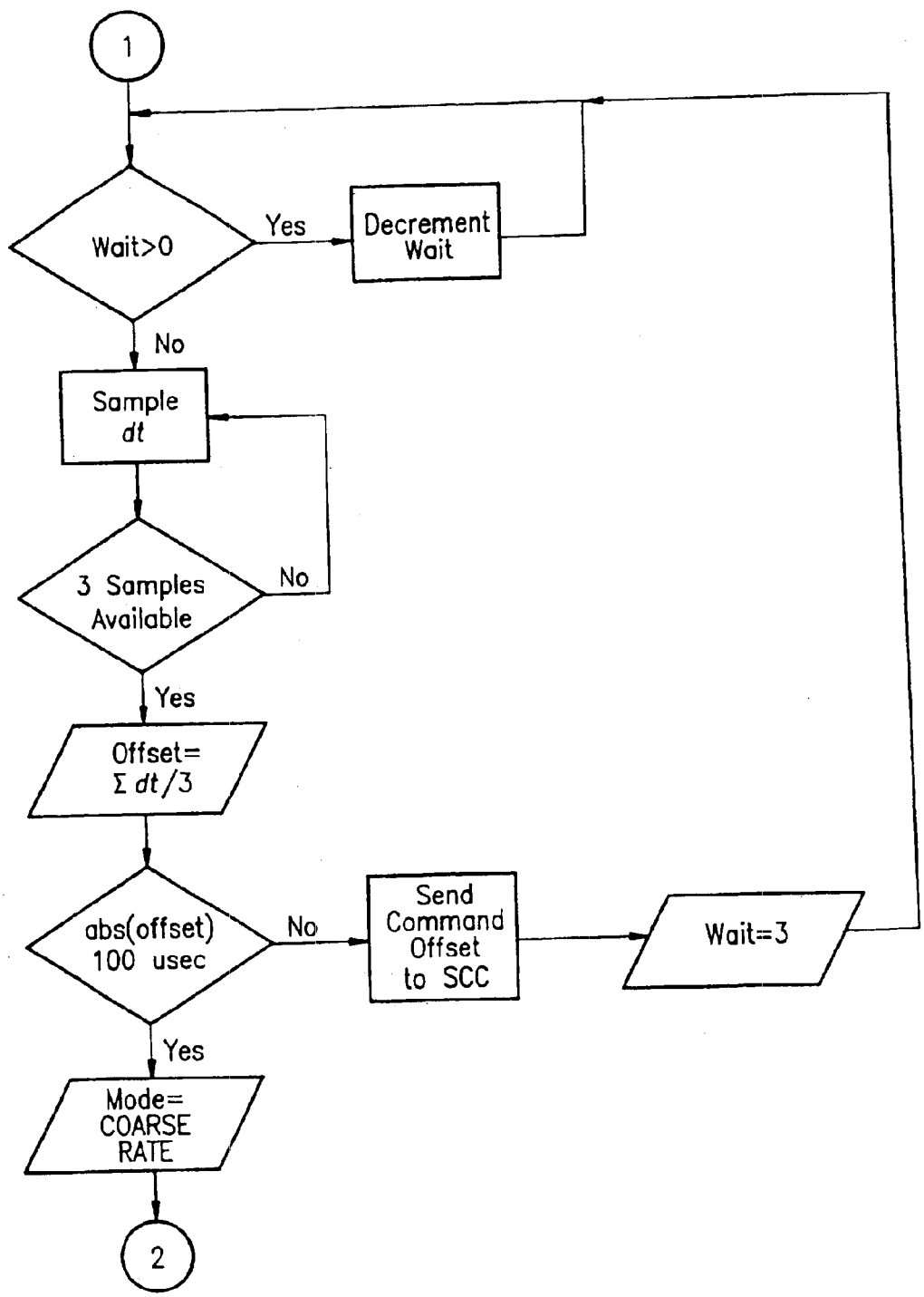
Figure 14C:
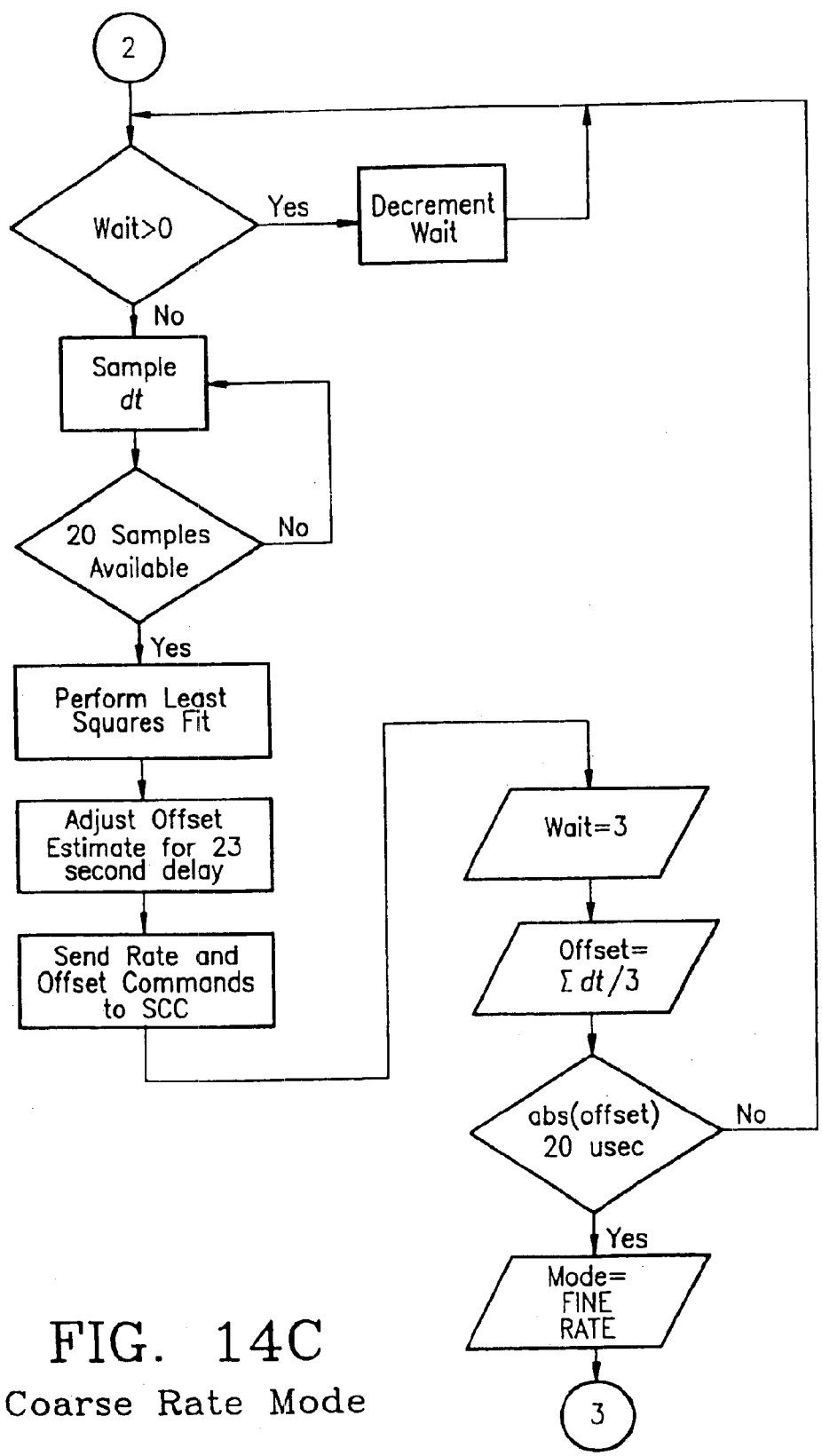
Figure 14D:
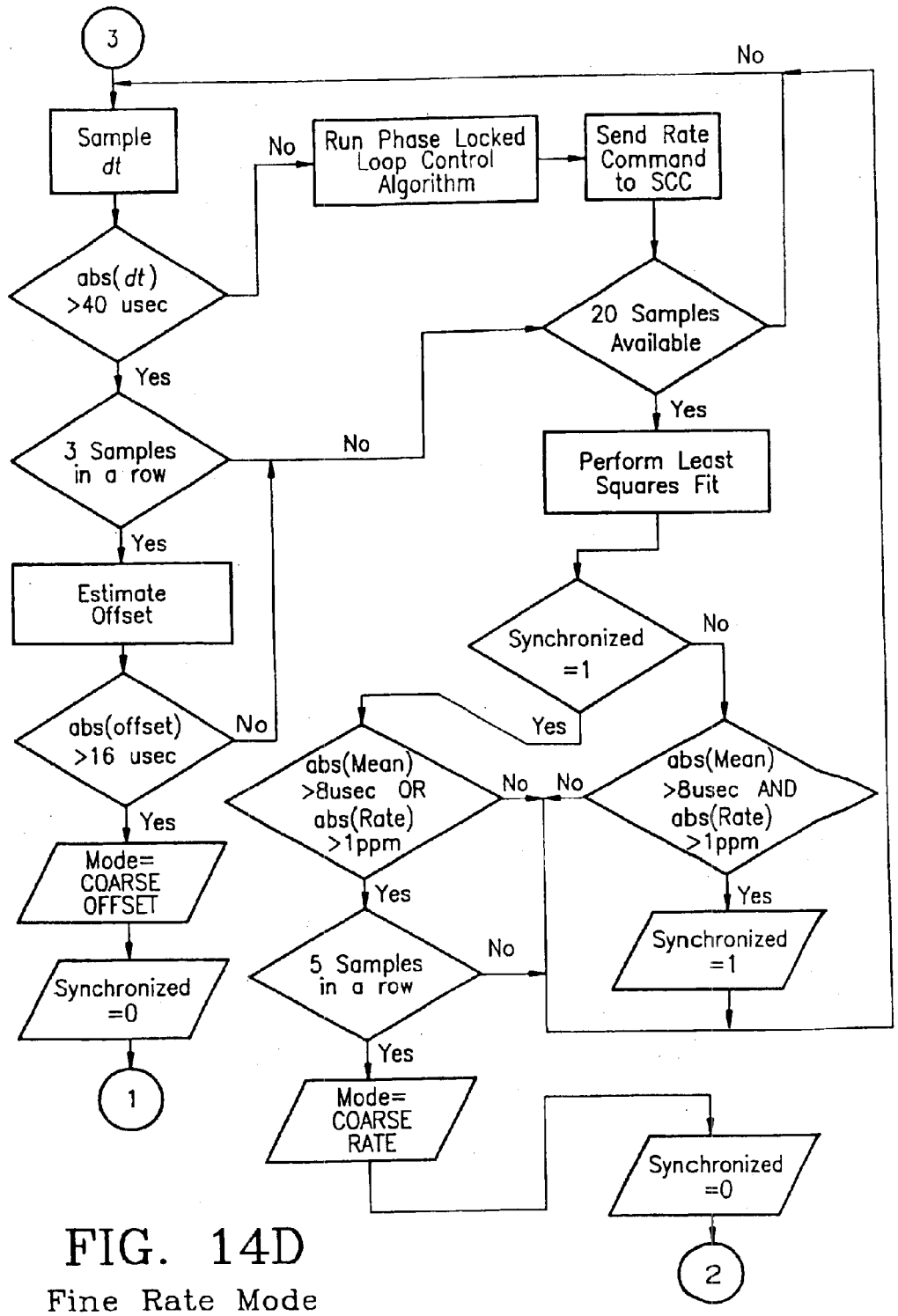

FIG. 13 illustrates the three time synchronization pulses 120, 121, 122 of precisely timed length of 964.8 microseconds with a precise interval of 750.4 microseconds, transmitted by the SCC 48 (FIG. 12) at the start 125 of each second's data. The transmit data 126 immediately follow this synchronization sequence and last for 986240 microseconds. The resulting gap 127—roughly 8600 microseconds long; but varying in length as time corrections sent from the NTCC 47 to the SCC 48 (FIG. 12) are applied—occupies the remainder of the one second interval to the start 128 of the next one second interval.

The NTCC software performs synchronization of the network to GPS time, illustrated by the process flow charts of FIGS. 14A–D. The NTCC runs through four operational modes of time alignment, viz.: Initialization (FIGS. 14A), Coarse Offset (14B), Coarse Rate (14C), and Fine Rate (14D). In the Initialization mode (FIG. 14A), NTCC 47

(FIG. 12) ensures that the clock interval reported by SCC 48 is within 10 ppm of the nominal one second count. Under normal circumstances, the SCC clock interval should be within 2.2 ppm, which is the root sum square (RSS) of the 1.5 ppm accuracy of the SCC and subcarrier receiver clocks. If it is outside the 10 ppm window, NTCC 47 commands SCC 48 to adjust its clock interval to the nominal value. The SCC waits for each command to take effect, and when it is within tolerance, sets the time alignment mode to Coarse Offset.

In the Coarse Offset mode (FIG. 14B), NTCC 47 takes three samples of the time difference dt between the PPS from GPS receiver 111 and the synchronization pattern received at FM receiver 112 from the FM subcarrier. An average offset from GPS time is computed ($\Sigma dt/3$) from the three values. If the magnitude of the offset is greater than or equal to 100 $\mu$secs, a command is sent to SCC 48 to shift the start time of the synchronization pulse sequence by the offset amount. NTCC 47 then waits three seconds, repeats the process until the 100 microsecond tolerance is achieved, and then sets the time alignment mode to Coarse Rate.

The Coarse Rate mode (FIG. 14C) is used to bring the SCC time offset and clock interval into near alignment in preparation for closed loop operation of the Fine Rate mode. The time difference dt reported by the subcarrier receiver 116 is sampled each second for 20 seconds, and a least squares linear fit to the 20 samples is performed. The result of the fit is a line with slope m and offset b:

$$dt = mt + b$$

where dt is a function of time, t. A rate command is sent to SCC 48 to correct m to zero. Then an offset command is sent to the SCC which compensates for the time required for the fit to be computed and the time required for the command to take effect—a total of 23 seconds: $m(20+3)+b$. Once the average offset from the last three samples is under 20 microseconds, the time alignment mode is changed to Fine Rate.

In the Fine Rate mode (FIG. 14D), the NTCC runs a low bandwidth PLL to continuously control the network timing and monitors the control loop for error conditions. The values of dt, offset and rate of the SCC clock are continually monitored by NTCC 47. If the value of dt is in error by more than 40 microseconds for three consecutive samples, and the average offset is in error by more than 16 microseconds, then the time alignment mode is set back to Coarse Offset, and the synchronization flag is cleared. A least squares fit is continuously run on the clock error signal. If the average value is in error by more than 8 microseconds or the rate is in error by more than 1 ppm for 5 samples in a row, then the mode is set back to Coarse Rate, and the synchronization flag is cleared. If both of those conditions are met when the loop is not synchronized, then the synchronization flag is set.

A block diagram of the timing control PLL 110 in FIG. 15 mathematically illustrates the functions of the subcarrier receiver 112, NTCC 47, and SCC 48 in performing timing control. The closed loop bandwidth of the PLL is about 0.014 Hz, (roughly a 70 second period). NTCC 47 continuously samples the dt output of subcarrier receiver 112 and runs the PLL controller 130 to generate rate commands to send to SCC 48. The rate commands serve to correct for small clock errors 131, 132 in the TCXOs of SCC 48 and subcarrier receiver 112.

Each computer receiving or transmitting on the TDMA network in the present exemplary embodiment uses a Motorola 68332 microcontroller—a 32 bit processor with a 68020 core with on-hip server peripherals. One of the peripherals is a Time Processing Unit (TPU, e.g., shown in conjunction with processor 83 in the Hub block diagram of FIG. 30), which has 16 channels of specialized hardware for measuring pulse widths and generating clocks. With a 20 MHz clock, it can make measurements with a resolution of 0.2 microseconds. The TPU is used to detect the FM subcarrier synchronization pulses and generate the precise clocks for transmitted data, both on the subcarrier and by the vehicle tracking computers in the TDMA network.

In so doing, the TPU detects and times the synchronization pulse pattern transmitted over the FM subcarrier. Processing in this regard performed by the NDC subcarrier receiver, the tracker, and the Network Hub receivers is virtually identical. The CPU runs two timers, viz., a 2048 Hz clock for task scheduling and the internal TPU 5 MHz clock (system clock divided by four). For timing purposes, the 2048 Hz clock is used to account for ambiguity in the TPU time due to rollover of its 16 bit counter every 13 milliseconds. TPU channel function assignments are shown in Table 56 (Appendix B).

Referring to that table, in operation of the TPU for synchronization and clock generation, the synchronization pulse sequence is detected by running a Period/Pulse Width Accumulation (PPWA) function on TPU channel 4. The TPU interrupts the processor on each falling edge detected in the input data and provides the processor with the time of the falling edge and the preceding pulse width. When the processor detects three pulses of the appropriate width and spacing, within a tolerance window, it determines the start time of the synchronization in TPU counts based on the average falling edge time of the received pulses. The tracker has two receivers for FM data. Depending on the quality of signal available at either antenna, it may attempt to detect the synchronization sequence on the second channel using the method described immediately above with TPU channel 11.

The start of the synchronization pattern is used as a reference by all receivers to generate the data clock necessary to clock the FM data into shift registers and into the processor memory for decoding. An identical synchronization algorithm is used by all of the network elements to ensure that variability in time estimates is minimized. An estimate of the synchronization start time is maintained by the CPU using a low bandwidth PLL similar to that used by the NTCC to control the synchronization relative to GPS time. The CPUs in the tracker, Network Hub, and NDC subcarrier receiver all run a second order PLL with a 0.05 Hz bandwidth to create an estimate of the synchronization start time, so that noise in the receive data does not cause substantial jitter in the synchronization time. It also allows the processor to maintain a time estimate that only degrades slowly in accuracy (TCXO error) when synchronization pulses are missed, thus maintaining the capability to receive and transmit data under poor RF reception conditions. The time estimate is used to start the data clocks using four TPU channels.

TPU channel 5 runs an Output Compare (OC) function which is designed for generating single output transitions or continuous clocks. Using the synchronization time estimate, the CPU programs the channel to output a pulse at a precise delay from that time. TPU channel 6 runs the Input Transition Capture/Count (ITC) function which is set up to detect changes on an input line and interrupt the processor and/or initiate processing on other TPU channels. In this case it detects the pulse from channel 5 and starts OC functions on channels 7 and 8 which generate a bit clock and a byte clock.

The bit clock toggles for each receive bit and causes each bit to be shifted into a shift register. The byte clock runs at one eighth the rate of the bit clock and latches the byte into processor. Once all of the data bits are clocked in, the processor turns off the clocks in the gap time before the next second's data.

As previously described herein, the NDC subcarrier receiver 112 (FIG. 12) compares the received synchronization time to the PPS time from GPS receiver 111 to provide the dt measurement to the NTCC 47 software. The precise measurement of dt is made by connecting the PPS output signal from GPS receiver 111 to TPU channel 11 on the subcarrier receiver CPU. Channel 11 runs an ITC function which detects the pulse and interrupts the processor. The processor records the PPS time. Under normal conditions, the three synchronization pulses are then detected on channel 4, and the synchronization time is computed. These times have a precision of 0.2 microseconds and an accuracy of the TCXO, 1.5 ppm, the dt being simply the difference between the times.

Trackers use the synchronization time estimate as a reference for starting the transmit data sequence. Approximately one second before the time slot assigned to a tracker occurs, the CPU sets up processing tasks to format data to be transmitted, loads output buffers, and initializes TPU channels. TPU channel 0 runs an OC function that is initialized about 6 milliseconds before the transmit sequence is to begin. This channel asserts the transmit key line of the RF card and also initiates the chain of other TPU events required to transmit data in the TDMA network. The OC function generates a single transition at the start of the appropriate 20 millisecond time slot, turning on the transmitter. This signal is also fed into channel 1 of the TPU which runs the ITC function. The detection of the transition on channel 0 starts a transmit data clock on channel 2, delayed by 96 microseconds to allow the transmitter power to stabilize. The clock transmits data from a shift register on the TPU, a queued serial peripheral interface (QSPI, e.g., see processor 83, FIG. 30). The clock is also fed into TPU channel 3, which runs an ITC function to count the number of bits transmitted. The transmit bit count is used by the processor to refill the QSPI output register based on an interrupt from the ITC when the desired output count is reached. The CPU also turns off the OC transmit key on channel 0 by scheduling an opposite transition 19200 microseconds after the key signal was asserted.

The Net Hub receive site CPU uses the TPU to generate the framing information to denote the start of each 20 millisecond TDMA time slot. Based on the estimated synchronization start time, the CPU sets up an OC function on a TPU channel to toggle at precise 20 millisecond intervals. This signal controls processing start times for a digital signal processor (DSP) to clock and data recovery on any data received in each slot. In this case, the TPU cannot be used to generate the data clock because the speed of light delays from vehicle-mounted trackers to the Hub receiver are variable and unpredictable. The DSP processor (e.g., 80, FIG. 30) performs batch processing on the prior slot's recorded data, while data for the current slot is stored into a bank of memory. On the next slot interval toggle, the DSP switches banks, and the new data is stored in the bank just processed.

The SCC is the generator of the synchronization pattern in the FM broadcast data that is used by the other elements in the system as a precise time reference for operating in the TDMA network. The SCC uses the same sequence of TPU functions on channels to send its data to the FM subcarrier modulator as the tracker uses to transmit data in the TDMA network. The differences are that the SCC transmits for nearly one second, and the start time of the transmission is controlled by command from the NTCC over a modem link. The SCC runs on a 10 MHz TCXO instead of a 20 MHz clock, so its time resolution is 0.4 microseconds instead of 0.2 microseconds.

Near the beginning of each integer second, the SCC receives a clock correction command from the NTCC and the data to be transmitted on the next second. While it is receiving these data, the SCC is transmitting the current second's data. The SCC formats a bit stream that includes the synchronization pulse sequence at the start, followed by the data. At the end of the current data transmission cycle, the CPU sets up TPU functions and loads the output buffer (also the QSPI) with the data to be transmitted. An OC function is initialized to toggle at the current one second interval count of the TPU, as modified by the NTCC command.

The NTCC command can be either a one-time offset during initial time alignment of the SCC, or a rate adjustment command during normal Fine Rate time alignment mode. For example, the nominal TPU count for a one second interval on the SCC is 2500000. If the NTCC determines that the SCC clock is fast by 0.4 ppm, it will send a rate adjustment command to the SCC to lengthen its count by one to 2500001, so the fast SCC clock must count one additional 0.4 microseconds to reach a true interval of one second. The SCC uses this interval until corrected again by the NTCC.

As with the tracking computer, an ITC function on another channel is used to detect the OC transition and initiate an OC continuous bit clock on a third channel. A fourth channel counts bits transmitted and refills the QSPI buffers as required. Once all of the bits are transmitted, the CPU turns off the output clock and starts a repeat of the process.

VI. Bandwidth Efficient Wireless Transceiver System

As observed in the above section on the TDMA network, the efficient use of bandwidth is essential for wireless TDMA digital data networks. The techniques employed according to another aspect of the invention, to be described in this section of the specification, maximize efficiency by filtering the baseband data to reduce the occupied bandwidth of the channel and eliminating the transmission of synchronization information to minimize the overhead of non-information bearing data. The baseband filter is implemented by a digital microcontroller and replaces the original square wave data stream with deterministic transitions that reduce harmonic content and maintain bit widths, regardless of data input frequency. Removal of synchronization data is enabled by the addition of processor intensive clock and data recovery algorithms at the receive site. The network also uses forward error correction coding and space diversity processing, according to other aspects of the invention, to increase the reliability of received data which reduces bandwidth used for retransmission of corrupted data.

The TDMA network of the exemplary embodiment is split into 50 vehicle transmit time slots per second. By means described in the preceding section of this specification, the trackers and Net Hub receiver computers are all synchronized within a few microseconds of timing accuracy so that gap times between the 50 time slots are at a minimum. The trackers maintain an accurate time count to determine the point in time at which a data packet is to be transmitted.

Processing performed by the trackers to transmit the data packet includes Forward Error Correction (FEC) coding, bit interleaving, delay line encoding, premodulation filtering, and Binary Frequency Shift Keying (BFSK). On reception of the packet, the Hub computer performs FSK demodulation to an Intermediate Frequency (IF), digital sampling of the IF signal, bit clock recovery, bit synchronization using an iterative process, and data decoding. Each second, up to 50 vehicle data packets are transmitted to the NDC Network server which combines data from other Net Hub receivers in a diversity processing algorithm and performs FEC decoding on the resultant data packet.

FIG. 16 is a block diagram of the transmit TDMA data packet processing performed by the tracker (tracking computer) 135 in each vehicle. A data packet 137 consists of 12 total information bearing data bytes, or 96 bits. The data to be transmitted is bitwise packed very tightly in most cases so that there are few wasted bits between data item fields. The contents of the data packets sent by the tracker vary depending on the type of data the tracker needs to report; the packets typically contain navigation data in periodic reporting slots and special data such as event (e.g., what the vehicle is doing or encountering) reports, network control information, or outbound message codes in auxiliary reporting slots.

The tracker first performs forward error correction (FEC) coding 138 of the data. A (12,8) code is employed which uses codes words that are 12 bits long to encode each data byte. This is a modified BCH error correcting code that enables the server to correct one bit in each 12 bit code word. The (12,8) code is also used by the Net Hub receiver processor in its bit synchronization algorithm to locate the likely start of the data packet by selecting the clock offset which minimizes the number of code word errors. The result of the FEC coding step 138 is a total of 144 data bits to be transmitted.

Next the 144 data bits are interleaved, at 139, without which each code word would be transmitted in order. Wireless data in mobile environments can be corrupted by burst errors which cause several consecutive bits to be received in error. Since the FEC algorithm can only correct one bit in each code word, a burst of bit errors would make a word uncorrectable. Bit interleaving assures that the first bit of each word is sent first, followed by all of the second bits, and so on, to provide some immunity to burst errors. This enables the FEC algorithm to correct a burst that destroys all of the first bits, for example, since it affects only one bit in all of the code words instead of all of the bits in a single code word. In each packet, all of the code words must be successfully decoded to make sense of the packet.

A unique interleaving scheme is used for the data transmitted by the vehicle tracker to enable the bit synchronization algorithm used by the hub receiver to work. Instead of the simple ordering of all first bits, all second bits, through all twelfth bits, the ordering used is shown in FIG. 17. This provides an interleaving depth of 11 instead of the 12 possible with simple interleaving, but provides a randomization of the data bits to ensure that single bit shifts in received data cause errors in all code words. In FIG. 17, the interleaved bit ordering is shown in tabular form: the rows are interleaved 12 bit words, and the columns are the bits within the words. Bits are transmitted from left to right and top to bottom. The bits of the original FEC code words are identified by the W/B format at each interleaved bit position. These are the bits, B, of code word, W.

Returning to FIG. 16, after interleaving, the CPU encodes the data using a delay, or Miller, line encoding algorithm 140. Delay coding is similar to Manchester coding in that it guarantees transitions in the encoded digital data. It differs in that it does not increase the maximum baud rate of the unencoded data. A disadvantage of the delay code is that it is slightly more complicated to encode than Manchester. The delay code replaces each '1'0 in the original data stream with a transition at the mid bit point; the transition begins at the previous bit's output level. A '0' in the original data is represented by no state change, except if the previous unencoded bit was a '0'. In that case, the second '0' is encoded as a state change between bit boundaries. The algorithm ensures that there are three distinct bit widths: 1, 1.5, and 2 times the width of the original bits. FIGS. 18A–C, which will be discussed further presently, provide a comparison of an original data sequence to the delay coded version of that sequence, and an illustration of the filtering of the delay coded sequence.

Returning again to FIG. 16, square wave digital data as with the original data sequence and the delay coded version thereof must be filtered so as to round off the edges so that harmonics which cause the occupied bandwidth of the transmitted data to be wide are minimized. A premodulation filter 141 for the delay coded version is implemented in the present exemplary embodiment using a PIC™ 16F84-10I/SO microcontroller (PIC is a trademark of Microchip Technology Inc. of Chandler, Ariz., manufacturer of the device), followed by a digital to analog converter (DAC) 142 constructed using a precise resistor network. The filtered, analog representation of the original digital data stream is modulated using frequency shift keying, at 143, and transmitted by the tracker from an antenna 145 thereof after amplification at 144.

The filtering algorithm used in premodulation filter 141 to ensure that there are three distinct bit widths: 1, 1.5, and 2 times the width of the original bits, is shown in flow chart form in FIG. 19. The PIC™ microcontroller continuously samples the input digital data looking for a transition. When a transition occurs, at 147, the microcontroller executes in-line code to rapidly output byte values that represent the transition as a sine wave shape to the DAC 142. When the output of the transition curve is complete, the microcontroller software goes back to searching for the next input data transition.

The PIC™ microcontroller digitally replaces each data transition with a rising or falling half sine wave, as required. The maximum baud rate of the delay coded data is 7812.5 bps. This is equivalent to a maximum data frequency of 3906.25 Hz. In this application, the microcontroller runs with a 10 MHz clock, and has an instruction cycle of 4 clock cycles. The method for the fastest output of data to the DAC requires two instructions per point, or 0.8 microseconds. The period of the highest frequency data is 256 microseconds. Ideally, each transition would be replaced with a 160 point half sine curve (128 microseconds divided by 0.8 microseconds per point) so that the highest frequency data present would appear to the modulator as a pure sine wave.

It is not possible to use all of the 128 microseconds to produce the filtered transition output because time must be left for the overhead of transition detection and other functions. Therefore, a 150 point transition curve is used. FIGS. 18B and 18C, respectively, illustrate the delay coded data and the filtered output created by the digital premodulation filter. Each edge in the data in the delay coded version of FIG. 18B is delayed by approximately 64 microseconds. Since this filtering delay is constant, it is accounted for in the transmit data clocking provided by the CPU. FIG. 20 provides a diagrammatic comparison of the approximate power spectrums of the unencoded 137, delay coded 140, and filtered data of FIGS. 18A–C. Delay coding concentrates more energy at an average of about ¾ of the maximum frequency. The spectra for two filter versions are shown in the diagram of FIG. 20, one being an ideal 160 point transition filter 148 illustrated for reference purposes, and the other being a 150 point practical implementation 141. The latter has slightly higher power between one and three times the fundamental frequency. The filter substantially cuts the channel bandwidth required for transmitting the TDMA FSK data, for reasons noted above.

A digital filter of this type provides the considerable advantage that its output has a constant delay, regardless of input frequency, which is equivalent to linear phase delay with increasing frequency. This is a property of digital finite impulse response filters. Traditional digital or analog infinite impulse response filtering techniques have nonlinear phase, which can distort bit widths as the input frequency varies. Depending on the filter cutoff frequency, this can cause intersymbol interference. The constant delay allows precise bit widths to be transmitted without distortion. When data with deterministic and repeatable bit widths is received, the bits and bit values can be reliably clocked and decoded.

In the UHF transmitter modulator section used in the present exemplary tracker data processing of FIG. 16, the microcontroller 141 takes the transmit data (TXD) input and provides as output a byte value. That output feeds a Bourns 2QP16TF6235 resistor ladder network that acts as DAC 142. Microcontroller 141 also performs the task of keying the tracker transmitter based on precisely timed signals from the CPU card 149.

After filtering, the data are modulated on a UHF carrier in the 450–470 MHz shared use business band on a 12.5 KHz offset channel. The bandwidth control provided by the premodulation filter is a key element in allowing a data rate of 7812.5 bps on such a narrow channel, while using a very simple FSK modulation technique. The modulation uses about 2 KHz of deviation. The tracker transmitter has a two Watt output.

Network hub receivers are located around the metropolitan area to receive the TDMA transmissions from the vehicle trackers. FIG. 21 is a block diagram of the processing performed by each Network Hub 11 on the received RF signals. The UHF TDMA receiver front end hardware (RF card 151) is always turned on. Signals received at antenna 152 are demodulated at 153 to a 455 KHz intermediate frequency (IF) signal which is digitized at 154. The IF frequency is further processed by an application-specific integrated circuit (ASIC) 155 that performs digital filtering and demodulation to a baseband signal. At precise 20 millisecond intervals corresponding to the boundaries between vehicle transmissions, each 20 millisecond segment of the baseband signal is sampled (156) at a high rate and stored in memory.

A digital signal processor (DSP) (e.g., 80, FIG. 29) in the CPU section 158 of the Net Hub is used to extract the data from the sampled baseband signal. The processing is performed in a batch mode on the entire data packet after it has been received. In the meantime, data being received is stored in an alternate memory bank for processing on the next 20 millisecond cycle. Batch processing provides for the use of more powerful algorithms because then data set can be analyzed in its entirety. Real-time processing requires the algorithm to recover data on the fly without the benefit of subsequent input data. The DSP performs clock recovery and then locates the data within the 20 millisecond window. The recovered data are de-interleaved, and the data for all 50 time slots are ultimately sent to the NDC Network server for further processing.

Recovering the data is a processor intensive algorithm. To reduce the number of bits transmitted by the vehicles, and therefore increase the number of vehicles that are able to report each second, no special bit patterns are sent with the data packet for the receiver to detect. Requiring bit synchronization patterns to detect the data also reduces reliability in a mobile RF environment because if the bit pattern is corrupted, the message packet cannot be recovered, even if it is received without error. Each vehicle transmission occurs at a very precise moment, but its reception is delayed by the speed of light over the distance between the vehicle and the hub receiver by up to 800 microseconds. The Hub must locate the start of the message within the 20 millisecond window without aid from special bit synchronization patterns. For this, it uses an iterative search that sequentially clocks in the data at greater and greater delays from the nominal message start time until a valid data packet is located.

First, the DSP algorithm recovers the bit clock (160, FIG. 21) for the received data, by differentiating the received data. The differentiated data will have large magnitude values at the bit edges. With delay coding, bit edges will be frequent, since transitions are guaranteed in the data. The time delay from the beginning of the data set to each apparent bit edge is measured, modulo 64 microseconds. The modulo delay is averaged to determine a mean data clock edge time that is applicable for the entire data set. A mid bit time is computed as a 32 microsecond offset from the average delay.

With this offset, the data in the buffer is sampled at 15625 bits per second (64 microsecond intervals). This clock rate is used to recover the delay code, since it has transitions at the mid bit point for ones in the original, unencoded data. A total of 288 delay coded bits are clocked in.

Delay decoding (161) is performed on the sampled 288 bits to produce 144 original data bits. Only certain allowable bit patterns are present in the delay code. If a bit error causes an invalid pattern, the pattern is decoded to one of the possible bits represented by the pattern. If subsequent error detection processing on the decoded data indicates an error, then, if only one ambiguous data pattern was encountered in that particular code word during the delay decoding process, the other bit value is used and the error detection is repeated. If successful, the second bit value is retained. If more than one bit is ambiguous or the second bit also fails to result in valid data, the original value is retained, and processing is allowed to move forward. The bit error may be correctable at a later stage in the data processing chain.

The bits are then de-interleaved (162), and the FEC code words are checked for errors (163) but not corrected. The interleaving sequence plays an important role in this process. Standard interleaving of all first bits followed by all second bits, etc. will only cause the first or last code word to be in error if the bit clock is in error by up to 12 bits. This makes the use of error detection for aligning the bit clock to locate the correct data useless. The interleaving scheme used in this case jumbles the data sufficiently and single bit shifts cause all code words to be in error.

The number of correct code words is counted and stored. The bit clock is then shifted (delayed) by 64 microseconds, and the delay decoding 161, de-interleaving 162, and error detection 163 process is repeated (164). In the present exemplary embodiment this is done 12 times to cover the entire 800 microsecond range of possible delays. The decoded data 165 at the clock offset that has the most correct code words, as determined by this processing by the Network Hub 11 of the vehicle 17 tracker data in the received RF signals, is packaged for transmission to the NDC server 42 (FIG. 3).

Each second, server 42 receives data for all 50 time slots from all Network Hub receivers. The network is designed so that multiple Hubs will receive each single tracker data transmission. This redundant data is combined by the server using a space diversity voting algorithm that increases the reliability of received data. A flow chart of the space diversity algorithm of NDC server 42 is shown in FIG. 22, this algorithm being performed for each of the 50 time slots in each one second period.

Each tracker packet has 12 code words. The server uses the FEC code to detect errors in the code words provided by each Hub. If at least 6 code words of the 12 are error free (170), the packet is retained for further processing (171). The assumption is that if most code words have errors, the probability of successfully recovering valid data from the entire packet is low. Once all likely valid packets are collected for the time slot (172), one of two processing paths is taken.

If the time slot is defined for periodic reporting (173), then the diversity voting algorithm is applied as indicated in processing path 174. The packets collected in the first phase are summed bit by bit using received signal strength reported by the Hub as a weighting factor (175). Signal strength is used as an indication of the likelihood that the message was received successfully. Set bits in the message packet are added to the sum using the positive signal strength; cleared bits are added to the sum using negative signal strength (176). As a simple example, consider the three bit sequences below with their corresponding signal strengths. After summing, bits with positive valued sums are decoded as set bits, and bits with negative valued sums are decoded as cleared bits. If a packet contains a bit with a sum of zero (a tie), the packet is discarded.

| bit | 01234567 | |
|---|---|---|
| Packet A: | 11001010 | Signal Strength: 100 |
| Packet B: | 11011110 | Signal Strength: 30 |
| Packet C: | 11001110 | Signal Strength: 80 |
| Voting Results: | | |
| bit 0: | +100+30+80 = +210 > 0 => 1 | |
| bit 1: | +100+30+80 = +210 > 0 => 1 | |
| bit 2: | −100−30−80 = −210 < 0 => 0 | |
| bit 3: | −100+30−80 = −150 < 0 => 0 | |
| bit 4: | +100+30+80 = +210 > 0 => 1 | |
| bit 5: | −100+30+80 = +010 > 0 => 1 | |
| bit 6: | +100+30+80 = +210 > 0 => 1 | |
| bit 7: | −100−30−80 = −210 < 0 => 0 | |
| Voted Packet: | 11001110 | |

After voting, forward error correction is applied to the result to correct remaining errors in the code words (177). The (12,8) code allows one error in each code word to be corrected. Each packet contains an 8 bit or 16 bit CRC (cyclic redundancy check) code to verify that the packet is unlikely to have errors (178); however, it is still possible for the packet to contain bit errors. The final check on the data consists of verifying the reasonableness of the data contained in the packet, and, if so, the packet is stored (179).

If a time slot is not defined for periodic reporting, it is available for any tracker to transmit a "Network Entry Request" packet to obtain a primary or auxiliary reporting interval slot. Vehicles 17 (FIG. 3) near each other that transmit simultaneously will almost certainly corrupt each other's transmissions. If they are widely separated, their tracker data packets can be received reliably by Hubs 11-1, 11-2, . . . , 11-i, near each of the vehicles. Server 42 processes packets in these slots individually. In lieu of using the diversity voting algorithm, processing proceeds along path 180 (FIG. 22). Network entry packets contain redundant data in addition to the CRC, which enables the server to determine if the packet is valid with a high degree of confidence. Here, no voting is performed but forward error correction (181) and CRC checks (182) are performed, followed by a determination of data packet validity from the redundant data in the respective "Network Entry Request" packet (183). If the data packet is determined to be valid by this processing scheme, it is stored in memory (184).

VII. Tracker and Tracker Software

The primary functions of the tracker installed in each respective vehicle are navigation and radio communication. Its secondary tasks are supporting the user interface of the Mobile Data Terminal (MDT), discrete and analog data collection, and power control of itself and peripherals. FIG. 23 is a representative illustration of an exemplary placement of the tracker 135, MDT 190, and antennas (including FM receive antenna 191, UHF/FM antenna 192, and GPS antenna 193) on a typical fleet vehicle 195 (illustrated as a cement mixer, for example). As illustrated, the vehicle 195 is further equipped for accommodating various sensors for event reporting, which will be described in another section of this specification, below.

A flexible, but efficient real time executive is employed to support the primary functions of the tracker. Before describing the real time executive, however, reference is made to a simplified block diagram of the tracker (tracking computer) 135 shown in FIG. 24. It consists of two primary circuit cards or sections: a CPU section 200 and a wireless network interface, or RF, section 201. The CPU section 200 contains the power supplies for the tracker, the main microprocessor (central processing unit, or CPU) 203 to perform all data processing, a GPS chip set (including an RF front end component, GP 2010, and a correlator component, GP2021, of an exemplary Plessey chip set) integrated with the processor for reception and decoding of GPS satellite signals, and sensor electronics and interfaces. The CPU section 200 performs the navigation (partly through GPS navigation section 204 but also through dead reckoning and/or map matching or other navigation sensors via inputs to CPU 203), as well as data processing and sensor processing through the CPU 203.

Dead reckoning navigation in a land vehicle environment maintains a robust navigation solution when GPS data may be unavailable as a result of satellite masking in tunnels or by tall buildings during travel of the vehicle or at a job site. A gyroscope (not shown) is mounted inside the tracker box to sense angular rate in the vertical axis. The tracking computer, which uses angular rate to estimate heading of the vehicle, is also tied into a vehicle speed sensor output from the transmission and into the reverse lights of the vehicle to indicate if the speed sensed is in the forward or reverse direction. The speed sensor is an integral part of other sensor measurement functions that rely on distance traveled outputs or verification that the vehicle is stationary or moving at a low speed.

As will be discussed further in connection with a subsequent Figure, three power supplies (generally designated by block 205) are provided on the CPU card 200, one a 12 VDC supply that provides power to the RF card, a second a 12 VDC supply that provides power to the MDT and other external peripherals of the unit, including sensors, and the third a 5 VDC supply for the CPU 203 processing functions.

The RF section or card 201 contains the radio frequency circuits (including receivers 207 and 208 which receive inputs from vehicle-mounted antennas 191 and 192, respectively) necessary for reception and demodulation of radio frequency data received over the FM subcarrier from radio station 12. RF section 201 also contains circuits (in transmitter 210) necessary for modulation and amplification to transmit data in the UHF band using the TDMA network protocol. However, the RF card does not perform any data processing of its own. Rather, the main CPU 203 is responsible for all baseband data processing for message decoding and encoding, forward error correction, and data clocking in the tracker 135.

In terms of tracker software, referring back to the real time executive employed to support the primary functions of the tracker, it will be useful to again note that the CPUs used in each of the trackers and Net Hubs are substantially identical. The Net Hub CPU 82 illustrated in the simplified block diagram of FIG. 29, for example, shows a Motorola 68332 microprocessor with associated on-chip peripherals such as a TPU, QSPI, and SCI and related shift register as preferably constituting the CPU. The tracker CPU 203 corresponds therewith. It has two periodic interrupt sources for task scheduling and dispatching, namely, an accumulator interrupt (ACCUMINT) from the GP2021 and a periodic interrupt timer (PIT) derived from the CPU clock. The ACCUMINT is used to run a simple, high priority, real-time dispatcher, while the PIT is used to run a slower, priority-driven scheduler for long-duration navigation and communication tasks.

| The interrupt priority is: | |
|---|---|
| 1. TPU | level 6 |
| 2. SCI | level 4 |
| 3. ACCUMINT | level 3 |
| 4. PIT | level 2 |

The ACCUMINT interrupt runs a periodic, high-priority dispatcher for short (<1 msec) duration tasks. TPU interrupts occur from TPU events related to network communication and timing. The PIT runs a secondary, low rate, and must be the lowest priority interrupt because it can only be enabled when the ACCUMINT interrupt service routine (ISR) completes. The SCI generates UART interrupts from serial communication with the compass or other peripherals. The QSPI is used for vehicle transmit data, must be serviced twice during a vehicle transmission, and does not generate interrupts. The TPU and SCI interrupt handlers should be as fast as possible.

The ACCUMINT is supplied by the GP2021 and is derived from the 10 MHz TCXO which also drives the 20 MHz processor clock (also from the GP2021). The ACCUMINT rate is nominally programmed for an approximate rate of 2048.131 Hz (the period is 488.25 $\mu$sec). This is in error from a true 2048 Hz rate by 64 ppm. The ACCUMINT can be disabled and re-enabled by writing to a GP2021 register. The GP2021 timer tick (TIC) flag, which is programmed for a rate of 8 Hz, controls when GPS measurement data is available and is used to schedule dead reckoning navigation processing.

The structure of the ACCUMINT handler/real-time dispatcher is outlined as: disable GP2021 interrupts by writing to the correlator

```
read all new accumulator data
if (TIC)
{
    store and time-tag wheel/speed sensor data
    set flag to collect GPS channel measurement data
    set flag to run dead reckoning navigation functions
}
(GP2021 interrupts are still disabled on the correlator)
update tracking loop(s) for specified channel(s)
service either GP2021 UART (universal asynchronous receiver/
transmitter) A or B
update network event timing
schedule high priority communication and data collection events as
required
enable GP2021 interrupts by writing to the correlator
dispath high priority periodic tasks
dispatch communication and data collection tasks
enable PIT interrupts if previously enabled
return
```

With the tracking loop implementation of the present exemplary embodiment, the tasks of reading the accumulator data and updating the tracking loops requires on average about 160 $\mu$secs for 8 channels. This includes data collection and demodulation for all channels and tracking loop closure for one channel. Each channel generates accumulation data at 1 msec intervals (approximately every other ACCUMINT). It is important that the tracking loop update processing for each channel be completed before new accumulation data is available for that channel.

The scheduler starts tasks related to network timekeeping and communication, reading and storing GPS measurement data, periodic tasks that include A/D and discrete I/O processing, synthesizer programming, and any other high-priority, short duration (less than 500 $\mu$sec) tasks.

A TIC flag is generated by the GP2021, and indicates when GPS measurement data have been latched. The default TIC rate is approximately 10 Hz. For the tracker, the rate is programmed to approximately 8 Hz (a period of 0.125000050 secs), and is used to latch odometer/wheel sensor data in addition to GPS measurement data. The 8 Hz rate allows simple power of two math for time intervals and reduces the measurement processing by 20%. GPS processing functions are required to keep the TIC rate periodic with GPS time, but it is not necessary (on the tracker) to align the TIC with the GPS integer second. As part of the navigation processing, the TIC period is adjusted for single TICs as required to maintain an average TIC rate of 0.125 seconds with respect to GPS time. The ACCUMINT dispatcher updates the TIC interval as required by the navigation processing.

The GP2021 chip has two UARTs, which do not generate interrupts so they must be polled. Each UART has an 8 byte FIFO (first in—first out). If the data rate on the UARTs is restricted to 38.4 kbps, then the FIFO can be filled about every 2 msecs. The CPU can service each UART every other ACCUMINT and not lose data. One of the UARTs is used to communicate with the MDT, and the other may be used for a suitable peripheral.

Time-critical RF communications tasks are run as required, which include setting up the TPU channels to:

start and stop data clocks start and stop the QSPI turn on and off the transmitter program the TPU to detect the next bit-sync.

Scheduling these tasks requires a few milliseconds of resolution in some cases.

The tracker uses the QSPI for message transmission. The transmit data are line encoded in Miller format, which requires 288 code bits to be transmitted at 15625 bps for an equivalent of 144 data bits at 7812.5 bps. The QSPI output buffer can hold 256 bits, so the QSPI can be preloaded with 256 bits and then refilled with the remainder of the message a few milliseconds later. An additional data word (for at total of 304 bits) has to be clocked out to the RF card. A preamble of 8 bits precedes the data, and 8 bits follow the data after the transmitter is turned off to ensure the last data bit transmitted is low.

The tracker uses the TPU to clock data into external shift registers for receive data. Two FM data streams are received from spatially diverse antennas. The data is line encoded in Miller format which requires 9200 code bits to be transmitted at about 9328.36 bps, for an equivalent of 4600 data bits at about 4664.18 bps. A preamble and synchronization pattern of 64 bits precedes the data. The two data streams are clocked synchronously but processed independently. The bytes are read from the shift register on the falling edge of the latch clock, leaving 428.8 $\mu$secs to read the data.

With respect to data collection tasks, TIC events signal that GPS measurement data are available from the GP2021 correlator. When these occur, the processor must read the data before the next TIC (about 125 msecs). The processor also reads wheel/odometer data. In the ISR, data is only stored—data processing takes place under control of the PIT scheduler.

The tracker software also has a number of periodic, short duration tasks that can be run by the ACCUMINT dispatcher. These include A/D functions for reading data from the gyro and other data sources; as well as bit toggling for implementing simple serial interfaces for programming RF card synthesizers and the PIC used for power control of the Tracker Module.

The TPU is used for RF communication timing, RF data input and output clocking, and vehicle wheel or speed sensor inputs. As previously described herein, the TPU channels (16) and functions are summarized in Table 56 (Appendix B).

In handling of wheel and speed sensor inputs from the dead reckoning navigation of the PROTRAK system, the TPU counts pulses from these sensors to measure vehicle speed. In the TPU, channels 13 and 14 are reserved for quadrature inputs from the wheel sensors, channels 12 and 15 are reserved for vehicle direction and cruise control speed sensor inputs, channel 15 runs an ITC function, and channel 12 runs a discrete input function. In most systems, a cruise control speed sensor is used.

The SCI UART on the Motorola 68332 processor is used for a magnetic compass interface or other relatively low data rate device (4800–9600 bps). When running, the SCI generates transmit or receive interrupts at approximately 1 msec intervals (at 4800 bps). These interrupts must be serviced within 1 msec.

The PIT of the processor runs at 32 Hz, and in that mode the PIT ISR runs a prioritizing executive which performs the following tasks, in the following order of priority:

1. Communication and RF timing/scheduling tasks
2. FM data error decoding
3. Dead reckoning (DR) navigation (8 Hz solution propagation)
4. FM data parsing
5. GPS measurement processing (pseudorange/range-rate measurements, satellite acquisition)
6. Combined GPS/dead reckoning filtering (Kalman Filter update of DR solution)
7. GPS satellite visibility/channel allocation For the executive, tasks are scheduled periodically or on demand in order of priority. High priority tasks are allowed to interrupt lower priority tasks.

The power supply architecture for tracker 135 includes four independent power supplies which run from input battery power (6–28 V). Referring to FIGS. 25 and 26, which are block diagrams of the internal power distribution to the tracker and power distribution summary, respectively, one of these supplies is a linear 5V supply 215 that provides power to the Microchip PIC™ microcontroller ($\mu$C) 216 used for master power control of the tracker. It also keeps an SRAM (not shown) powered so that machine state is maintained while the processor is off.

Microcontroller 216 runs on very low current and is on at all times, controlling a 5V CPU supply 217 and 12V radio supply 218. 5V supply 217 is a switched power supply that provides power to CPU 203, digital electronics and GPS receiver 204 of CPU section 200. 12V radio supply 218 supplies power to the RF card 201, and also powers the GPS antenna low noise amplifier (LNA) 219 through a 5V linear regulator 220. Since the TCXO which ultimately drives the CPU clock resides on RF card 201, CPU 203 requires both this supply (218) and 5V CPU supply 217 to be on. The last of the four independent power supplies is a 12V auxiliary supply 222 that provides regulated 12V power to all external peripherals (e.g., MDT 190, compass 230, and others 232, FIG. 26) designated by 223 (in FIG. 25) and power to an on-board gyro 224 through a 5V linear regulator 225. CPU 203 controls this 12V auxiliary supply 222. The tracker also receives 12 volt discrete input 226 to the CPU 203 and microcontroller 216 which indicates that the ignition switch 233 is in the RUN/ACC position.

Microcontroller 216 controls power to tracker 135, and, together with the CPU's SRAM, remains turned on at all times. These two draw less than 5 mA of current. When the ignition discrete indicates that the switch is in the RUN or ACC position, microcontroller 216 turns on CPU 203 and power supplies 217 and 218. When the ignition is off, CPU 203 can command microcontroller 216 to turn off the power for time intervals between 5 and 630 minutes, or until then ignition is turned on, which ever occurs first.

Tracker 135 supports power saving modes so that vehicle battery power consumption is minimized when the vehicle ignition is turned off, and which also have radio network control and data retention implications. The tracker power saving modes are:

Full On: Tracker 135 and external peripherals are turned-on and operating normally.

Peripherals Off. Tracker 135 is on and operating normally, but auxiliary 12V peripheral power supply 222 is off. Peripherals are turned off immediately or, if desired, within a predetermined time T1, e.g., 1–2 minutes after ignition turn off, which inhibits DR navigation because both internal gyro 224 and the external compass 230 will be off Sleep: With the ignition off, CPU 203 is turned off for a prespecified time duration T2 (e.g., about 40 minutes). When the CPU is turned back on (Peripheral Off mode), it can listen for any new message or other data, respond and then turn off again. Sleep mode allows login-only and continuous track systems to receive data from the command station while the ignition is off. Poll-only vehicles will remain in Sleep mode and not wake up until the ignition is turned on. The system also remains in Sleep mode if the battery voltage drops below a predetermined lower limit.

Off: In this mode, power is not applied to the tracker. Depending upon specific customer requirements, the tracker power saving mode control may vary, e.g.:

Emergency vehicle operators may want the system to always be in Full On mode to enable ability of the CCS to communicate at all times (via the TDMA network) with the vehicle.

Some users may prefer a staged power saving approach in which vehicles that are periodically turned on and off, such as delivery trucks, remain in the network while turned off FIG. 27 is a diagram illustrating the logic for the power mode control state transitions of the tracker 135. Time durations T1 and T2 are set as desired. The Sleep Time is the off time commanded by the CPU for the Sleep Mode 240. The mode transitions and network related operation in each mode are as follows.

The Off state 241 is reached when external battery power is removed from the tracker. When battery power is applied to the tracker, the power control processor (microcontroller 216) resets and turns on the CPU 203 and radio supplies 218, turning on the tracker, but leaving peripherals 223 turned off (mode 242).

In the Full On mode (243), the RF and CPU sections 201 and 200 are turned on. The system will navigate and operate in the RF network normally. Continuous Track (CT) trackers are assigned periodic transmit slots. Login-Only Track (LOT) trackers are assigned periodic transmit slots if the respective customer is logged in. Without a customer (i.e., fleet subscriber or owner) being logged in, these units will occasionally attempt to enter the network or remain quiet until notified by the NDC that their owner has logged in. Poll-only trackers will attempt a network entry and then remain quiet until requested to transmit.

When the ignition is turned off, peripherals (e.g., MDT 190, magnetic compass 230, if attached, etc., and the internal gyro 224 (optional)) powered by the tracker are turned off immediately, or after time duration T1 expires (mode 242). The compass and gyro navigation sensors are turned off based on the assumption that if the ignition is off, the vehicle will not be moving. The tracker will return to the Full On mode 243 if the ignition is turned back on.

From the Peripheral Off mode 242, the LOT and CT trackers may enter the Sleep mode 240 after a time duration of T2 since the ignition was turned off. To reach Sleep, the tracker requests a low-power periodic network slot from the NDC which has a long transmit interval. When the slot is granted, the tracker stores necessary data to an area in SRAM, saves any data to flash memory as required, and commands microcontroller 216 to turn off CPU 203 for a sleep period of a few minutes less than the low-power transmit interval. Poll-Only trackers will request low-power shutdown from the NDC. When the shutdown request is acknowledged or times out, the tracker stores data to SRAM and flash memory, if required, and commands microcontroller 216 to turn off CPU 203 until the ignition is turned back on.

When microcontroller 216 wakes the tracker (actually, the CPU 203) from Sleep mode 240, the CPU checks battery voltage and the previous system state stored in SRAM. If the tracker is in a low power slot, it will listen to the FM subcarrier data for a 3–4 minute window around the slot time to determine if the NDC sends any information meant for it. At this time, the NDC has the opportunity to send the tracker message or other data. Once all network transactions are complete, the tracker will again command the microcontroller to turn the CPU off.

If the ignition remains off for a predetermined time duration or the battery voltage drops below the minimum threshold $V_{MIN}$, the tracker will request a low-power shutdown from the NDC on its next transmit opportunity. When the shutdown request is acknowledged or times out, the microcontroller 216 is commanded to not awaken the CPU 203 until the ignition is turned back on.

SRAM state recovery is achieved as follows. Since the entire contents of the global variables and stack are maintained during Sleep mode 240, CPU 203 may restart a specific point in the code with all data intact. This can be done if the registers, program counter, and stack pointer are pushed onto the stack, and the stack pointer is stored at a known location. A CRC must be performed on pertinent parts of the SRAM to ensure data integrity on restart, after which the CPU is allowed to send a power down command to the microcontroller. On reset, the CPU checks the CRC on the SRAM to determine if it was restarting. If so, the software sets appropriate flags, and then retrieves the stack pointer and registers from the stack. It is then able to jump to the point at which it left off before powering down. If the CRC on the SRAM fails, the CPU executes a normal startup.

When the tracker is turned on, it must search for the SCC broadcast on the received FM subcarrier. Under normal conditions, the tracker will have channel information stored in flash memory for the primary FM channel to be used, and will initially search channels and subcarrier that it has stored in memory. If no SCC synchronization patterns are found, it must systematically search all FM channels and subcarriers. To that end, bit-sync hunt is performed by searching for a predetermined unique synchronization pattern. If the bit-sync event is missed (i.e., not all three pulses occur within the expected time window) no new correction is applied, and the clock is allowed to free run. The time estimate is still updated based on changing distance to the transmitter if navigation data are valid. If the bit-sync is missed continuously for more than 20 seconds, the error in the integer second time estimate may drift out of allowable limits. When this occurs, the CPU must resume bit-sync hunt on the current and other available FM channels.

Timing and clocking for tracker (and Net Hub) FM data reception, are handled as indicated by the timing and clocking diagram of FIG. 28. The clocking of received FM data 246 is scheduled by CPU 203 to begin at a specific TPU timer value which is not directly related to the FM data synchronization pattern 247, but is related to the estimated integer second time plus the estimated speed of light delay 248. Timing in the Figure is indicated in units of TPU 5 MHz TICs. The rising edge of the shift clock 250 causes bits to be shifted into an external shift register. The rising edge of the latch clock 252 latches the received byte in the output of the shift register. CPU 203 receives an interrupt on the falling edge of the latch clock to read in the data, with 428.8 $\mu$secs to read the byte.

The difference 253 between the time of received synchronization pattern and the time it was expected by the CPU is shown in FIG. 28 in exaggerated scale. Difference 253 is normally less than 20 $\mu$secs, caused by vehicle motion, clock errors between the SCC and the tracker/Hub, and jitter and other errors caused by the FM receiver. CPU 203 uses the average difference for the three pulses to correct its current estimate for the integer second time for the next second.

Tracker UHF data transmission, timing and clocking are handled as shown in the tracker data transmission timing and clocking diagram of FIG. 29. On the frame just before or during the frame the tracker is to transmit, the real-time executive must schedule the data transmission tasks. The tasks are scheduled to run with appropriate lead time (up to 6.5 msecs) to start TPU tasks to generate output state changes at the desired TPU timer values. The transmitter key and serial data clock should be precisely started and stopped. The first 16 bytes of the output data are loaded into the QSPI shift register before transmission begins, and the last part of the data is loaded before the QSPI empties. Times indicated in FIG. 29 are also in units of TPU 5 MHz timer ticks. TPU channel 3 may be required to count output bits so that the data clock and QSPI can be stopped gracefully.

Of course, data transmitted by the tracker includes information to identify the precise location or position of the vehicle in which the tracker is installed. As previously noted herein, the tracker utilizes high performance dead reckoning (DR) navigation to provide vehicle position and velocity data in urban canyons where GPS measurements are only intermittently available. The DR sensors include speed measurement which, in the present exemplary embodiment, is preferably based on the vehicle's cruise control speed sensor, if available, and an azimuth gyro and possibly a magnetic compass which are utilized for heading determination. A reverse direction sensor may be tied to the tail lights. These sensors are calibrated through the use of a Kalman filter based on DGPS corrected raw measurement inputs. The accuracy goal for the DR navigator is 0.2% of distance traveled (95% probable) after 4 minutes of DGPS measurement availability over a "typical" vehicle trajectory.

DR algorithm requirements take the following into account. Update rate of the DR navigation system is about 8 Hz in the presently preferred embodiment. Azimuth gyro data are sampled at a high rate (about 100 Hz) and integrated to propagate an estimate of heading. Speed sensor or wheel pulse count data are sampled with high priority to ensure regular time tagging intervals at 8 Hz and are transformed through heading and integrated to propagate an estimate of position.

GPS measurement requirements include pseudorange measurements available from the GPS section of the software at 8 Hz. These measurements are sampled and pre-processed as required. The GPS measurements are used by a Kalman filter run at two second intervals. Either the latest available measurement or an average of measurement data available up to the update time is used. The Kalman filter requirements recognize that the Kalman filter used to blend DGPS and dead reckoning data must support and estimate sensor error states with enough fidelity to achieve the desired dead reckoning navigation accuracy. In addition, the Kalman filter supports coarse alignment (heading error uncertainty larger than a small angle) and operates when some aiding sensors (such as a compass) are not connected.

A raw measurement filter must have three dimensional position and velocity error states and a good clock error model. Filter error states include:
  3 Position Error (NED)
  3 Velocity Error (NED)
  1 Heading or Wander Angle Error State
  2 or 3 Clock Error States
  2 Gyro Error States (bias and scale factor)
  2 Odometer Error States (scale factor and scale factor non-linearity)
  1 Compass alignment error state Magnetic compasses typically have error characteristics that vary sinusoidally with heading, so it is important to utilize an efficient method to handle the variable compass alignment error. Compass errors may be handled outside the structure of the Kalman filter. The processor has a temperature sensor which can be used for temperature compensation of the gyro.

When the navigation system is turned on, it can be initialized from position and heading stored at power down. However, these data are not entirely reliable, so initial co-variances must be large. If the system has a magnetic compass, initial measurements from it may be corrupted by nearby magnetic fields. The filter must be able to support a "coarse-align" mode, which typically involves using error states that are the sine and cosine of the heading/wander angle error because error propagation is linear with these terms. Once the sine and cosine errors are small, the system can switch to a single heading error state.

The Kalman filter propagates the error model for the dead reckoning process based on gyro and speed sensor data It also propagates aiding sensor error models including GPS clock errors and compass alignment errors. Measurements available to the filter include:
  1) GPS pseudorange
  2) Compass magnetic heading
  3) Gyro bias at zero velocity Zero velocity (zero angular rate) measurements are only available when the vehicle is stopped.

The Kalman filter error propagation and update cycle may require more than one second to complete. When filter processing starts, measurement data and error model information must be latched in software so that 8 Hz dead reckoning navigation solution propagation can continue in real-time while the filter operates on the previous cycle's data.

Time tagging of dead reckoning and GPS measurement data is critical to successful navigation. Dead reckoning speed sensor pulse counts and gyro data are sampled so that they are valid at GPS TIC events. The GPS raw measurements are also valid at the TIC events, so that time alignment may be performed in a simple manner.

Part of the Kalman filter estimate is a bias and velocity error of the receiver clock (the master 10 MHz TCXO). Because of this error and the inability to set the TIC interval precisely, the TIC interval drifts slightly from a true 8 Hz rate with respect to GPS time. It is desirable to account for this error and periodically adjust the TIC interval to correct for the drift.

The tracker has several analog inputs which must be shared through a multiplexed A/D. The highest priority analog input is the gyro, which must be sampled at between 50 Hz and 100 Hz when the vehicle may be moving (i.e., at any time the ignition is on). The battery voltage is monitored, mostly when ignition is off to ensure the unit is not draining the battery. Several external analog sensors may be connected to the tracker to provide customer specific information on vehicle parameters. Requirements for monitoring of these sensors is customer specific.

The RF card has a Received Signal Strength Indicator (RSSI) that is sampled periodically to determine the strength of the FM subcarrier broadcast. The temperature sensor on the CPU board is yet another analog signal, used for gyro calibration.

Parameter storage handling is an important aspect. The tracker CPU card uses flash memory for long term parameter storage when the unit is off or disconnected from vehicle power. The SRAM is backed up by vehicle power so that short term, sleep mode storage of the machine state will remain intact. Data is stored to flash memory on a daily or weekly basis so that loss of power will only cause the most recent data to be lost.

The CPU card has, for example, 512 K bytes of bank-erasable flash memory. The program and constant data preferably occupy the lower half of the memory, with the upper 256K reserved for parameter storage. A disadvantage of flash memory is that if any bank is being written or erased, the entire device is unavailable, until the operation completes. Since the code is in flash memory, care must be taken when writing to the device. The code which writes to flash must run in RAM with interrupts disabled. Erasing must use the suspend erase feature of the device. This is implemented with interrupt handling while the erase is being performed. In most cases, writing and erasing flash memory will occur when the CPU intends for the microcontroller to turn it off. Therefore, it is not a problem to disable all of the interrupts because no navigation or radio communications will be taking place.

The flash memory device is word (16-bit) addressable. Data written to flash must be done word-wise on even byte boundaries. Bytes can be read on odd byte boundaries, however.

As a storage method, a Linear File Store (LFS) system is preferably used to store parameter data. This method generates a linked list of variable length records which extends to fill a block of memory. When the block becomes full, the records not marked for reclamation are copied to a new block, and the old block is erased. The file system must recover from power loss during writing and reclamation. The LFS approach supports robust handling of power loss conditions. Records stored in flash memory should have a CRC or checksum to ensure the data are valid.

Parameter data are stored in at least one bank of flash memory, and updated periodically as new information becomes available. The flash memory stores the following types of data:

1. GPS satellite almanac data for satellite acquisition: New almanac data is stored on a weekly basis. It is read when the CPU is turned on and written when new data from the satellites is at least one week newer than the stored data. A full set of almanacs requires 2K of memory.
2. PROTRAK system market information: Data on the location and frequencies of the FM subcarrier transmitters used in each market is stored as the data are transmitted from the NDC. Storing this information allows the tracker to search known PROTRAK frequencies for the NDC broadcast data, thereby speeding system initialization. The navigation grid centers and UHF transmission frequencies for each market are also stored. Adequate space should be reserved for these data to allow 5–10 sets of data to be stored.
3. Tracker Serial Number: The unit's serial number is stored in flash memory, and is never erased or modified, except at the factory. Serial number and customer/device specific configuration data are stored separately from the parameter data in the flash memory.

Other parameters are defined as required.

The tracker supports log data, e.g., logging of position and other sensor information to flash memory for later download. This is useful for determining the location of a vehicle when it moves outside the service area; and, on return to the service area, the data can downloaded through the MDT interface or the radio.

VIII. Mobile Data Terminal

The MDT 190 serves as a control and display unit (CDU) for the tracker 135 (FIGS. 23, 26), primarily for the convenience of the vehicle operator. The MDT is a small conventional programmable computer similar to but generally smaller than a notebook PC (with customer-specific software) and display terminal with liquid crystal display (LCD), keypad, associated memory, and internal (integrated) circuitry, to enable display of text and other data, and to enable the vehicle operator to respond to text paging messages and to enter other data to be transmitted to the dispatcher. MDT 190 and tracker 135 communicate over a balanced, differential, asynchronous serial interface, which, in the exemplary embodiment, uses a Texas Instruments (TI) SN65C1167NS dual differential driver/receiver interface circuit. Tracker 135 supports "standard" baud rates up to 38400 bps, and MDT 190 should support a baud rate of at least 4800 bps. Programming of the MDT is controlled through the serial interface as well. The protocol and message formats, as well as the power and programming interfaces, are described in further detail below.

The preferred serial interface protocol for communication between the tracker and the MDT, and which is also used in other PROTRAK system serial interfaces, is based on the Rockwell NavCore V GPS engine interface described in the Rockwell International "NavCore Designer's Guide," Rev. H Dec. 14, 1993 (hereinafter referred to as the NavCore interface protocol). The MDT interface uses different baud rates and message timing.

In keeping with NavCore and other message numbering conventions, each interface is identified by a different thousands place in the message ID number. The MDT-tracker interface uses 7000 as the interface identifier. Messages transmitted by tracker 135 use ID numbers beginning with 7100 and messages received by it use ID numbers beginning with 7200. In the exemplary embodiment, the message IDs are:

| For tracker to MDT: | |
| --- | --- |
| 7101 | Navigation Data |
| 7102 | Received Message Data |
| 7103 | Received User Data |
| 7104 | Available Message Data |
| 7106 | User Data Message List |
| For MDT to tracker: | |
| 7201 | Data Request |
| 7202 | Text Message Response |
| 7203 | User Data Output |
| 7204 | Request Available Message Data |
| 7205 | Request Message |
| 7206 | Request User Data Message List |

When requested by MDT 190 (by action of the vehicle operator), tracker 135 sends navigation data (message 7201, Table 57, Appendix B) including current position, velocity, and time at approximately 1 Hz to the MDT. When the tracker receives a "Request Message" (7205, Table 66) from the MDT, it sends the data for the requested text message to the MDT using a "Received Message Data" packet (7102, Table 58). The latter either contains the full text of the received message or an ID number indicating a "canned" text to display. A response set is sent along with the text message, containing a unique set of text items that can be selected by the vehicle operator in response to the received message.

Each message has an identifier, or issue of data (IOD), a rollover counter, to differentiate messages within the system and to associate messages with their responses. When the operator selects a response to a message (e.g., an inquiry from the dispatcher), that message's IOD is sent back to the tracker with the response in message 7202. The response is selected using arrow keys on the face (keypad) of the MDT. The MDT stores the text, which can be up to a maximum of 80 characters, of a single message while it is displayed for the operator. The text of each response may be limited (e.g., to about 10 characters) attributable to screen size.

In the "Received Message Data" (Table 58), the Message Type indicates whether the message contains a canned or fill text message. If the message is canned, the next byte contains the ID number of the message; otherwise, it contains the length in bytes of the received message text. The next 2 bytes contain the IOD number of the received text message and the user response if a message has already been sent. The next 3 words indicate the date and time the message was received. The next word contains the number of valid responses in the response list. Next is the list of 4 text responses to be displayed above softkeys of the MDT. Unused response strings are zero filled. If the message is full text, the characters of the message follow in order. For an odd number of bytes, the last message byte is set to 0. The data checksum follows the response set in the case of a canned message or the text data in the case of a full text message.

The tracker receives customer-defined data from the NDC in a packet consisting of a data identifier (1 byte) and 20 bytes of data. Depending upon customer requirements and the type of data received, the tracker either acts on the data itself, or relays it to the MDT by sending a "Received User Data" message (7103, Table 59) for vehicle operator attention. At the MDT, customer-specific software processes the received data.

The tracker is capable of receiving and storing numerous text messages from the NDC. When the tracker receives a new message (as well as at periodic intervals), it sends an "Available Message Data" message (7104, Table 60) to the MDT, indicative of the number of unread messages and the number of saved messages, as well as a unique ID for each message for use to retrieve a specific message from the tracker. Upon receipt of this message 7104, the MDT periodically beeps a speaker or other alert device (e.g., a lamp, LED, or the LCD display itself) within the MDT if the number of unread messages is not zero, to informs the vehicle operator of unread messages needing a response. Individual unread messages are retrievable from the tracker by the driver sending a Request Message (7205, Table 66) from the MDT.

Tracker 135 is programmed with a set of canned "User Data" messages, a list of which (message 7106, Table 61) may be requested for display on the MDT by the driver's sending "Request User Data Message List" message (7206, Table 67). Upon subsequent receipt of a "Request Message" for a specific "User Data" message, the tracker will provide the text of that requested message to the MDT. Each message is a fixed 30 characters in length with unused locations set to 0x00.

A number of status and debugging messages are available from the tracker for periodic output, and the MDT can request that these messages—or specific ones of them by designation of message ID—be turned on or off by sending a "Data Request" message (7201, Table 62). By default, all of the available ones of these periodic messages are off. Once such a message is turned on, however, the tracker will continue to output it periodically, until the message is turned off or full power is removed from the tracker.

When the vehicle operator selects a response to a received text message, the MDT sends that response to the tracker using a Text Message Response message (7202, Table 63) which contains the IOD of the message being answered and the numeric response value.

The tracker is used to send customer-defined data to the NDC and on the dispatcher or subscriber via the Hub(s), using an output packet consisting of a data identifier (1 byte) and either 1 or 9 bytes of data, with customer-specific MDT interfaces that allow data entry. The data may consist of emergency requests, or a simple status of the vehicle as "job complete," or more complex information. In any case, after data entry it is sent from the MDT to the tracker by means of a "User Data Output" message (7203, Table 64), for transmission by the tracker to the NDC. The message is fixed length with actual space for 10 data bytes, and only 1 or 9 is meaningful based on the LSB of word 6. The remaining data bytes have their values set to zero.

When the vehicle operator desires to view any saved messages, he or she inputs MDT 190 to send a "Request Available Message Data" message (7204, Table 65) to the tracker to retrieve the list of available text messages, and the tracker responds with a list of the "Available Message Data" (7104, Table 60). Thereafter, a "Request Message" (7205, Table 66) is sent by the vehicle operator from the MDT to retrieve from the tracker a specific one of the available text messages from those contained in the list. As noted above, a "Request User Data Message List" (7206, Table 67) is sent by the vehicle operator from the MDT to retrieve a list of the canned "User Data" messages stored by the tracker.

Returning to power considerations, tracker 135 supplies 12 VDC power to MDT 190 as previously indicated in FIG. 26, with maximum current drawn by the MDT, including power-on and back light turn-on, preferably limited to 0.5 A. The MDT has a single interface connector, which is a printed circuit board mounted 9 pin D type in the present exemplary embodiment. The connector signals from the tracker to the MDT are:

1. Boot Load Control (not connected)
2. +RX Data
3. −RX Data
4. +TX Data
5. −TX Data
6. Ground
7. +12V
8. +12V
9. Ground MDT read-only memory (ROM) is programmable through the serial interface. The MDT is put into programming mode by asserting (pulling low) a Boot Load Control signal, and is then programmed by sending blocks of data through the serial port.

IX. Network Hubs

Referring now to the simplified block diagram of an exemplary Network Hub in FIG. 30, the Hub 11 receives vehicle data transmissions, recovers the binary data, and sends the data to the NDC via a telephone line. The Network Hub includes an FM radio receiver 85 (which is identical to the FM radio receiver in each vehicle tracker) to receive broadcast messages for timing purposes, a UHF radio receiver 81 to receive vehicle transmissions, and a modem 87 for communication with the NDC.

The Network Hubs are installed at strategic points—typically, leased space on existing radio towers in and around the metropolitan area being served—to receive vehicle data transmissions. The Hubs require only 110V AC power and business quality telephone line to operate. In a typical market, between 10 and 30 Hubs are needed to serve the various fleet operations calling for vehicle tracking. This relatively small number of units and need for high RF performance makes cost a less significant factor for the Hubs than for the trackers in the vehicles. FM and UHF receiver sensitivity and system reliability are very important.

Each Network Hub is divided into four major functional areas, namely: 1) CPU 82, 2) Power Supply 84, 3) Modem 87, and 4) RF Card 86. The CPU 82 corresponds closely to the tracker CPU, using a Motorola 68332 microcontroller running at 20 MHz. The 68332 is ideally suited for this application because of the SCI, QSPI, and TPU peripherals. Hub CPU 82 utilizes processor, SRAM, and flash memory as in the tracker, but does not require the GPS section of the tracker. Other similarities/differences to/from the tracker CPU in the Hub CPU are the addition in the latter of a TCXO, level conversion for the modem interface, and replacement of the UHF transmitter interface with a UHF receiver interface, but retention of the same FM receiver interface. The CPU flash memory is in circuit programmable through a header or connector using the processor's BDM mode interface.

The Hub uses the FM data stream, which is at a rate of about 4664 bps from the FM receiver 85, for system time synchronization just as the trackers do. The FM data is intended to be used by trackers, but still must be decoded at the Hub to the extent required to derive the timing data. The TPU in the 68332, to which the FM data stream is sent, and software running on the CPU use bit-synchronization information in the FM data stream to enable the TPU to generate the bit and byte data clocks used to control a shift register 88 on the CPU card, which also receives the FM data stream, and clocks the data into the processor 83. As with the tracker CPU, the Hub CPU is responsible for programming the FM frequency and subcarrier offset of the RF card over a serial interface.

For the UHF receiver interface, the UHF receiver 81 uses a DSP microprocessor 80 to extract the bit and byte clocks from the received UHF data stream. The processor on the UHF card is provided with timing information from the CPU, by which it can determine the windows in time to search for the received vehicle data.

The 68332 microcontroller 83 uses the peripheral SCI UART to communicate with external USRobotics modem 87 which has an RS-232 interface. Conversion is performed between 5V and RS-232 level signals. The SCI supports a bit rate of 19200 bps, generating up to about 2800 receive and transmit interrupts per second, with the modem connecting at 14400 bps. If support of faster bit rates is desirable, it may be attained using an external UART with a FIFO or including the GP2010 and GP2021 components of the GPS chip set to provide buffered, poled UARTs.

The power supply 84 converts 110V AC to 12V DC for the CPU and RF sections of the Hub which separately regulate power to 5V DC so as to isolate the two sections. AC to DC conversion is performed by an off-the-shelf linear power supply and transformer.

Modem power is supplied via a plug-in transformer, and the CPU provides the serial interface signals to support hardware flow control with the modem. The CPU software controls the modem to dial the NDC, login, and verify that the connection is operational. If the connection is broken, the Hub will hang-up and re-dial to re-establish it, repeatedly re-dialing until a connection is made if the NDC modem does not answer initially. The NDC phone number and the Hub user ID and password are stored in CPU flash memory. A connection speed of 14400 bps is used to maximize connection reliability. An EMI (electromagnetic interference) hardened modem may be needed in some situations since the system operates near RF transmitters.

The RF section 86 of the Hub receives the NDC broadcast on the FM subcarrier at FM receiver 85, and receives the TDMA vehicle transmissions on a UHF channel at UHF receiver 81. The data are provided to the CPU as serial streams. The CPU generates the data clocks for the NDC broadcast data as well as programs the receive frequencies of the RF card, and the RF card generates the clocks for the vehicle data.

The FM subcarrier data is on a 67 KHz or 92 KHz offset from normal FM channels, and the FM receive frequency and offset are fully programmable by the CPU. The subcarrier data is modulated by the SCA-300B 68 (FIG. 6) which uses a simple BFSK modulation scheme.

The vehicle trackers transmit data packets at assigned times on a frequency in the UHF business band, the UHF receive frequency also being programmable by the CPU in 12.5 KHz offsets between 450 MHz and 470 MHz. For efficient use of available bandwidth, the vehicle data rate is 7812.5 bps.

The CPU software enables it to perform its primary tasks, including time synchronization to the TDMA network, communication with the NDC via modem, RF card programming and control, reception and decoding of FM subcarrier data, and reception of vehicle UHF data and relay of the data to the NDC. Various software functions are written to be common with the same functions in other parts of the system. For example, many functions related to modem communication with the NDC are identical to those used in the SCC, although the serial data messages are different and the Hub must dial and login while the SCC is not required to do so. RF synthesizer programming, FM data reception, and FM data stream time synchronization code are identical to that of the tracker.

X. Subcarrier Control Computer (SCC)

The Subcarrier Control Computer 48 (FIG. 6) hardware of an exemplary embodiment is shown in the simplified block diagram of FIG. 31. The SCC controls the transmission of the NDC base broadcast message. The message is clocked out to SCA-300B subcarrier modulator 68 with precise message start times and a precise data rate. The SCC is preferably rack mounted along with the subcarrier modulator at the FM radio station 12. NTCC 47 at NDC 10 dials the SCC modem 57 to connect SCC 48 to the NDC. NTCC 47 provides the broadcast message data to be sent by the SCC to modulator 68, and the NTCC also controls the time at which each transmission begins.

CPU 260 of the SCC (as in the examples of the CPUs used for the Net Hub and the tracker, preferably a 16 MHz Motorola 68332 processor) uses a peripheral SCI UART (see, e.g., CPU 83 of the Net Hub of FIG. 30) as the interface for communication with external (preferably USRobotics) modem 57 via an input/output (I/O) card 262. A conversion is made between 5V and RS-232 level signals. The modem is set to communicate with CPU 260 at 19200 bps, and is allowed to connect to NTCC 47 at rates between 14400 bps and 19200 bps. At this communication rate, the SCI can generate up to about 2800 receive and transmit interrupts per second.

CPU 260 uses the peripheral QSPI of the 68332 device (see again, e.g., CPU 83 of the Net Hub of FIG. 30) for the subcarrier modulator interface, to send the serial transmit data to subcarrier modulator 68. Here also, a conversion is made between 5V and RS-232 level signals. The QSPI is clocked by the TPU of the 68332 processor for precisely controlled clock phasing. The output data rate is approximately 4664.18 bps (2.5 MHz/536). However, the transmit data is Miller encoded so that 2 Miller code bits are transmitted for every data bit (9328.36 code bps), for a divisor of 268. The OC (output compare) TPU function uses a half cycle count of 134. An existing RF serial clock from the TPU to the QSPI is used for the output data clock.

Transmit data timing and clocking requires three TPU channels, since starting the data clock at the correct time requires using two additional TPU channels. The first TPU channel is wired to the second channel. On the first channel, the CPU initiates a single transition OC at a desired time and programs a third channel for OC with continuous pulse mode with a precise timing control register (TCR) start time equal to the actual desired start time. The second channel is set up to run ITC (input transition count/capture) with a link to the third channel. When the processor initiates the transition on the first channel, the TPU, through the ITC link, starts the data clock on the third channel at the precise start time.

In keeping with the precise timing required by the PROTRAK system, SCC 48 is run directly from a 1.5 ppm TCXO crystal oscillator. To maintain common bit rates between the SCC, the Network Hubs and the trackers, which run at 20 MHz, the TPU of CPU 260 is run at 10 MHz. The real time executive is run at a 1 KHz rate which allows the required programming resolution of the TPU functions. The executive needs the value of the TPU TCR counter at each executive timer tick so that executive time can be synchronized with the TPU timer for programming of data transmission functions. To that end, it is convenient to use the ITC TPU function to generate interrupts for the executive. Interrupts are generated by detecting transitions from a second TPU channel running a pulse-width modulation (PWM) function at the desired executive rate.

CPU 260 initiates a 50% duty cycle square wave on the first channel of the TPU. The PWM frequency should be a convenient divisor of 2.5 MHz; a half period width of 2500 (1 KHz executive rate) is deemed adequate. The output of this channel is fed into the input of the second channel which runs ITC. The ITC samples TCR1 and interrupts the processor on every transition of the PWM signal. The executive can then read the TPU register to determine the TCR1 value at that interrupt TIC.

The primary function of SCC 48 is to transmit the base broadcast message provided by NTCC 47 at a precise 1 Hz rate, synchronized to the GPS integer second. NTCC 47 listens to the SCC initiated broadcast and controls the timing by comparing the start of each received broadcast message to GPS time, computing a timing correction based on the difference between the time of reception and GPS time and sending a correction back to the SCC. SCC 48 then adjusts the transmission time of the subsequent messages based on this correction. This timing process has been described in further detail hereinabove.

The NTCC 47 modem interface is implemented such that the SCC 48 will answer the call placed by the NTCC to its modem. The SCC receives broadcast message data and timing control commands over the serial interface, with the broadcast message from NTCC 47 typically being sent in five packets. The SCC then assembles the packets in order and sends the message data to subcarrier modulator 68 on the next integer second. An LCD panel display 263 on SCC 48 is used to display status and debugging information.

A number of software functions are written to be common with functions in other parts of the system. For example, many functions related to modem communication by the SCC with the NTCC are identical to those used in the Network Hub. However, the serial data messages are different and, unlike the SCC, the Hub must dial and login. Parts of the time synchronization code and executive are common with the Network Hubs and trackers.

During normal operations, SCC 48 receives 5 blocks of 155 bytes of data from NTCC 47, to be transmitted each second on the FM subcarrier broadcast by radio station 12. The SCC Miller encodes the data, inserts a preamble and synchronization pattern at the beginning, and places the resulting 9264 bits into an output buffer. Before the next transmit time, the output data clock is stopped and set to start again at the next desired start time as commanded by the NTCC. The QSPI output buffer is primed, and CPU 260 toggles a TPU output channel to start the transmit synchronization process.

For NTCC-SCC synchronization, NTCC 47 coordinates the timing of sending the broadcast data to SCC 48 by basing it on the time of reception of an SCC Status message (see Table 72 of Appendix B, referenced in the NTCC Section discussion below). The SCC sends this message each time it initiates a data transmission. At that time, NTCC 47 sends new broadcast data message (1102, see Table 71 of Appendix B, also referenced in the NTCC Section discussion below). This timing scheme ensures minimum latency of the broadcast data, and eliminates timing ambiguities between the NTCC and the SCC attributable to the lack of an absolute time reference at the SCC.

The complete 5 blocks (575 bytes) transmitted by NTCC 47 requires approximately 500 msecs to be sent to SCC 48, at 14400 bps. The SCC allows a total of about 900 msecs for the reception of new data before the processing must be completed for transmission of the data on the next second. This extra time allows for retry of one or two message blocks that may have been corrupted. A higher connect bit rate will allow additional retries, but with the possibility that it may be less reliable. Invalid broadcast data from an NTCC message with a valid header should be transmitted even if an error-free retry from the NTCC is not available, because the Golay coded data may be correctable by the vehicle trackers themselves.

For message data processing, SCC 48 forms the complete transmit data buffer by putting the preamble and bit-sync pattern in the buffer and then appending the data. The transmit data is sent by the NTCC to the SCC with non-return to zero (NRZ) line coding. The SCC is required to Miller encode the data, which converts the 4600 NRZ data bits to 9200 Miller bits. The encoding process takes about 12–15 msecs. Miller code uses memory of the previously encoded bits so it can only be performed on a data block if the previous block has been received. The preamble is an alternating one-zero Miner bit pattern inserted before the bit-sync pattern: 11 00 11 00 11 00 11 00, with the left most bit transmitted first. The bit-sync pattern is 48 Miller bits long and is 9 high bits followed by 7 low bits, repeated 3 times.

The QSPI of the 68332 processor of CPU 260 is used as the output shift register. The internal QSPI buffer holds 16 bytes if it is configured for 8 bit transfers. With 8 bit transfers it will empty every 13.72 msecs, so a task must be scheduled in the real time executive to service the QSPI queue. The QSPI sends data with most significant bit first, which is taken into account when forming the preamble and bit-sync patterns and when loading the QSPI.

The NTCC/SCC data flow is illustrated in the timing diagram of FIG. 32. SCC 48 simultaneously sends broadcast data 265 for the current frame and received data 266 from the NTCC for the next frame. After about 900 msecs into the current frame (at 267), the SCC must cut off reception of data from NTCC 47 and begin processing the available blocks. If data blocks are completely missing, the SCC assumes the NRZ data to be all zeros and performs Miller encoding accordingly. SCC 48 must also compute a new transmit time based on received commands from the NTCC. The TPU is programmed with the new transmit time during the gap time 269 between the broadcast data transmissions.

All of the transmit timing and synchronization occurs in the approximately 6.9 msec gap time 269 between transmissions. During this time, SCC 48 performs the following steps to begin transmitting the data for the next time:

1. Stop the QSPI.
2. Turn off the OC data clock on TPU channel 3.
3. Switch the output data buffer to the newly received data.
4. Program TPU channel 3 for continuous pulse mode to start at the next transmit time.
5. Load the QSPI with the new data and enable the QSPI.
6. Send the SCC status message to the NTCC.
7. Toggle TPU channel 1 OC state to start the synchronization process.

Transmit data timing and clocking requires 3 TPU channels: Channel 1 is programmed to be a single transition OC function, which is set up to toggle during the gap time by the CPU. The output of channel 1 is wired into the input of channel 2. The channel parameters are:

```
PSC = 11              do not force any state
PAC = 010             toggle on match
TBS = 0100            output channel, match TCR 1
OFFSET = 0
(REF_ADDR1) =         TCR1 time for transition
(REF_ADDR2) =         don't care
(REF_ADDR3) =         don't care
```

Channel 2 is programmed with the ITC function to continually generate links to channel 3. The ITC is set up to trigger on any transition. The channel parameters are:

```
PCS = 11
PAC = 011             detect either edge
TBS = 0000            input channel, capture TCR1
MAX_COUNT = 1
START_LINK_CHANNEL = 3
LINK_CHANNEL_COUNT = 1
BANK_ADDRESS = unused TPU parameter RAM location
```

Channel 3 is programmed with a continuous pulse OC function. This is the output data clock and is wired to the clock input of the QSPI. During the gap time, it is reprogrammed with an updated REF_TIME which is the transmit start time. The channel parameters are:

```
PSC = 10              force low on initialization
PAC = 010             force low on match
TBS = 0100            output channel, match TCR1
RATIO = IFF
(REF_ADDR1) = don't care
(REF_ADDR2) = 134
(REF_ADDR3) = transmit TCR1 time
```

The reference address pointers point to locations in TPU parameter RAM (random access memory). Therefore, the parameter space of unused channels must be used to store the data for this channel. Interrupts from these channels may be disabled.

SCC 48 has three modes of operation: initialization, idle, and run. When the SCC is turned on, it enters the initialization mode. In this mode, the software initializes system variables, turns on the LCD 263 and backlight, initializes the modem 57, and sets up the TPU to start the real time executive. After initialization is complete, the SCC enters the idle mode.

In the Idle mode, SCC 48 waits for a call to be received from NTCC 47. While waiting, the SCC does not send data to subcarrier modulator 68, and the output remains high or low. Modem 57 is monitored for a connection event. When the modem connects, the SCC enters the Run mode and receives commands from the NTCC.

In Run mode, NTCC 47 commands SCC 48 into one of two data transmission modes, viz: synchronization or broadcast. The NTCC uses synchronization mode first, to align the broadcast synchronization pattern with GPS time. In this mode, the SCC chooses an arbitrary start time and transmits a preamble and bit-sync pattern without any data at one second intervals. The NTCC commands the SCC to move the transmit start time until synchronization with GPS time is achieved. At this point, the NTCC commands the SCC to assume broadcast mode. In this mode, the NTCC provides the five blocks of data each second to be transmitted. During run mode operation, the SCC sends its status message to the NTCC before each transmission starts as described above.

If valid message data stops are being received from the NTCC for a predetermined period of time, the SCC hangs up the modem, reinitializes the modem, and returns to idle mode to await another call from the NTCC.

X. Network Timing and Control Computer (NTCC)

As has been described hereinabove (and with brief reference again to FIG. 6), NTCC 47 interfaces with a number of other applications, including NDC Server 42, NTCC roof module 55, and via a modem, SCC 48. The NTCC serves as a real-time control interface to the radio network for the NDC, and also receives timing data and DGPS corrections from a NavSymm XR5M GPS receiver 54 in the roof module. Interfaces between the computers are serial. PPS and reset discretes are supported between NTCC 47 and roof module 55.

NDC server 42, roof module 55, and SCC 48 all use the same protocol and message formats to communicate with NTCC 47, based on the aforesaid NavCore interface protocol. The NavCore interface protocol is modified for purposes of the present exemplary embodiment of the PROTRAK system, in that the lower byte of the status flag word in the header is used for a free running message counter. The message counter uniquely identifies the message and is used in an ACK/NACK reply if an acknowledge to the message is required. This enables, multiple messages of the same type to be pending (awaiting acknowledges) simultaneously. The message counter in the ACK/NACK identifies the specific message being acknowledged.

In keeping with NavCore and certain other message numbering conventions, each interface is identified by a different thousands place in the message ID number. Messages transmitted by NTCC 47 use ID numbers beginning with x100 and messages received by the NTCC use ID numbers beginning with x200, where x is the thousands place interface identifier. The message IDs for each serial interface are shown in Table 68 below.

TABLE 68

Serial Interface Message ID Numbers

| Interface | Message ID Range |
|---|---|
| SCC | 1100/1200 |
| NDC Server | 2100/2200 |
| Roof Module | 3100/3200 |

The NTCC serial interfaces are performed using a Contec COM-8SF-2 multi-port serial IO board, which is capable of communicating at up to 115200 bps. PPS and reset discretes are supported by a Contec P10–48W board.

The NTCC communicates with the SCC, NDC server, and roof module with serial data messages. With reference again to FIG. 6, NTCC 47 establishes a connection to SCC 48 by placing a call to the SCC through modem 57. When the modem is connected, the NTCC begins sending timing control messages, and the SCC begins sending status messages. After time synchronization is achieved, the NTCC begins sending full transmit data sets consisting of DGPS data and NDC generated messages consisting of 5 frames of 115 bits in length. The SCC is responsible for generating the bit sync and the start of the FM broadcast. The messages used for communication between the NTCC and the SCC are summarized in Table 69 (Appendix B), and in further detail below and in other tables of Appendix B, as indicated below.

NTCC 47 controls the timing of the FM subcarrier broadcast using a "Timing Control" message (1101, Table 70). SCC 48 uses the data in this message to adjust its transmit timer so that the broadcast data bit sync will be synchronized with GPS time. The timing control message is transmitted by the NTCC near the beginning of a one-second interval. The SCC integer second timer is programmed using the timer control contained in the timing control message before the current timer expires.

In brief, and with reference to Table 70 (Appendix B), the timing control mode is the least significant byte of word 6 in the timing control message, and has three values: 0=off 1=coarse, and 2=fine. The control type is the most significant byte of word 6, indicating how the timer control in words 7 and 8 of the message is to be applied. The control type has three values: 0=do not use, 1=add to nominal, and 2=one shot. If the control type is 0, it is ignored; if it is 1, the value of the timer control is added to the nominal timer value and the timer is reprogrammed; and if it is 2, the timer is programmed with the value of the timer control one time and then reverts to the nominal value.

A "Transmit Data Frame" message (1102, Table 71), contains a portion of the full SCC broadcast message which is broadcast each second. The broadcast message is broken into smaller frames, so that if part of the message is missed it can be repeated more quickly than repeating the entire broadcast message.

The nominal broadcast message typically consists of five 115 byte frames (23 bit interleaving of (23,12) Golay code), which makes the entire broadcast message 4600 data bits long. Data frame messages containing data to be transmitted on the next broadcast frame are transmitted to the SCC from the NTCC on the current frame. The SCC transmits the available broadcast data at the beginning of each second. If frames of data are missing, the missing frames are replaced by zeros in the transmit data stream.

Near the beginning of each second, the NTCC determines the data to be transmitted on the next second, and these data are broken up into frames. Several messages with ID 1102, one for each frame, are queued at one time.

The broadcast frame ID in word 6 of the "Transmit Data Frame" message indicates the broadcast frame for which the transmit data is intended. The SCC uses this value to preclude mixing of the data intended for different broadcast frames. The frame number and total number of frames are contained in the least significant and most significant bytes of word 7 to indicate the manner of assembly of the frames of data if the messages are received out of order. The number of bytes in the frame, l (in word 8), indicates the number of data bytes to follow. If l is odd, the most significant byte of the last data word is padded with 0x00. The data bytes are ordered so that they are transmitted to the SCC in the same order as they are to be re-transmitted by the SCC.

SCC 48 transmits status information to NTCC 47 at one-second intervals, in "SCC Status" messages (1201, Table 72). A current nominal timer in the message contains the present nominal value of the transmit timer countdown. SCC status in word 8 is bit-coded.

NTCC 47 communicates with NDC server 42 via an 115200 bps serial interface, or TCP/IP directly, or over dial-up. The server supports two simultaneous NTCC systems for FM station/NTCC redundancy, sending the same tracker data to both NTCC systems, but trackers and Network Hubs operate from only one at a time. This is the primary system, and if that system fails, NDC server 42 commands the Net Hubs to switch to the secondary FM station, and the trackers will soon thereafter also switch to the secondary station.

During normal operation, server 42 sends packets containing data to be transmitted to the vehicles (i.e., to the trackers installed thereon) to NTCC 47. The NTCC formats the data into transmit data frames and sends them to the SCC. The NTCC provides server 42 with a status message to be transmitted at the beginning of each integer second to allow the server to schedule processing tasks. The status message indicates status of the NTCC and SCC to the server, and informs the server regarding available space in the output queue for data to be sent to the vehicles.

Messages used in communication between NTCC 47 (as well as an additional NTCC, if present) and NDC server 42 are summarized in Table 73. Dial-up NTCCs must login twice, with a 3Com/U.S.Robotics Modem Bank and Radius server for the first login using standard "login:" and "password:" prompts to authenticate user ID and password. If a dial-up NTCC is successfully logged into the network, it is connected to a TCP port on the NDC server reserved for Network hub connections. Once connected, the NDC server sends a "Login Info Request" message (2104, Table 74) to the connecting Network Hub to authenticate it to the NDC server. The same user ID/password pair used to login to the modem bank is sent as a response in a "Login Info Response" message (2304, Table 75). However, NTCCs with TCP/IP connectivity to the NDC server need not login to the modem bank, but rather may simply connect to a TCP port on the NDC server and respond to the "Login Info Request" message."

After the NTCC is authenticated, the NDC server requests an NTCC Profile by sending an "NTCC Profile Request" message (4105, Table 76). Although the NTCC may modify its profile, the NDC server maintains an accurate profile by using the information contained in an "NTCC Profile Response" message (4305, Table 77) which is sent by the NTCC in reply to the request message.

The NTCC controls the real-time portion of the radio network for the NDC server. A "Status Message 2" (2103, Table 78) is sent by the NTCC to the server at the start of each second, to be used by the server as a rough time mark for scheduling periodic tasks. The accuracy of the time mark depends on the rate at which the NTCC and the server service their serial transmit and receive data queues, respectively. If two NTCCs are connected to the server, the server uses the time mark information from the primary NTCC.

When the NTCC requests connection to the NDC server, the server transmits data describing the FM radio station to which the NTCC will attempt to connect in an "FM Data" message (2201, Table 79) which indicates the frequency of the FM station and the subcarrier frequency on which the PROTRAK system is operating. The position of the FM transmitter in latitude, longitude and altitude is provided in the message to enable the NTCC to compute the propagation delay of the broadcast. The telephone number in the message is a null-terminated, ASCII string that the NTCC must dial to connect to the SCC.

For each base station transmit packet generated by the NDC server, e.g. "FM Identification," "Slot Allocation," etc., the server sends a "Vehicle Packet" message (2202, Table 80) containing the transmit packet to the NTCC, which is ultimately to be transmitted to the vehicles by the SCC via the FM subcarrier. The NTCC places this packet in the output queue, and in the base station broadcast message as space permits. "Vehicle Packet" messages are not acknowledged by the NTCC, simply because of the volume of messages to be coordinated by the server.

When the NTCC connects to the NDC server, the latter sends a "Local Time Zone Offset" message (2203, Table 81) to the NTCC indicative of the offset, which the NTCC broadcasts to trackers (via the SCC and the FM subcarrier radio transmission) with the "GPS Time" base packet. The NDC Server sends this offset message 2203 to the NTCC not only in response to receiving a valid NTCC profile response message, but at the start of each hour. In this way, the NTCC maintains the latest time zone information in all local time zones that change on the hour.

NTCC 47 communicates via a 38400 bps serial interface with roof module 55, whose CPU 56 receives the FM broadcast via receiver 58 from SCC 48 at radio station 12. As previously described herein, the time of arrival of the FM data is compared to the GPS integer second, and the difference between the integer second start and the time the message data are received is provided to NTCC 47 to develop a correction for timing control feedback to SCC 48. The NTCC compares the received data to the data provided to the SCC, to verify that the correct data was transmitted. NTCC 47 furnishes RF information to roof module 55 to enable the latter to tune FM receiver 58 to the proper channel and subcarrier.

Messages used for communication between NTCC 47 and roof module 55 are summarized in Table 82. The NTCC sends a "Frequency Control" message (3101, Table 83) to the roof module during initialization, commanding the latter to tune to the proper FM radio frequency.

The NTCC furnishes time and status information to the roof module by sending a "Time/Status" message (3102, Table 84) at one-second intervals. Although the roof module in the exemplary embodiment uses GPS time for synchronization to the PPS from the GPS receiver, as an alternative a roof module CPU 56 may be used that does not require periodic time information, but simply initialization information for GPS receiver 54. The "TimetStatus" message, sent shortly after the PPS, contains the time at the PPS. Other mode and status information are also provided to the roof module CPU.

In a "Status" message (3201, Table 85), the roof module provides its status to the NTCC, including the current frequency being used. A timing status word in the message indicates the GPS time synchronization status with bit 0=received time valid and bit 1=time synchronized. FM status word is coded with bit 0=synthesizers locked, bit 1=bit-sync hunt mode, bit 2=sync detected.

The roof module reports received FM data in a message (3202, Table 86) to the NTCC, which the NTCC compares to the data transmitted for frame time synchronization and monitoring of the transmitter and roof module receiver. During normal operation, the FM data is received starting near the beginning of the integer second and ends shortly before the end thereof, so the FM data for a one-second interval is reported to the NTCC at the beginning of the next interval.

The roof module indicates the time difference (delay) between the integer second and the received FM bit-sync to the NTCC in a "Timing" message (3203, Table 87), for timing loop control. The integer second is defined by the GPS PPS, and the "Timing" message must be sent immediately after the delay is computed to allow the NTCC to compute a clock correction and send it to the SCC before the start of the next integer second. In the normal run mode, the sync is detected about 15 msec after the integer second. The GPS week and time are provided in the "Timing" message for the start of the integer second for which the delay is computed. The delay specified is the time from start of integer second to detection of the sync. The TPU running at 5 MHz has a resolution of 0.2 μsec.

The GPS receiver 54 of roof module 55 is a NavSymm XR5M GPS receiver for DGPS correction generation. The NTCC has two serial interfaces to the XR5M receiver—a CDU port and the DGPS output port—the CDU port being used to control receiver operation and the DGPS port supplying RTCM-104 format DGPS corrections. Alternatively, roof module 55 may be implemented so that the interface with its CPU 56 supports the GPS functions.

Discrete Interfaces include PPS (pulse-per-second) and Reset, the NTCC requiring a PPS for synchronizing its executive to GPS time. The roof module also uses a PPS for timing of the subcarrier broadcast, and in the current embodiment, the Navstar XR5M GPS receiver provides the PPS and the NTCC uses a reset signal to control initialization of that receiver.

XII. Database Management and CCS Server (DMCS)

The DMCS (e.g., 27, FIG. 3) at a customer site 13 is conveniently described in conjunction with control of the interface between NDC server 42 and components that communicate with the server including the CCSs (e.g., 14, 15), the NDC command stations (e.g., 43, 45, FIG. 4), the Network Hubs (e.g., 11-1, 11-2, FIG. 3), and NTCC 47, and messages used for those communications.

The standard message format used to communicate between the NDC Server and all other systems is based on the message format defined in the aforesaid NavCore interface protocol, with a fixed five-word header section and an optional data section as shown in Table 88. The standard message header format is shown in Table 89.

The Message Start Word is always 0x8IFF, indicating the start of a valid message. The Standard Message Type ID (IDNN) indicates the interface (I) where a message is used, the message direction (D), purpose, and number (NN). The valid Message Type ID range for the software components that interface with the NDC server is shown in Table 90, and, for those software components that interface with the DMCS, in Table 91. The Data Word Count field indicates the number of 16-bit words contained in the data portion of a message (this field being 0 if the message has no data section), excluding the Data Checksum field.

In the Flags/Message ID field, the least significant byte (bits 7–0) identifies the message if an acknowledgment or negative acknowledgment is necessary, and bits 12, 11, and 10 are flags indicating Required Acknowledgment, Acknowledgment, and Negative Acknowledgment, respectively. If a message is sent with the Required Acknowledgment bit (12) set, the receiver must respond using the same Message ID with the Acknowledgment bit (11) or the Negative Acknowledgment bit (10) set. If a required acknowledgment is not received within a preset amount of time, or a Negative Acknowledgment is received, the sender must send the message again.

The Header Checksum is computed by adding all words contained in the header and performing a 2's complement on the sum, expressed mathematically as (from the NavCore interface protocol):

$$\text{SUM} = \text{Mod } 2^{16} \sum_{I=1}^{4} \text{word}(I)$$

Header Checksum=–SUM if SUM ≠ –32768
Header Checksum=SUM if SUM=–32768
Where:
1. Unary negation is computed as the 2's complement of some 16-bit data word.
2. Mod $2^{16}$ indicates the least 16 bits of an arithmetic process (only lower 16 bits kept).
3. The summation is the algebraic binary sum of the words indicated by subscript (I).
4. The –32768 Sum Value must be treated as a special case since it cannot be negated.

Most standard messages used to communicate with the NDC server have a data section as shown in Table 92. The Data Word Count in the message header identifies the number of data words in the data section, these being 16-bit data words that form a message in the format indicated by the Standard Message Type ID. Messages without a data section have no data checksum. Messages with a data section do have a data checksum, which is computed in the same way as the header checksum. The only difference between the two calculations is that the header checksum is calculated using the first four words of the header while the data checksum is calculated using all of the data words prior to the Data Checksum field.

Each byte of the Standard Message is transferred with bits ordered from least significant to most significant, i.e., the least significant bit being transmitted/received first. Each word is sent with the least significant byte first.

The message formats used for the NDC server/DMCS interface are as follows. With respect to command/response messages and message request/response sequences that may be initiated by NDC server 42, once a DMCS 27 has connected to the NDC server, it must be ready to receive and respond, if necessary, to messages sent by the server. The Message Type ID of 71 XX identifies messages that are initiated by the NDC server while necessary responses to these messages are indicated by Message Type ID 73 XX (as shown in Table 90).

Dial-up DMCS applications are required to login twice. A U.S. Robotics Modem Bank and Radius server perform the first login, using standard PPP login prompts to request authentication of the user ID and password. If a dial-up DMCS is successfully logged into the network, it may connect a TCP port on the NDC server, at which point the server sends a "Login Info Request" message (7101, Table 93) to the connecting DMCS for authentication to the server. The same user ID/password pair used to login to the modem bank is sent as a response in a "Login Info Response" message (7301, Table 94). A "Login Info Response Result" message (7107, Table 95) is returned by the NDC server to indicate the result of the login attempt. The double login is necessary to control access to both the NDC server network and the NDC server itself and is hidden from dial-up DMCS users. DMCS applications with TCP/IP connectivity to the NDC server do not require login to the modem bank, but simply connect to a TCP port on the NDC Server and respond to the "Login Info Request" message.

When messages (Text, Predefined, or Site Dispatch) are sent to trackers, a timeout value may be specified. If a message is not acknowledged before its specified timeout value, the NDC server sends a "Message Timeout" message (7107, Table 96) to indicate that the message was not acknowledged and that no further attempt will be made to send the message unless a re-send request is made. Messages sent to multiple trackers may be acknowledged by a subset of the original recipient list. The tracker IDS listed in the "Message Timeout" are for those trackers that failed to acknowledge the message prior to the timeout.

NDC command stations have the option to send an "NDC Command" message (7102, Table 97) to CCSs connected to the DMCS, to notify CCS users of important events (e.g., system shutdown warning during testing). A DMCS that receives an "NDC Command" message responds using an "NDC Command Response" message (7302, Table 98) and forwards it to all CCSs.

While the DMCS is connected to the NDC server it receives real-time tracking data from the server in a "Real-time Tracking Data" message (7103, Table 99) for trackers associated with the respective customer. Such messages, which may contain messages of several different types, e.g., tracker location, tracker speed, tracker heading, user data received from a tracker, message acknowledgments/responses, and site status information, are sent to the DMCS as they are received by the server. Tracking data messages for trackers with continuous tracking service or login only tracking (LOT) service are received at a rate specified by the tracker's associated active update rate. And for trackers with manual tracking service, tracking data messages are received as a result of a request made by the DMCS with a Send Tracking Request Message. The Real-time Tracking Data Message Format is shown in Table 100.

As previously described herein, the trackers have a capability to sense when the associated vehicle's ignition has been turned on or off. If a tracker is in the RF network and a vehicle's ignition is turned off for a predetermined interval of time, the tracker requests a low-power slot from the NDC server. After receiving its low-power slot, the tracker shuts down until just prior to its next update. Trackers continue to provide updates in this slot while the ignition remains off or the vehicle's battery voltage is below a minimum value. A "Tracker Power Mode" message (7107, Table 101) is sent to the applicable DMCS each time a tracker for which it is accountable switches to or from low power mode.

When the DMCS or NDC command station updates a tracker profile, the updated profile information is forwarded to all connected DMCS applications associated with the profile in the form of a "Tracker Profile Update" message (7104, Table 102), with the Tracker Profile Format shown in Table 103.

NDC server 42 does not manage the installation history for trackers, but can query the DMCS (e.g., 27) to determine when trackers have been installed and removed from vehicles. A "Retrieve Tracker Installation History" message (7105, Table 104) allows the NDC server to specify an installation date range. A "Retrieve Tracker Installation History Response" message (7305, Table 105) is used by the DMCS to supply information to the NDC server for all trackers that were installed into vehicles during the specified time period. Since the response message may be quite large, an individual response message is returned for each tracker installed. An exemplary Tracker Installation Record is shown in Table 106.

DMCS 27, which is responsible for management of vehicle profile information (e.g., vehicle identification number (VIN), state, license, make, model, year), provides this information to NDC server 42 in the form of a "Retrieve Vehicle Profile List" message (7106, Table 107), upon request. The NDC server typically makes this request if it knows a VIN (which it has learned from the "Retrieve Tracker Installation History Response" message) and needs additional information about the vehicle. If the VIN is not known, the Retrieve Vehicle Profile by Installed Tracker may be used. A Retrieve Vehicle Profile List Response message and Vehicle Profile Format are shown in Tables 108 and 109, respectively.

Once a DMCS has successfully logged into the NDC server, it may send command messages to the server with a Message Type ID of 72 XX. Any responses from the server to these command messages are identified by Message Type ID 74 XX. Command/response messages and message request/response sequences initiated by a logged on DMCS are discussed below.

When messages (Text, Predefined, or Site Dispatch) are sent to trackers, a message sequence ID is associated with the message. Messages pending acknowledgment may be cancelled by sending a "Cancel" message (7215, Table 110) with the associated message sequence ID, which is followed by a "Cancel Message Response" message (7415, Table 111).

A user ID and password combination is necessary for dial-up access or TCP access to the NDC server. Users that login to the NDC server network and application use the same user ID and password for both. Once a user has logged into the NDC server, a "Modify Account Password" message (7201, Table 112) may be used to modify the password, and is responded to by a Modify Account Password Response message (7401, Table 113).

When a tracker profile is entered into the NDC server database, a tracking service is entered as part of the profile. Each tracker has a tracking service, with valid tracking services being continuous tracking, LOT, and manual tracking. Trackers with continuous tracking service send their tracking information on a periodic basis even if a DMCS is not connected to the NDC server to receive this information. Trackers with LOT service transmit their information periodically if a DMCS is connected to the NDC server to receive this tracking information. Manual tracking service trackers only transmit their tracking information upon request. For continuous and LOT, an update rate (in seconds) is also entered as part of the profile to indicate the periodic rate at which the tracker should send its tracking information, the rate being used to initially set a tracker's active update rate when a tracker is first eligible to enter the radio network. A "Modify Tracking Service" message (7202, Table 114) may be sent to modify the tracking service and the associated update rate, and is followed by a "Modify Tracking Service Response" message (7402, Table 115).

DMCS applications may send a "Ping Request" message (7203, Table 116) to verify their connection to the NDC server. If a "Ping Response" message (7403, Table 117) is received, the connection is active and the NDC server is operational.

Referring back to the "Message Timeout" message sent by the NDC server, described above, a "Resend" message (7216, Table 118) is sent to the server to indicate that a message should be re-sent to trackers from the original list of recipients that failed to acknowledge the message before the timeout period, followed by a "Resend Message Response" message (7416, Table 119).

As with the DMCS's responsibility for management and maintenance of vehicle profile information, and the use of a Retrieve Vehicle Profile List, described above, the NDC server maintains an information profile for each tracker, which contains information to identify the tracker. The information includes the tracker's update rate, service type, and service flags. A "Retrieve Tracker Profile List" message (7204, Table 120) is sent to retrieve a list of tracker profiles associated with a customer account. The list to be returned may be limited by specifying the tracker IDs. The applicable response message (7404) is shown in Table 121.

Text messages may be sent to vehicles with a tracker and an MDT. A "Send" message (7205, Table 122) commands the NDC server to send a text message to all trackers associated with the requesting user or to a list of individual trackers identified by tracker ID. Pre-defined Exemplary Message Response Sets are shown in Table 123. If the NDC server successfully queues a message to be sent, a "Send Message Response" message (7405, Table 124) is used to indicate a Message Sequence ID associated with the message being sent. If the message is successfully acknowledged and/or responded to by a tracker, the DMCS receives a "Message Response And User Data" or "Short Message Response and User Data" packet within a "Real-time Tracking Data" Message (discussed above) that contains the same Message Sequence ID.

Pre-defined text messages also may be sent to vehicles with a tracker and MDT. A "Send Pre-defined Message ID" message (7206, Table 125) commands the NDC server to send a pre-defined message ID to all trackers associated with the requesting user or to a list of individual trackers identified by tracker ID. If the NDC server successfully queues a message to be sent, a "Send Pre-defined Message ID Response" message (7406, Table 126) is used to indicate a Message Sequence ID associated with the message ID being sent. If the message is successfully acknowledged and/or responded to by a tracker, the DMCS will receive a "Message Response And User Data" or "Short Message Response and User Data" packet within a "Real-time Tracking Data" message that contains the same Message Sequence ID.

A "Send Site Dispatch" message (7207, Table 127) is used to facilitate dispatching and automating the recording of site arrival/departure. It is sent by the DMCS to a tracker to indicate a job site area and a message (e.g., site street address) to be displayed to the vehicle operator. A predefined or custom response set may be defined to permit a manual response. Upon arrival/departure at/from the site defined by the message, the tracker sends a "Site Status" packet within a "Real-time Tracking Data" Message to indicate site arrival/departure, either by virtue of the tracker's determination based on its latitude/longitude relative to the job site area, or of the vehicle operator using the MDT to indicate the tracker site arrival/departure, and a consequent "Send Site Dispatch Response" message (7407, Table 128).

A "Send User Data" message (7208, Table 129) commands the NDC server to send a User Data message to all trackers associated with the requesting user (customer) or to a list of individual trackers identified by tracker ID. If the NDC server successfully queues a message to be sent, a "Send User Data Response" message (7408, Table 130) indicates a Message Sequence ID associated with the message being sent. If the message is successfully acknowledged by a tracker, the DMCS receives a "Message Response And User Data" or "Short Message Response and User Data" packet within a "Real-Time Tracking Data" message that contains the same Message Sequence ID.

Trackers that have manual tracking service only transmit their tracking information upon request. A "Send Tracking Request" message (7209, Table 131) allows the DMCS to request tracking information from a specific tracker. If a tracker successfully receives a tracking information request, it transmits its tracking information during the next available time slot reserved for such a transmission, and the requesting DMCS receives a "Real-time Data" message with the requested tracking information. A "Send Tracking Request Response" message (7409) is shown in Table 132.

When the DMCS creates/updates/modifies a tracker installation record, the record is forwarded to the NDC server as an update sent in the form of a "Tracker Installation Record Update" message (7210, Table 133). Also, when the DMCS updates a vehicle profile, the updated profile information is forwarded to the NDC server in the form of a "Vehicle Profile Update" message (7212, Table 134).

XIII. Event Driven Status Reporting

This aspect of the invention provides a method and apparatus for automatically determining and reporting events from a vehicle to an owner or dispatcher of the vehicle at a location which is remote from the vehicle. Events to be reported include changes in status of vehicle operation, location, or measurements of vehicle systems or cargo. The tracking computer (tracker) in the vehicle is connected to various sensors which measure parameters of interest to the dispatcher or owner, and reports critical changes in parameters over the TDMA network. CCS/DMCS computers at the customer's location display status changes for use by the dispatcher, or record data for later analysis. Software in the tracker and a variety of sensors allows multiple, complicated, and abstract status events that are relevant to specific vehicle or industry applications to be determined and reported by the tracker. Automatically generated reports from vehicles enables considerably more accurate and timely data to be provided to the customer's site than is available from the human operators of the vehicles.

FIG. 33 is a diagram of various types of sensors and/or measurement sources that are readily connected/supplied to the tracking computer (tracker) 135, either singly or in combination with each other, including certain "basic" sensors, analog inputs, discrete inputs, TPU inputs, and serial interfaces to the tracker that can be configured for almost any measurement and control purpose. An expanded list of sensor inputs is set forth below. These fall into the two broad categories of (1) basic vehicle functions and (2) operational functions of the vehicle specific to the industry in which it is used. Operational functions require the addition of sensors to a standard vehicle. The reader is also referred back to FIG. 23 which illustrates certain particularly significant sensors of operational functions for ready-mix trucks, such as truck 195—a drum rotation sensor 281 and a washout water flow detection sensor 281—, as well as a generalized set of inputs 280 to tracker 135 from sensors/measurement sources of the types referenced in this section of the specification.

Basic vehicle functions or parameters that are measured directly by the tracker may vary from vehicle to vehicle, but typically include the following:

Vehicle Ignition and Run Time
Headlights
Reverse
Wheel Speed (from the transmission)
Passenger/Driver Door Open
Four Wheel Drive Engagement
Ambulance Lights/Sirens
Fuel Level
Coolant temperature
Oil Pressure
Battery Voltage
Engine Warnings Other vehicle functions may require the addition of sensors for measurement, or may be measured directly on equipment added to the vehicle to perform a function specific to the business in which the vehicle is used. Some typical parameters or functions that fall into this category are:

Theft or Tamper Alarms
Cargo Door Open
Cargo Temperature
Vehicle Weight
Power Takeoff Engagement: Power Takeoffs (PTOs) can run a wide range of equipment, including:
  Pumps
  Winches
  Cranes
  Augers
Engine Data Bus Parameters and Tolerance Checking
Dump Box Up or Hatch Open
Ready Mix Drum Rotation Speed and Direction
Ready Mix Wash Water Usage
Ready Mix Fill Water Volume Vehicle functions are combined with location and speed information from the navigation system. Correlation of measurements to vehicle motion enables events to be triggered based on vehicle location, or to qualify measured data as proper operation of a vehicle—or as an exception to normal operations, such as opening a cargo door outside of normal customer or company loading/unloading zones.

In this respect, the system allows the owner or dispatcher of the vehicle to define rectangular zones on a stored map of the metropolitan area of interest; for example, a zone 300 as shown in FIG. 34. The corners defining the zones (e.g., 301, 302, 303, 304 for zone 300) are sent to the vehicles so that the tracker can determine, based on its navigation solution, whether it is inside or outside any particular zone. These zones are typically set up to identify home or plant sites where vehicles are usually based or pick up cargo, or job sites where vehicles are usually dispatched to deliver cargo or perform a service.

Zones can also define map regions for other purposes such as restricted speed, restricted weight, or borders that the vehicle is not allowed to cross. Using navigation alone, the tracker can report:

Distance Traveled Between Zones

Engine On and Off

Driving Over a Specified Speed

Driving at Inappropriate Times

Unauthorized Stops

Times of Arrival and Departure to and from Specified Locations

Combining location information with other measured parameters on the vehicle can generate other status events, such as using the vehicle location to confirm the correct vehicle status, notifying the dispatcher if a cargo door opens at an inappropriate time or place, or correlating an engine problem to a particular location to understand the underlying circumstances.

When a vehicle tracker needs to transmit event data, it requests special time slots using one of these time slots. It is then granted sufficient auxiliary reporting times at twelve second intervals to send its data The total latency between an event being detected and the transmission of data is preferably kept under thirty seconds.

All data passed through the network and other status information is stored on large database servers for later retrieval for reports on vehicle activity or analysis. The tracker reports events using different types of data packets depending on the event. Events indicated simply by direct measurement of an input are reported in a common event packet format that indicates the input measured (discrete or analog) and the new value. These are events such as cargo door open, four wheel drive engaged, or PTO driven pump on. These data are stored in the database and passed on to the customer applications. Since a fleet owner (operator or subscriber) may have many types of vehicles in the fleet, and each may have different event data of interest on the same inputs to the tracker, the data must be clearly identified from vehicle to vehicle.

Identifying the event reports by the tracker is accomplished by a tracker configuration application running in the NDC. When a tracker is installed in a vehicle and sensors are connected to its inputs, the configuration application activates the tracker by sending it a command for the attached inputs which identifies thresholds and hysteresis on triggering an event on the input. The configuration application also stores the association of each of the tracker's inputs to the specific event type, such as cargo door open. In more complicated situations where a vehicle has a detailed set of logic to operate to determine when and what type of events occur, for example a ready mix truck or an ambulance, the configuration application sends a command to the vehicle's tracker to activate an entire section of software to process inputs. In these cases, industry specific data packets are sent by the tracker to identify detailed event status and data corresponding to the event.

A number of specific applications for event driven reporting of vehicle status are described below. Examples of applications to specific industries, by way of illustration and not limitation, are the following: ready mix concrete, bulk powder transport, bulk aggregate transport, and ambulance operation. Many more examples of applications that require automated event reporting might be listed. The combinations and applications of parameters that can be measured and reported are virtually limitless.

A. Ready Mix Concrete

While efficient use of fixed assets is important in any business, it is particularly important in the ready mix concrete industry. This is primarily a delivery business, since the product being delivered is essentially a commodity and the raw material costs do not vary significantly between suppliers. The business, therefore, is one in which the efficient use of very expensive transportation assets makes the difference between profit and loss.

The transit mixer truck has a well defined sequence of events through which it runs in the process of delivering concrete, generally comprising the steps of 1) Load 2) Leave Plant 3) Arrive Job 4) Begin Pour 5) End Pour 6) Wash 7) Leave Job 8) Arrive Plant It is known that the ready mix concrete industry has been in search of a method to indicate these events to the dispatcher in a cost effective, timely, and accurate manner. Reliable indication of these events to the dispatcher results in the most efficient use of the truck fleet. By knowing the stage of operation each truck is in, the dispatcher can choose the best available trucks for the next loads. This is particularly true when planned schedules are changed by customer needs or delays in delivery. Ready mix companies have typically used driver voice enunciation for these events or driver operated status boxes.

Voice and status box use have a fundamental limitation in that they require the driver to take action to notify the dispatcher of his current state of operation. Even well intentioned drivers too often forget to notify the dispatcher. Industry estimates are that less than 10% of data provided through these means is accurate. Status boxes are control heads interfaced to the voice radios, the status box having multiple buttons, typically a button operable to indicate each of the above-noted delivery phases. An advantage of the status box is that data from it can be provided to common dispatch applications used in the industry to enable the dispatch software to track the truck through the phases without manual intervention by the dispatcher. However, this advantage is rarely realized because of unreliability of the data from the driver, and the consequent inability of the dispatcher to make proper decisions for the most efficient use of assets.

With the appropriate sensors on the transit mixer truck and software in the wireless data computer, the ready mix concrete delivery phases can be automatically and reliably determined. Reliable, automated sequencing is achieved according to this aspect of the present invention by implementation of three basic sensors on the truck, as well as reliable navigation, and involved state logic. In a preferred embodiment, the sensors comprise a drum rotation sensor 280 (FIG. 23) that measures both speed and direction of the mixer drum, a water flow sensor 281 that measures water being used to wash off the truck, and a door switch (e.g., associated with the switch that senses an open door to turn on the interior lights in the truck cab) that indicates when the driver's door is open. Information regarding location and speed of the vehicle is required to determine when the truck is at a plant or a job site (or en route to the site). The state logic ties all of this information together to allow the tracker to report each phase of the delivery process back to the subscriber's site.

Drum rotation sensor 280 measures the speed and direction of the drum 287 of truck 195. In a preferred embodiment, sensor 280 is unlike typical drum revolution counters installed on mixer trucks that use limit switches or Hall effect magnetic or proximity switches to count drum revolutions, but instead accurately provides both speed and direction—parameters which are needed to help determine when the truck is being loaded, when pouring of the wet concrete contents of the drum is commenced and when it is completed. Loading is typically performed by running the drum in the "charge" direction at high speed, whereas normal mixing is performed while the truck is on the road and at a much slower charge speed. Pouring is typically performed at a very slow discharge speed, and drum speed is often increased as the drum empties. Referring to the block diagram of the drum rotation sensor 280 of FIG. 35, two Allegro 3240 Hall effect sensors 288, 289 are employed, separated by approximately two inches on a bracket 290 that mounts to the top of the transmission 291 that drives the ready mix drum 287. Sensor 280 is activated by six magnets that are placed around the axis of drum rotation on the interface plate between the transmission and the drum. Magnet assemblies 292 used to actuate the Hall effect sensors 288, 289 are attached to the drum-transmission interface flange 293.

The transmission to drum interface is the ideal location for rotation sensor 280 when added to the mixer after it is built. Direct measurement of transmission RPM is preferred but is only practical if the transmission can be modified at the factory to supply a rotational speed/direction output. The transmission interface has well controlled dimensions and is relatively free of contaminants and from driver interference. It is also common among front and rear discharge mixers. Other potential locations for sensor placement, such as the idler wheels at the drum mouth or between the midpoint of the drum and the truck chassis, have drawbacks that include dimensional variations from manufacturer to manufacturer and from vehicle model to model. These locations are also more exposed to grease, dirt, damage, and variations in gap distances due to flexure of the truck frame and bouncing of the drum out of its idler wheels.

The top of the standard transmission interface has mounting holes available for oil coolers and water tanks and may be used for sensor mounting. Despite the large size of a transit mixer truck 195 (FIG. 23), the clearances around the transmission interface are very tight. Also, roughly one inch of clearance exists between the bolts holding the drum to the interface plate and the pedestal to which the transmission is mounted. Options for magnet mounting are restricted if factory installed rotation counters must be accommodated. These sensors are of several varieties including reed switches using a similar magnet bolt design, limit switches actuated by a flange attached one of the drum bolts, or proximity sensors actuated by a flange just outside the interface plate radius.

To mount magnets in the drum bolt radius of the interface plate for all manufacturers' mixer trucks, a magnet holder bracket is used. For contemporary mixer truck models, the following configurations are supported: (1) no bracket, (2) single bracket used to offset a rotation counter actuation magnet, or (3) six brackets used to hold in-radius magnets when bolt holes are unavailable. Mixers using ZF transmissions from most manufacturers do not require the bracket. In these cases, six threaded holes in the interface plate are available for magnet bolts to be inserted. Mixers manufactured by McNeilus with ZF transmissions have a reed switch rotation counter actuated by a factory installed magnet bolt in the interface plate, which is replaced by a magnet rivet offset from the normal bolt radius by the bracket. The reed switch is moved from its factory bracket to a hole in the newly installed speed and direction sensor bracket. EIP transmissions populate all but two holes in the interface plate with bolts to hold the drum to the transmission. For this transmission, the bracket is rotated 90 degrees and flipped over so that the magnet rivet is held between the bolts that mate the drum to the plate. Either six bracket-rivet assemblies are used, or a combination of two magnet bolts and four brackets-rivet assemblies.

Sensor 280 in this exemplary embodiment has a four wire interface 294 to the tracker 135: power, ground, and a signal line from each Hall effect sensor. The signals are inputs to the TPU of the Motorola 68332 microcontroller (CPU) for the tracker. The TPU has dedicated hardware for measuring pulses with very precise timing. When a magnet on the drum passes by a sensor, the sensor outputs a low going pulse. Referring now to FIG. 36 which is a timing diagram of the pulses resulting from the interaction of the sensors and the magnet on drum rotation, with the two sensors 288, 289 denoted A and B, respectively, a simple determination is made of drum 287 speed and direction. Speed is determined by two successive pulses 295, 296 from sensor A. The time between pulses ($T_{A/A}$) in seconds divided by 6 magnets (pulses) per revolution multiplied by 60 seconds in a minute yields the RPM of the drum. The maximum speed of a ready mix drum is about 16 RPM. Direction is determined by the relative timing of pulses detected by both sensors. If the time between a pulse 295 on sensor A and a pulse 297 on sensor B ($T_{A/B}$) is less than the time to the next pulse 296 on sensor A ($T_{A/A}$), then the drum is rotating in the A to B direction, which is the charge direction. Conversely, if the time between a pulse on sensor A and a pulse on sensor B is greater than the time to the next pulse on sensor A, then the drum is rotating in the B to A direction, which is the discharge direction.

The gap 298 (FIG. 35) between the faces of the magnets and the sensor is an important consideration. During loading and over the road, the truck experiences very heavy shock and vibration loads. These loads can cause the drum to bounce on its idler wheels and the truck frame to flex. As trucks and transmissions age, the problem becomes worse. Preferably, a gap 298 of at least about three quarters of an inch is provided to avoid damage to sensors or magnets.

Transit mixer trucks typically have a water tank that stores water under pressure. The water is used to add water to the concrete mixture and also to wash off the truck when a pour has been completed. In order to determine when wash is occurring, the water flowing through the hose is measured using a flow switch. The flow switch triggers at a preset flow volume threshold. A number of technologies for the flow switch can be used to detect flow, viz.: water tank air pressure, eddy current, differential pressure through an orifice, and spring deflection sliders or flappers. A flow switch is a preferred sensor 281 (FIG. 23) for this application because the volume of flow is not important, just the time being spent washing the truck. A key design consideration for a flow switch or sensor is that it must work with water that is contaminated with dirt and debris such as rocks and large fragments of rust.

For rear discharge mixers, the driver must exit the truck to set up the chutes before pouring. A door switch is used to determine when the driver's door is opened. Driver door opening is used to confirm arrival at the job site, but is not critical for proper operation of the system.

A state transition diagram which defines the logic used by the tracker to combine sensor and navigation data to automatically derive mixer status is shown in FIG. 37. The logic is necessarily complex to account for all of the anomalies from the normal concrete delivery flow that may be encountered. Thresholds and timeouts are set to prevent false triggers of logic states at the expense of a small delay in indicating the event. The primary states listed above are shown in bold in the Figure.

The delivery process starts with the truck ignition being turned on (310) at the plant (311). Once the navigation system is initialized, the tracker installed in the truck determines that it is at the plant. Mixers are loaded by parking under the batch plant and running the drum in the charge direction very fast. This is detected by the tracker if the truck has a speed of less than two miles per hour, the truck is at the plant, and the drum speed and direction is about the fast charge threshold, all for 60 seconds. When this is detected (312), the tracker transmits the loading status (313).

After loading, the truck typically proceeds to the wash rack where water is added to the mix, dust is washed from the truck, and the water tank on the truck is topped off. A state that is detectable but not usually required by a ready mix company is identifying if a truck is at the wash rack (314). This can be determined by a slight change in position of the truck and parking after loading without leaving the plant. Next the truck will leave the plant. This is determined by having a location outside the predetermined rectangular zone (e.g., see FIG. 34) that defines the plant and a speed above 15 miles per hour. When this is detected (315), the tracker transmits the leave plant status (316). Hysteresis is placed on the zone boundary crossing so that a truck driving along the edge of the zone does not cause multiple arrive-leave plant sequences.

Optimal use of the system requires the dispatcher to send a dispatch message to the truck that indicates to the tracker the rectangular zone defining the boundaries of the job site, but it is not required for the tracker to provide automated status. Job site location information enables the tracker to determine job arrival separately from the beginning of the pour, enables the tracker to determine exception information about pours taking place away from job sites, and allows route optimization software to have reliable information about trip times.

Job arrival is determined by the truck entering the defined job zone and then having a speed below five miles per hour for at least one minute, or the driver's door opening, whichever occurs first (317). If a job zone is not defined, then job arrival is determined by the drum operating in the discharge direction for more than 10 seconds (318). Alternatively, a fraction of a revolution of the drum in the discharge direction can be used. When these conditions are detected, the tracker transmits the arrive job status (319).

The start of pour condition is determined when the drum is run in the discharge direction for 20 seconds, or alternatively, one or two revolutions. Once this is detected (320), start pour is transmitted by the tracker (321). This places the tracker software in the pouring state (322), and it is then looking for an end of pour condition.

End of pour may be detected in a number of ways. Some pours are conducted in slow discharge. When the drum is near empty, the drum is sped up to extract the last remaining concrete. If the drum is run in fast discharge for 10 seconds after running in slow discharge (323), this will trigger end of pour (324). If wash water is used for two minutes (325), end of pour is also triggered (326) because use of that much water almost certainly indicates the truck is being washed. End pour (327) can also be triggered is the speed of the truck is over 30 miles per hour (328). Trucks can rarely move that fast, on a job site, particularly if they are still pouring because the chutes are typically left attached to the truck until pour is complete. An alternative method can be enabled if information about the amount of concrete loaded on the truck is provided to the vehicle tracker from the dispatcher (from a CCS at the subscriber site via the DMCS, NDC server, NTCC, SCC, subcarrier modulator and FM broadcast). In this case, end of pour can be better estimated by the number of revolutions required to empty the drum for a given volume originally loaded. A second alternative is to use an on-board weight measurement system such as the AW4600 or AW5600 from Air-Weigh. The tare weight of the truck can be compared to the weight during pour, and an end of pour can be detected when the weight approaches the tare weight.

The beginning of wash is determined by use of water to wash the truck for a predetermined amount of time. If end pour (324) was detected by a fast discharge event (323), then water must be used for one minute (329) to indicate wash status (330). If end pour (326) was determined from the use of water for two minutes (325), then wash status (331) is transmitted along with the end pour status (326).

A leave job event is transmitted when the vehicle leaves the defined job site. A back up is provided, as shown in FIG. 37, to enable sending of the leave job status in case a job zone was not defined. Leave job (332, 333) is determined in any case if the vehicle speed is greater than 30 miles per hour (334). It should be noted that the system state can return to pouring (322) in some cases after wash (331) or leave job (333) are detected, if the drum is run in discharge again before the truck returns to a plant site (335). This enables the system to support operational anomalies like pouring concrete from one truck in two different locations at one overall job site.

If job sites are defined for the tracker, they can be used to monitor behavior of the vehicle or driver that is contrary to the fleet operator's (subscriber's) policy. For example, if a pour is detected outside the defined job site rectangle, the vehicle computer can generate an exception and transmit it. This will alert the dispatcher that the driver may be pouring concrete at an unauthorized location and reduce loss of material and improve efficiencies. Finally, arrive plant (311) is detected when the truck enters a rectangle that defines a plant location and the speed is less than 15 miles per hour (337).

In addition to the normal ready mix delivery sequence, the business owner is interested in determining the amount of water added to the mixing drum at the job site. Again, drivers are an unreliable source of this information because they rarely record the actual amount added. It is critical that the correct amount be added and known because an incorrect mixture may not cure properly.

Determining the amount of water added can be accomplished by placing a water flow meter in line with the pipe that fills the drum. An example of one of these units is EMCO/Fluidyne part no. 1200-1-1. These types of meters typically provide a pulse or analog output. Either type is easily integrated into the standard inputs of the tracking computer. Water added is counted between the time the truck arrives at the job site and finishes pouring. The amount added is transmitted out as an event along with the end of pour event.

B. Bulk Powder Transport

Bulk transport trucks haul powdered material such as lime, cement, and fly ash. The bulk hoppers are loaded from the top by gravity. They are unloaded by forcing air through a network of pipes under the hoppers which, along with gravity, pulls the material out of the hoppers and pumps it up into storage silos. Bulk hauling companies need to know when the truck arrives at a customer's site, when it begins unloading, when it ends unloading, and when it leaves the site. The basic requirements are very similar to those described above for the ready mix concrete industry.

Unloading is performed by pumping air through the pipes under the bulk hoppers. Air pressure is usually generated by the truck itself It is either done by a PTO driven pump or with an exhaust gas driven turbo pump. In most companies, the exhaust driven pump is more popular because it weighs much less than the PTO pump. With either pump the truck engine is run at high RPM to generate the required air pressure.

Determining when the PTO pump is on is quite straightforward. One of the discrete inputs is connected to the input for the light on the pump that indicates it has been turned on. The input wiring is designed to ensure that the input is triggered even if the light is burned out. Any time the PTO is turned or off, a corresponding status message is transmitted by the tracker to indicate the status change event.

On trucks with exhaust driven turbo pumps, directly measuring if the pump has been engaged is very difficult. Since the pump is driven by the engine exhaust, the housing is very hot. Integrated circuit electronics cannot be used reliably in this kind of environment, so electronic flow switches and pressure switches would be difficult to use. The engagement lever on the pump is mechanically sloppy and difficult to instrument. In addition, any sensors outside the truck near the pump are subject to tampering.

With these difficulties in mind, a tachometer sensor is used to determine if the truck is pumping material. The sensor circuit is designed to detect a low-level analog signal, convert it to a digital signal level and divide the frequency to a lower value. The lower frequency signal is connected to the tracker through the TPU interface for a discrete input. Software in the tracker CPU counts the received pulses and converts them to an RPM.

Engine speed is used in conjunction with the truck being stationary to determine the unload status. If the truck is stationary and the engine speed is above the appropriate RPM threshold for enough time for the driver to set up the truck and connect the delivery hoses, then the unload status is transmitted. If the dispatcher has provided the tracker with site information, that is used to ensure the unloading is taking place at the site. If it is outside the site, the tracker transmits an exception to warn the dispatcher.

C. Aggregate Bulk Transport

Aggregate bulk transport trucks are dump trucks that haul gravel, rock, and sand generally for use by ready mix companies, construction, or landscaping. This industry has similar requirements for truck status reporting as the bulk powdered material haulers. The vehicle owners need to know when and how often a dump truck empties its load. Vehicles in this industry are often rented by ready mix or other companies that do not own aggregate hauling trucks of their own. The vehicle owner needs reports on run time hours, odometer mileage, and number of loads hauled for billing purposes; and the renter needs to know the same things to ensure that it is getting the desired efficiency from the truck.

In order to determine if the truck dump bed is up, a reliable sensor must be used that is immune to vibration, shock, and the extreme environment of loading. A proximity sensor that can sense the presence of metal at distances of over one half inch is preferred, and such a sensor is available in a range of sensor models from Turck sensor company. The sensor is connected to one of the discrete inputs on the tracker. When the tracker determines that the dump bed has left the proximity of the sensor for a guard time interval to eliminate noise, it transmits the dump status.

Dump truck owners are also interested in preventing loss of cargo. As with ready mix, if applicable geographical zone or boundary definitions are provided in mapping data or otherwise to the tracker, then it can determine if the dump was raised outside of the areas where product should be delivered.

D. Ambulance

Ambulance operators must demonstrate to the government that they meet the required response times for emergency and non-emergency calls. They do this by providing reports on each trip, with respect to the pick up location, the hospital delivered to, the times of the calls, and other factors. The reports are often collected manually based on recorded call logs. Ambulance companies also must comply with special local rules, regulations and ordinances that apply to operating emergency vehicles such as to refrain from using emergency lights and sirens on freeways or in non-emergency situations.

These functions can be automated to a significant degree by sensing when the lights and sirens are turned on and off and by using dispatch zones. When call scene locations and hospital or clinic locations are encompassed by zones and provided to the vehicle tracker, and sensors are installed on the emergency lights, the tracker can determine the response times and delivery locations automatically.

When the tracker detects that the emergency lights are turned on, it transmits the event and the time at which the lights are turned on. It then also begins counting time and distance until the vehicle arrives at the call scene. Call scene arrival can be determined automatically if a zone is provided to the tracker or can be determined manually by the driver pressing a status button on the display terminal. Once on-scene arrival is determined, the tracker transmits the arrival time and the distance traveled. The sequence of leaving the scene and arriving at the hospital is similarly ascertained through zone detection and sensors.

For report generation, all data reported by the tracker is stored for later processing at the ambulance owner's site. The report then contains each call location, distance traveled and response time along with the emergency condition for each leg of the trip.

XIV. Tracker FM Diversity Processing

Reliable reception of data in a mobile radio environment is difficult to accomplish. Signal quality is rapidly time varying as a vehicle moves through the clutter of obstructions, reflections, and interfering radio sources. The FM subcarrier data signal received by the vehicle tracker can rapidly fade in an out due to signal obscuration and multipath reflections. In order to recover data in the most reliable fashion possible, the network design uses a combination of FEC coding, bit interleaving, CRCs on message packets, and space diversity in the vehicle antenna system. Although the first three of these have been discussed earlier herein, they will be revisited briefly for convenience of the reader.

The forward error correction is a Golay (23,12) code. This algorithm encodes each 12 bits of message information into 23 code bits. When received, the decoding algorithm is able to correct errors in up to 3 of the 23 code bits. The FM transmitter sends 300 message bytes (2400 bits) of data encoded this way into 4600 code bits each second.

To improve the immunity of the link to bursts of errors caused by multipath or blockage effects, the transmitted bits are interleaved. The 200 code words transmitted on the FM subcarrier each second are split into five 40 word blocks. Within each 40 word block, the bit order of the transmitted data is rearranged so that the 40 first bits of each word are sent first followed by the 40 second bits and so on. This interleaving enables the Golay algorithm to correct up to 120 consecutive bit errors.

Some error conditions are severe enough that they cannot be reliably corrected by the FEC code. To guard against this, each message packet in the FM data contains a standard 16 bit CRC used for error detection. If the CRC is not correct for a packet, then the packet is thrown out. The CRC can detect any odd bit errors, all double bit errors, and many other error combinations. For short message packet lengths typically transmitted in the system, the 16 bit CRC algorithm is sufficient when coupled with the forward error correction and interleaving.

Space diversity in the receiving system of the vehicle is used to reduce errors caused by longer duration multipath fading or obscurations that cannot be corrected with interleaving alone. Two independent receivers (207, 208, FIG. 24) and antennas (191, 192, see, also, FIG. 23) are used to receive the FM subcarrier signal for the tracker 135. The receive antennas are separated on the roof of the vehicle as much as is reasonably possible. At 100 MHz FM frequencies, the distance between the antennas on the vehicle should be about 4 ft for optimum diversity processing. This distance is usually achievable for most vehicles. Signals from the two antennas are independently demodulated to baseband data using two receiver chains. The tracker CPU 203 then uses a diversity processing algorithm to recover the data.

Tracker CPU 203 decodes the received data using a sequence of algorithms: (1) bit de-interleaving, (2) Golay FEC decoding, (3) message packet parsing and diversity processing. The de-interleaving and Golay decoding are relatively straightforward algorithms. The parsing and diversity algorithm are described below.

A flow chart of the diversity algorithm is shown in FIG. 38. Each second, the tracker begins processing data received over the FM subcarrier. The two received data streams are denoted by stream A and stream B. Diversity decoding starts at the beginning of the message block, with either stream A or B. Message synchronization is set at the beginning because the first byte to be processed in each second's data is the start of a message packet. A flag is also set to allow switching to the alternate stream (350) if a message cannot be properly decoded.

If the next byte to be processed is a valid message ID (351), then the current stream is parsed for the message packet (352). If the CRC passes for the packet (353), message synchronization is held (354) and the pointer is incremented by the message length (355). Then the next byte is checked for a valid message ID (351). This is the normal flow of processing until the end of buffer mark is detected (358) or there is no more room in the buffer for messages (359).

If a valid message ID is not detected and the other stream has not been checked, then the corresponding byte in the other stream (360) is checked for a valid message ID (351). If it is valid, then the message is parsed as described above. Alternatively, in either of the above cases, if the CRC is not valid (362), then the message packet is corrupted. If there was message synchronization (363), then an error count is incremented (364); otherwise, this indicates that the message ID was not the start of an actual message. If the other stream had not been parsed for the message, it is tested.

If at any point both streams fail to produce a valid message ID or properly parsed message packet, the algorithm reverts to checking both streams on a byte by byte basis to locate the next valid message packet.

It will be appreciated from the foregoing detailed description that certain objectives, features and aspects of the present invention are particularly noteworthy. For one, a vehicle fleet management information system for fleet asset management is provided which enables identification of location and direction of movement of each vehicle in the fleet in real-time and automatic communication directly with management offices to report vehicle location and direction, and as well, status of predetermined events in which the vehicle may become engaged, in which apparatus at a network control or distribution center assigns each vehicle in the fleet a unique time slot to transmit its reporting information over a communications network without substantially interfering with transmissions from other vehicles in their own respective time slots. For another, precise time synchronization is provided for all elements of the network, which is at least in part a TDMA wireless network, by means of a timing control PLL for distributing a single, remote global positioning satellite GPS based time reference throughout the network. The network includes a dual band full-duplex interface with TDMA on one-half of the interface and broadcast on the other half Also, microprocessors in components throughout the network each have a time processing unit for performing precise clock synchronization within 10 microseconds for the TDMA portion of said network.

Still another resides in the provision of apparatus for establishing a protocol for entry by vehicle transmitters into the network in assigned time slots for periodic transmission of messages, and apparatus for providing space diversity of the messages received from the vehicle transmitters to avoid data corruption. Also, different periodic transmission intervals are provided for different vehicles in the network by dynamically allocating the slots for various update rates. Additionally, auxiliary reporting slots are provided to allow prompt reporting of important data by the respective vehicle transmitters independent of slower periodic transmission intervals. And apparatus in the system supports both guaranteed and non-guaranteed delivery of message data. Further, assigned slots are unique to respective vehicles, so as to minimize bandwidth usage by allowing identity of the transmitting vehicle to be inferred from the time slot in which the transmission is received. Each vehicle transmitter has a filter for baseband data to reduce the occupied bandwidth of the channel on which data is transmitted, including removal of synchronization data to minimize overhead of non-information bearing data. The baseband filter is implemented by a digital microcontroller that replaces an original square wave data stream of the baseband data with deterministic transitions that reduce harmonic content and maintain bit widths, regardless of data input frequency. Each receiver in the network has the capability to recover the transmitted data without transmitted synchronization information by locating the start of each data message within a predetermined scant time window without aid from bit synchronization patterns. To that end, an iterative search is performed that sequentially clocks in the data at greater and greater delays from the nominal message start time until a valid data packet is located.

Yet another provides for sensing, detecting or measuring certain repeated events in which the vehicle will be engaged according to the very basic nature of its use, and according to the industry in which it is being used, and for automatic reporting of the detected events to the fleet management office. These are especially important aspects for vehicles which must follow a routine prescribed for efficiency's sake by the fleet management office, such as ready mix concrete trucks, powdered and aggregate materials transport haulers, ambulances, etc.

Although certain presently preferred and exemplary embodiments and methods have been described herein to illustrate the best mode presently contemplated of practicing the invention, it will be apparent to those skilled in the relevant art that variations and modifications may be made without departing from the true spirit and scope of the invention. Accordingly, it is intended that the invention shall be deemed limited only to the extent required by the appended claims and the rules and principles of pertinent law.

What is claimed is:

1. A vehicle monitoring system that monitors the state of a plurality of vehicles, said system comprising:
    at least one mobile data unit that generates automatic status information corresponding to a delivery vehicle, wherein the automatic status information includes position information and delivery state information;
    a delivery state database that store the automatic status information generated by the mobile data unit;
    wherein the mobile data unit includes a controller, a GPS receiver coupled to the controller, and at least one vehicle condition sensor coupled to the controller, and said controller generates the automatic status information based on signals received from the GPS receiver and the vehicle condition sensor;
    wherein the controller determines the delivery state information based on the signal received from the vehicle condition sensor; and
    wherein the vehicle condition sensor generates a mixing barrel status signal indicative of a charge operation condition and a discharge operation condition of a mixing barrel, and wherein the controller determines a Begin Pour delivery state and an End Pour delivery state based on the mixing barrel status signal.

2. A vehicle monitoring system as claimed in claim 1, further comprising dispatch monitoring means for accessing the automatic status information stored in the delivery state database and displaying the automatic status information to provide a visual indication of the identity of the delivery vehicle, the position of the delivery vehicle and the delivery state of the delivery vehicle.

3. A vehicle monitoring system as claimed in claim 2, wherein the dispatch monitoring means displays the automatic status information on a display monitor in the form of an icon, wherein a display condition of the icon is varied in accordance with a delivery state defined by the delivery state information.

4. A vehicle monitoring system as claimed in claim 3, wherein the display condition includes at least one of the shape, color, size, contrast or display status of the icon.

5. A vehicle monitoring system as claimed in claim 1, wherein the delivery state information includes a plurality of delivery states that define a delivery cycle, and wherein the controller determines whether a current delivery state is valid based on the delivery cycle.

6. A vehicle monitoring system as claimed in claim 5, wherein the controller determines whether a current delivery state is valid based on whether a prerequisite delivery state within the delivery cycle has occurred.

7. A vehicle monitoring system as claimed in claim 1, wherein the mobile data unit includes a wireless transmitter/receiver that transmits the automatic status information from the mobile data unit to the delivery state database via a wireless transmission device coupled to the delivery state database.

8. A vehicle monitoring system as claimed in claim 7, further comprising:
    a dispatch monitoring means for accessing the automatic status information stored in the delivery state database and displaying the automatic status information to provide a visual indication of the identity of the delivery vehicle, the position of the delivery vehicle and the delivery state of the delivery vehicle; and
    wherein the dispatch monitoring means includes data entry means for entering messages that are transmitted to the mobile data unit via the wireless transmission device and the wireless transmitter/receiver.

9. A vehicle monitoring system as claimed in claim 8, wherein the mobile data unit includes a display unit that displays the messages transmitted to the mobile data unit from the dispatch monitoring means.

10. A vehicle monitoring system as claimed in claim 9, wherein the mobile data unit includes data entry means for entering messages that are transmitted to the dispatch monitoring means via the wireless transmitter/receiver and the wireless transmission device.

11. A vehicle monitoring system as claimed in claim 10, wherein the messages transmitted to the dispatch monitoring means from the mobile data unit and to the mobile data unit from the dispatch monitoring means are transmitted in the form of cellular digital packet data.

12. A vehicle monitoring system as claimed in claim 7, wherein the automatic status information is automatically transmitted to the delivery status database when a change in delivery state information occurs.

13. A vehicle monitoring system as claimed in claim 1, wherein hot zone data corresponding to geographic zone around at least one of a loading terminal and a delivery site is supplied to the mobile data unit, and wherein the controller determines the delivery state information based on the hot zone data.

14. A vehicle monitoring system as claimed in claim 13, wherein the controller alters the hot zone data in response to certain delivery states defined by the delivery state information.

15. A vehicle monitoring system as claimed in claim 14, wherein the controller alters the hot zone data to expand the geographic zone when the delivery state information is indicative of an At Job delivery state to thereby avoid problems associated with GPS jitter.

16. A vehicle monitoring system as claimed in claim 14, wherein the controller alters the hot zone data to relocate the geographic zone when the delivery state information is indicative of a change in location of a delivery site.

17. A vehicle monitoring system as claimed in claim 13, wherein the controller disables position detection when the delivery vehicle enters a geographic zone defined by the hot zone data to avoid problems associated with GPS jitter.

18. A vehicle monitoring system as claimed in claim 1, wherein a vehicle condition sensor is provided that generates a vehicle velocity signal, and at least one of the Begin Pour delivery state and the End Pour delivery state is determined by the controller based on the mixing barrel status signal and the vehicle velocity signal.

19. A vehicle monitoring system as claimed in claim 18, wherein the controller determines if the End Pour delivery state is valid if: a) a valid At Job state has been determined; b) a valid Begin Pour state has been determined; c) the mixing drum status signal indicates a charge condition; and d) at least one of the following conditions is true: 1) the signal received from the GPS receiver indicates the delivery vehicle is outside of a specified hot zone; or 2) the velocity signal indicates delivery vehicle is moving at a velocity greater than a predetermined minimal threshold.

20. A vehicle monitoring system as claimed in claim 18, wherein the controller determines if the Begin Pour delivery state is valid if: 1) the velocity signal indicates the delivery vehicle is moving at a velocity less than a predetermined threshold value: and 2) the mixing drum status signal indicates a discharge condition.

21. A vehicle monitoring system as claimed in claim 20, wherein the controller further determines if the Begin Pour delivery state is valid if at least one of: a) a valid At Job state is determined; and b) the signal received from the GPS receiver indicates the delivery vehicle is outside of a hot zone corresponding to a loading terminal.

22. A method of providing automatic status information for a plurality of delivery vehicles, wherein the automatic status information includes position information and delivery state information, said method comprising:
   determining position information corresponding to each of the delivery vehicles using a GPS data;
   determining delivery state information corresponding to each of the delivery vehicles using at least one vehicle condition sensor provided on each of the delivery vehicles;
   transmitting the position information and delivery state information to a delivery state database via a wireless transmission network; and
   defining a plurality of delivery states corresponding to a delivery cycle, wherein the delivery state information comprises the delivery states;
   wherein the validity of a current delivery state is determined based on whether a prerequisite deliver state has occurred; and
   wherein the delivery states include a Begin Pour delivery state and an End Pour delivery state associated with the delivery of ready-mix concrete.

23. A system for tracking the state of a plurality of vehicles, said system comprising:
   a mobile unit to generate information regarding status of a delivery vehicle among said plurality of vehicles, including current position and delivery state of said delivery vehicle;
   a delivery state database that stores the generated status information;
   said mobile unit coupled for GPS reception, with one or more sensors adapted to supply vehicle event information thereto; to enable the mobile unit to determine delivery state of the delivery vehicle and to generate said status information therefrom;
   said vehicle event information indicative of plural delivery states in a sequence of events in which said delivery vehicle may engage, and said mobile unit responsive thereto to determine beginning and ending delivery states in a subset of said sequence of events.

24. The vehicle tracking system of claim 23, further comprising dispatch monitoring apparatus to access status information stored in said delivery state database for display thereof to visually indicate the identity, position and delivery state of the delivery vehicle for which said status information was accessed.

25. The vehicle tracking system of claim 24, wherein the dispatch monitoring apparatus displays the status information in a form adapted to undergo varied display according to the delivery state defined by the accessed status information.

26. The vehicle tracking system of claim 25, wherein said form of the displayed status information includes one of shape, color, size, contrast or display status.

27. The vehicle tracking system of claim 23, wherein the delivery state is one or more of a plurality of delivery states that define said sequence of events, and wherein the mobile unit ascertains the validity of a current delivery state based on said sequence.

28. The vehicle tracking system of claim 27, wherein the mobile unit ascertains the validity of a current delivery state according to whether a certain delivery state within said sequence of events has occurred as a condition precedent to said current state.

29. The vehicle tracking system of claim 23, wherein the mobile unit interacts with a wireless transmitter/receiver to transmit the status information to the delivery state database via a wireless transmission medium.

30. The vehicle tracking system of claim 29, further comprising:
   dispatch monitoring apparatus for accessing and displaying the stored status information to visually indicate the identity, the position, and the delivery state of the delivery vehicle; the dispatch monitoring apparatus including data entry means for entering messages to be transmitted to the mobile unit via the wireless transmission medium.

31. The vehicle tracking system of claim 30, wherein the mobile unit includes a display for messages transmitted from the dispatch monitoring apparatus.

32. The vehicle tracking system of claim 31, wherein the mobile unit includes data entry for entering messages transmitted to the dispatch monitoring apparatus.

33. The vehicle tracking system of claim 32, wherein the messages transmitted to and from the dispatch monitoring apparatus from and to the mobile unit are transmitted in the form of digital packet data.

34. The vehicle tracking system of claim 29, wherein status information is transmitted to the delivery status database in response to a change in delivery state.

35. The vehicle tracking system of claim 23, wherein data corresponding to a preselected geographic zone around one of a loading terminal and a delivery site is supplied to the mobile unit for use in determining the delivery state.

36. The vehicle tracking system of claim 35, wherein the mobile unit is adapted to alter the geographic zone data in response to certain predefined delivery states.

37. The vehicle tracking system of claim 36, wherein the mobile unit is adapted to alter data to expand the geographic zone when the delivery state is indicative that the delivery vehicle is at the job site, so as to avoid effects of GPS jitter.

38. The vehicle tracking system of claim 36, wherein the mobile unit is adapted to alter data corresponding to the geographic zone for the job site when the delivery state of the delivery vehicle indicates a change in location of the job site.

39. The vehicle tracking system of claim 35, wherein the mobile unit is adapted to disable position detection when the delivery vehicle enters the geographic zone, so as to avoid effects of GPS jitter.

40. The vehicle tracking system of claim 23, wherein the delivery vehicle is a ready mix slurry transport vehicle having a mixer drum, one of said vehicle event sensors generates a vehicle velocity signal, and a delivery state indicative of a Begin Pour or an End Pour of slurry from the mixer drum is determined by the mobile unit according to a mixer drum status signal and the vehicle velocity signal.

41. The vehicle tracking system of claim 40, wherein the mobile unit confirms the validity of the End Pour delivery state if: a) a valid At Job state has been determined; b) a valid Begin Pour state has been determined; c) the mixer drum status signal indicates a charge condition; and d) at least one of the following conditions is true: 1) the GPS reception indicates the delivery vehicle is outside a specified geographic zone; or 2) the vehicle velocity signal indicates a velocity greater than a predetermined minimum threshold.

42. The vehicle tracking system of claim 40, wherein the mobile unit confirms the validity of a Begin Pour delivery state if: 1) the vehicle velocity signal indicates a velocity less than a predetermined threshold value; and 2) the mixer drum status signal indicates a slurry discharge condition.

43. The vehicle tracking system of claim 42, wherein the mobile unit additionally confirms validity of the Begin Pour delivery state if at least one of: a) a valid At Job state is determined; and b) the GPS reception indicates the delivery vehicle is outside a geographic zone corresponding to a loading terminal.

44. A method of providing automatic status information, including position information and delivery state information, for a plurality of ready-mix concrete delivery vehicles, said method comprising:

determining position information corresponding to each of the delivery vehicles using GPS data;

determining delivery state information corresponding to each of the delivery vehicles using at least one vehicle status sensor provided on each of the delivery vehicles;

transmitting the position information and delivery state information to a delivery state database via a wireless transmission network; and defining a plurality of delivery states, including a Begin Pour delivery state and an End Pour delivery state, corresponding to a delivery sequence for ready mix concrete, said delivery states corresponding to respective delivery state information; wherein the validity of a current delivery state is determined at least in part according to whether a preceding delivery state in said sequence has occurred.

45. A system for automated reporting of status of a ready mix concrete or other slurry material mixer truck, including state of events related to the usage, function, operation, location, delivery, systems or cargo of the truck, to a management office for system users including dispatchers and managers using a wireless network, the automated reporting system comprising, on board the truck:

a GPS receiver for receiving GPS signals and for determining position information, a plurality of sensors for automatically detecting or measuring the current status of parameters corresponding to various selected ones of said events, and computer apparatus for receiving inputs from the GPS receiver and said plurality of sensors indicative of the respective detected or measured status of parameters of selected events of interest, and for determining therefrom and transmitting to the management office over the wireless network, the state of the selected events of interest and location information in the form of digital data.

46. The automated reporting system of claim 45, including an off-truck database that stores map data with preselected geographic zones identifying sites designated to correspond to plant and job locations of interest, and wherein said computer apparatus has access to said database map data for determining and indicating when the truck is within or outside a preselected geographic zone corresponding to a site location designated by dispatch instructions to the truck over the wireless network.

47. The automated reporting system of claim 46, wherein said dispatch instructions reference a geographic zone corresponding to a site location where the truck is to perform one or more specified operations, and said computer apparatus stores the referenced site and detects and reports arrival and departure of the truck relative to each stored site.

48. The automated reporting system of claim 47, wherein said computer apparatus determines if the truck has deviated from operations designated in received dispatch instructions, and transmits a corresponding exceptions report to the management office.

49. The automated reporting system of claim 48, wherein said computer apparatus issues exceptions reports to the management office for truck deviations in performing events or the sequence of events dictated by dispatch instructions from said office.

* * * * *